(12) United States Patent
Yasui

(10) Patent No.: US 8,116,188 B2
(45) Date of Patent: Feb. 14, 2012

(54) OBJECTIVE LENS, OPTICAL PICKUP AND OPTICAL DISK APPARATUS

(75) Inventor: Toshifumi Yasui, Tokyo (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 12/692,873

(22) Filed: Jan. 25, 2010

(65) Prior Publication Data

US 2010/0188960 A1    Jul. 29, 2010

(30) Foreign Application Priority Data

Jan. 26, 2009    (JP) ................. 2009-014245

(51) Int. Cl.
*G11B 7/135*    (2006.01)
(52) U.S. Cl. .................. 369/112.23; 359/719
(58) Field of Classification Search ............. 369/112.03, 369/112.05, 112.23; 359/569, 571, 719
See application file for complete search history.

(56) References Cited

U.S. PATENT DOCUMENTS

| | | | | |
|---|---|---|---|---|
| 2002/0186476 | A1* | 12/2002 | Sasano et al. | 359/719 |
| 2006/0198254 | A1* | 9/2006 | Hirai et al. | 369/44.13 |
| 2007/0104045 | A1* | 5/2007 | Nagura | 369/44.23 |
| 2009/0225643 | A1* | 9/2009 | Sugi et al. | 369/112.23 |

FOREIGN PATENT DOCUMENTS

JP    2008-004169 A    1/2008

* cited by examiner

*Primary Examiner* — Wayne Young
*Assistant Examiner* — Brenda Bernardi
(74) *Attorney, Agent, or Firm* — Wolf, Greenfield & Sacks, P.C.

(57) ABSTRACT

A plastic objective lens is configured to collect a light beam with at least a wavelength λ on a recording layer of an optical disk and is used in an optical pickup for recording and/or reproducing an information signal by illuminating a light beam on the optical disk having one or a plurality of recording layers in an incident direction of the light beam.

8 Claims, 26 Drawing Sheets

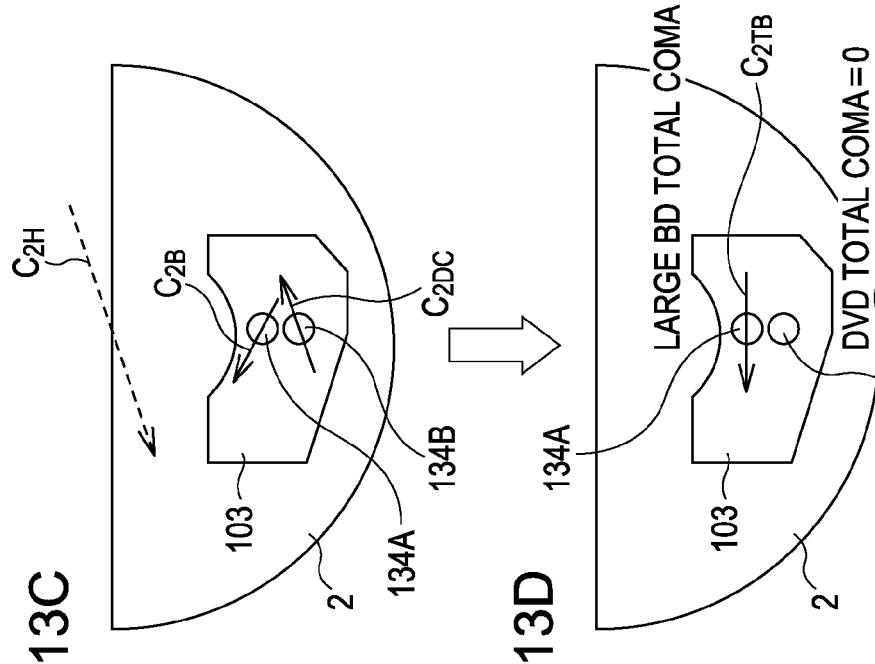
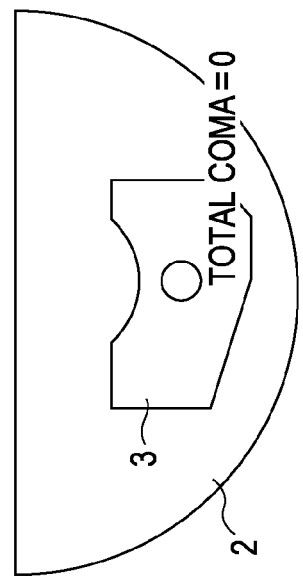

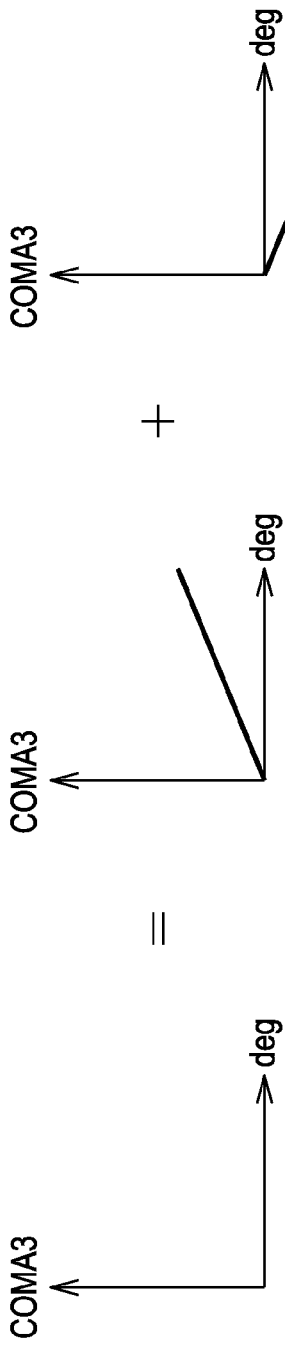
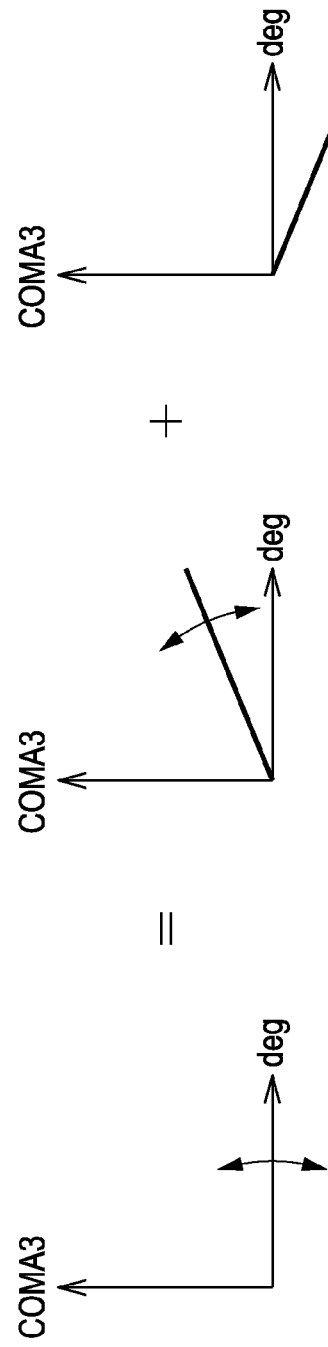
FIG. 15A  FIG. 15B  FIG. 15C
FIG. 15D  FIG. 15E  FIG. 15F

OBJECTIVE LENS, OPTICAL PICKUP AND OPTICAL DISK APPARATUS

BACKGROUND OF THE INVENTION

1. Technical Field

The present invention relates to an objective lens that is used for an optical pickup, an optical disk apparatus, and the like which perform recording and/or reproducing of information on an optical recording medium such as an optical disk. The invention also relates to an optical pickup and an optical disk apparatus using the same.

2. Description of the Related Art

Recording media that have been popular for use in recording information signals include a CD (Compact Disc) using light beams of a wavelength of about 785 nm, a DVD (Digital Versatile Disc), which can be recorded with higher density than the CD, using light beams of a wavelength of about 660 nm, and a high-density-recording-capable optical disk (hereinafter, referred to as "high density recordable optical disk"), which can be recorded with higher density than a DVD, capable of recording and reproducing signals using light beams of a wavelength of about 405 nm emitted from a bluish-violet semiconductor laser. As a high density recordable optical disk, there has been proposed an optical disk, such as BD (Blu-ray Disc (registered trademark)), having a configuration in which a thickness of the cover layer (protective layer) for protecting the recording layer capable of recording signals is made to be thin.

Optical pickups have been used to record information signals on the above-mentioned optical disk such as CD, DVD, or BD or reproduce the information signal recorded on the optical disk. In the optical pickups, it is preferred that the objective lens should be made of plastic in order to reduce the entire weight and manufacturing costs. The plastic objective lens has a problem in that spherical aberration caused by temperature change is large since fluctuation in the refractive index of plastic is larger than that of glass. In particular, in a case of a high NA of the high density recordable optical disk such as BD, just several degrees change in temperature may cause a spherical aberration which greatly affects imaging performance.

As a method of correcting a spherical aberration caused by the temperature change, there has been a method of canceling the effect of the aberration by providing a diffractive structure on the surface of the objective lens and causing a spherical aberration having an opposite polarity to the spherical aberration caused by temperature change. However, in order to correct the spherical aberration caused by temperature change perfectly, it is necessary to apply a great diffractive power to the diffraction surface. Hence, it is necessary to form a very fine diffractive structure. Accordingly, there has been a problem in that it is difficult to form the diffractive structure on the lens surface and it is difficult to obtain a favorable light use efficiency because of the remainder which is cut from the mold by cutting a fine structure. Further, it has been pointed out that a cost problem also arises in that the use cycle of the mold is shortened because of complexity of the mold, yield is deteriorated by the complex diffractive structure, and so on.

On the other hand, an objective lens using the diffractive structure for compatibility of three wavelengths has been studied. It can be expected that the cost of the objective lens can be reduced greatly as compared with the general configuration having two objective lenses, but the temperature change problem also may arise when the lens is made of plastic as described above. That is, in such an objective lens, the diffraction function is used only in order to establish the compatibility of three wavelengths, and a problem arises in that it is difficult to cancel the spherical aberration caused by temperature change.

As described above, in a case where a plastic objective lens not having the diffractive structure or a so-called three-wavelength compatible objective lens is used, normally a method of correcting the above-mentioned spherical aberration caused by temperature change should be used separately. Methods of correcting the spherical aberration include a method that cancels a spherical aberration caused by temperature change by magnification of the spherical aberration by driving a collimator lens in a direction of the optical axis when there is a temperature change. Specifically, for example environmental temperature is monitored, and the collimator lens is driven in accordance with the temperature change, thereby changing the incident magnification of the objective lens. Thereby, a system that can cancel a spherical aberration caused by temperature change by causing a spherical aberration depending on a spherical magnification sensitivity of the objective lens has been adopted (refer to Japanese Unexamined Patent Application Publication No. 2008-4169).

However, on the other hand, if the incident magnification to the objective lens is changed in order to correct the spherical aberration caused by temperature change as described above, a problem arises in that the amount of comatic aberration, which is caused when the objective lens is tilted (inclined), significantly changes. Hereinafter, in order to represent the sensitivity of comatic aberration caused relative to the tilt, an amount of 3rd order comatic aberration, which is caused when the objective lens is tilted by 1 degree, is referred to as "lens tilt sensitivity".

Some recent optical pickups are configured so that the objective lens can be tilted in a radial direction of an optical disk in order to cancel a comatic aberration caused in accordance with deformation of the optical disk and the like.

However, in a case where the lens tilt sensitivity is excessively high, signal deterioration tends to occur by slight tilt of the objective lens in accordance with changes of the incident magnification of the objective lens due to temperature change. Thus, the allowance of the lens tilt to external disturbance is lowered, and durability to perturbation is also lowered. Hence this case is not desirable. Specifically, there was a problem in that comatic aberration fluctuates significantly when the relative tilt state between the objective lens and the optical disk at the position in a tracking direction fluctuates in accordance with fluctuation in the tilt direction of the objective lens and deformation of the optical disk.

As described above, when a plastic objective lens is used, there is a problem in that the remaining or fluctuation of comatic aberration caused by fluctuation of the lens tilt sensitivity deteriorates various signals. Therefore, there is a problem in that deterioration is caused in recording and reproducing characteristics.

SUMMARY OF THE INVENTION

It is desirable to provide an objective lens capable of improving mass productivity and achieving weight saving while enabling compensation of comatic aberration and achieving favorable recording and reproducing characteristics in a way that the objective lens constituting an optical pickup is made of plastic even when environmental temperature varies. In addition, it is also desirable to provide an optical pickup and an optical disk apparatus using the same.

According to an embodiment of the invention, a plastic objective lens is configured to collect a light beam with at least a wavelength λ on a recording layer of an optical disk and is used in an optical pickup for recording and/or reproducing an information signal by illuminating a light beam on the optical disk having one or a plurality of recording layers in an incident direction of the light beam. Here, assumption is as follows: an amount of 3rd order comatic aberration [λrms], which is caused when the objective lens is tilted by 1 degree, is a lens tilt sensitivity; the lens tilt sensitivity at an image height sensitivity of 0 is positive; an environment in which a temperature range is 0° C. to 70° C. and a range of the wavelength λ of the light beam is 400 to 410 nm; a maximum lens tilt sensitivity at an n-th layer is $\Delta W_{LT\_Max\_Ln}$; a minimum lens tilt sensitivity is $\Delta W_{LT\_Min\_Ln}$; f is a focal length [mm] of the objective lens at the wavelength λ; and $\Delta t_{L0-Ln}$ is a through-thickness distance [mm], at which a thickness of a cover layer is maximum, from a 0th layer to an n-th layer under the environment. Under this assumption, a numerical aperture NA at the wavelength λ satisfies the relationship of NA>0.8, and the relationships of the following Expressions (1) and (2) are satisfied in all the recording layers: $0.034 \cdot f \leq \Delta W_{LT\_Max\_Ln} \leq 0.25 + 2.0 \cdot \Delta t_{L0-Ln}$, and $-0.053 \cdot f \leq \Delta W_{LT\_Min\_Ln} \leq 0.25 + 2.0 \cdot \Delta t_{L0-Ln} - 0.068 \cdot f$.

According to another embodiment of the invention, an optical pickup includes: a plastic objective lens configured to collect a light beam, which is emitted from a light source, on a recording layer of an optical disk in order to perform recording and/or reproducing of information signals on the optical disk having one or a plurality of recording layers in an incident direction of the light beam. The optical pickup may use the objective lens mentioned above.

According to a further embodiment of the invention, an optical disk apparatus includes: an optical pickup including a plastic objective lens configured to collect a light beam, which is emitted from a light source, on a recording layer of an optical disk in order to perform recording and/or reproducing of information signal on the optical disk having one or a plurality of recording layers in an incident direction of the light beam. The optical disk apparatus may use the objective lens mentioned above.

In the embodiments of the invention, it is possible to improve mass productivity and achieve weight saving while compensating comatic aberration even when the environmental temperature varies in a way that the objective lens is made of plastic. Consequently, in the embodiments of the invention, it is possible to improve mass productivity and achieve weight saving while achieving favorable recording and reproducing characteristics by satisfactorily correcting aberrations.

BRIEF DESCRIPTION OF THE DRAWINGS

FIGS. 13A, 13B, 13C, and 13D are diagrams illustrating differences in comatic aberration cancellation effects in a case where the optical pickup is provided with one objective lens and in another case where the optical pickup is provided with two objective lenses, where FIG. 13A is a diagram illustrating comatic aberration, which is caused in the objective lens when the one objective lens is provided, and comatic aberration, which is caused in order to cancel the aberration by adjusting the tilt of the optical pickup and the like, FIG. 13B is a diagram illustrating the state, in which the comatic aberration is canceled by the tilt adjustment shown in FIG. 13A, FIG. 13C is a diagram illustrating a comatic aberration, which occurs in each objective lens when the two objective lenses are provided, and illustrating comatic aberration caused in order to cancel any one thereof by adjusting the tilt of the optical pickup and the like, and FIG. 13D is a diagram illustrating the state, in which the comatic aberration on the second optical disk (DVD) side is canceled by the tilt adjustment shown in FIG. 13B and the comatic aberration on the first optical disk (BD) side is increased;

FIGS. 15A, 15B, 15C, 15D, 15E, and 15F are diagrams illustrating the relationships among an image height characteristic, a lens tilt characteristic, and a disk tilt characteristic, where FIG. 15A is a diagram illustrating the image height characteristic obtained from the lens tilt characteristic shown in FIG. 15B and the disk tilt characteristic shown in FIG. 15C, and FIG. 15D is a diagram illustrating change in image height characteristic caused by change in lens tilt characteristic relative to FIG. 15A, and illustrating the image height characteristic obtained from the lens tilt characteristic shown in FIG. 15E and the disk tilt characteristic shown in FIG. 15F by changing the lens tilt characteristic;

FIG. 21A is a top plan view of the objective lens, and FIG. 21B is a sectional view of the objective lens.

FIG. 22A is a side view illustrating an exemplary light collecting optical device constituted by the objective lens, in which a diffractive portion is integrally formed on the incident side surface thereof, shown in FIGS. 21A and 21B, and FIG. 22B is a side view illustrating an exemplary light collecting optical device constituted by an objective lens and a diffractive optical element, which has a diffractive portion on the incident side surface thereof, instead of the objective lens shown in FIGS. 21A and 21B;

FIG. 23A is a diagram illustrating light beam tracing in an exemplary case where +1st order diffracted light of a light beam with a first wavelength is generated for a first optical disk, FIG. 23B is a diagram illustrating light beam tracing in an exemplary case where −1st order diffracted light of a light beam with a second wavelength is generated for a second optical disk, and FIG. 23C is a diagram illustrating light beam tracing in an exemplary case where −2nd order diffracted light of a light beam with a third wavelength is generated for a third optical disk;

DESCRIPTION OF THE PREFERRED EMBODIMENTS

Hereinafter, the preferred embodiments of the invention will be described in order of the following items.

1. Entire Configuration of Optical Disk Apparatus
2. Entire Configuration of Optical Pickup According to First Embodiment
3. Premise of Embodiments of the Invention and Summary of Principal Parts of Embodiments of the Invention
4. Regarding Correction of SA due to Temperature Characteristics and Tilt Sensitivity
5. Regarding Upper Limit of Lens Tilt Sensitivity of Objective Lens
6. Regarding Lower Limit of Lens Tilt Sensitivity of Objective Lens
7. Regarding Range of Lens Tilt Sensitivity of Three-wavelength compatible Objective Lens in Optical Pickup
8. Entire Configuration of Optical Pickup According to Second Embodiment
9. Regarding Range of Lens Tilt Sensitivity of Objective Lens Dedicated to High Density Recordable Optical Disk in Optical Pickup Having Two-Objective-Lens Configuration
10. Regarding Condition for Obtaining Optimum Lens Tilt Sensitivity
11. Regarding Diffractive Structure in Three-wavelength compatible Objective Lens
12. Regarding Example 1 (Example of Three-Wavelength Compatible Objective Lens)
13. Regarding Example 2 (Example of Two-Objective-Lens Configuration)
14. Regarding Example 3 (Modified Example 1 of Two-Objective-Lens Configuration)
15. Regarding Example 4 (Modified Example 2 of Two-Objective-Lens Configuration)
16. Regarding Objective Lens, Optical Pickup, Optical Disk Apparatus According to Embodiments of the Invention
1. Entire Configuration of Optical Disk Apparatus Hereinafter, an optical disk apparatus according to an embodiment of the invention will be described with reference to the accompanying drawings.

Figure 1:
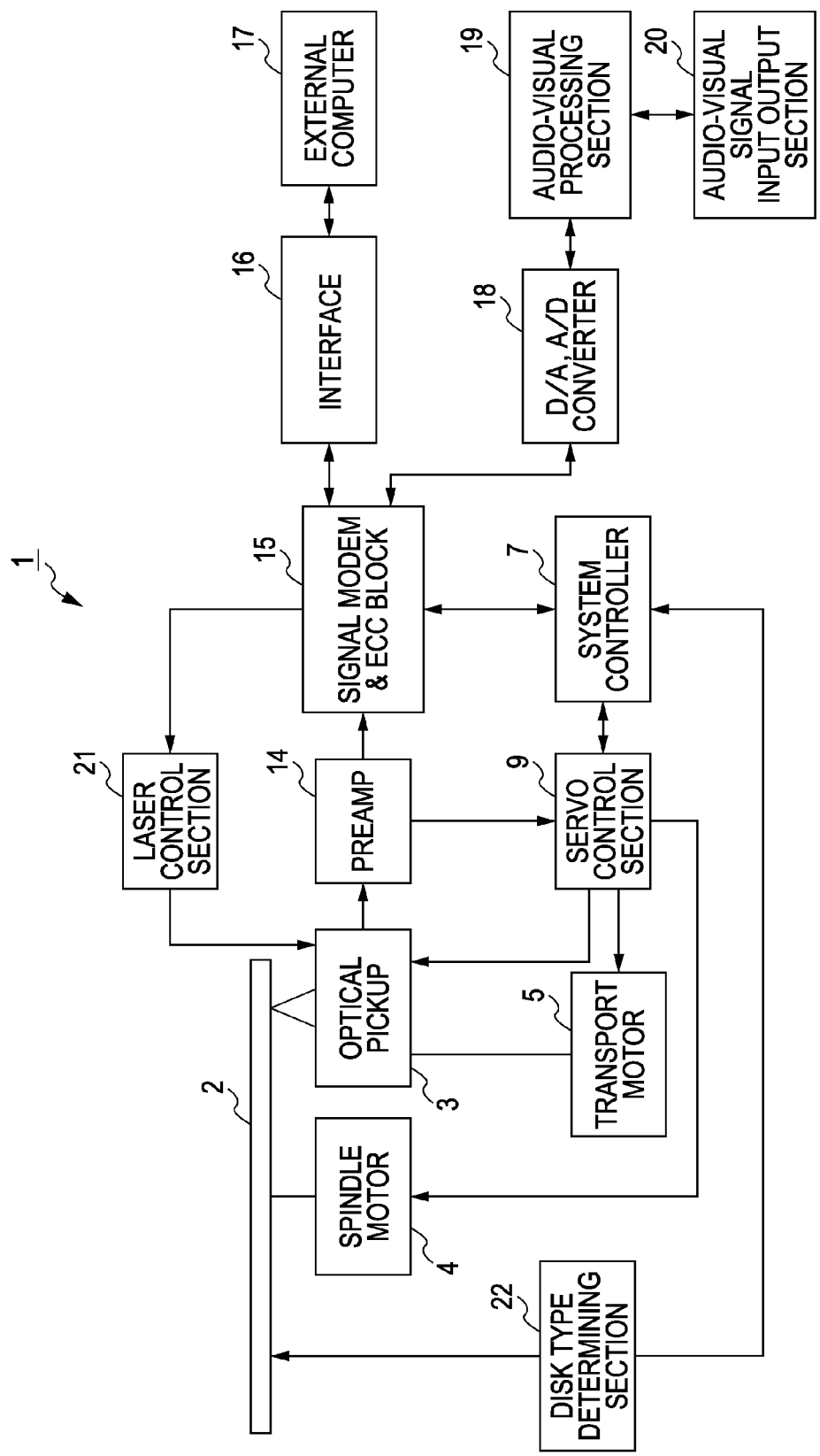
FIG. 1 is a block circuit diagram illustrating n optical disk apparatus according to an embodiment of the invention.

As shown in FIG. 1, an optical disk apparatus 1 according to an embodiment of the invention includes an optical pickup 3 that records and reproduces information on an optical disk 2, a spindle motor 4 that functions as a rotation-driving section for rotating the optical disk 2. Further, the optical disk apparatus 1 includes a transport motor 5 that moves the optical pickup 3 in the radial direction of the optical disk 2. The optical disk apparatus 1 supports three different standards for recording and/or reproducing information on optical disks having three different formats and optical disks having laminated recording layers.

The optical disk 2 used here is, for example, a first optical disk 11 of a high-density recordable type, such as a BD (Blu-ray Disc (registered trademark)), that allows high-density recording using a semiconductor laser with a short emission wavelength of approximately 405 nm(blue-violet) as a light source. The first optical disk 11 has a cover layer with a thickness of approximately 100 μm, and a light beam with a wavelength of approximately 405 nm is illuminated from the cover layer side. Furthermore, in the first optical disk, an optical disk (cover layer thickness: 100 μm) having a single recording layer and a so-called dual-layer optical disk having two recording layers can be used. However, an optical disk having a plurality of recording layers may be used. In the case of the dual-layer optical disk, a thickness of a cover layer of a recording layer L0 is set to approximately 100 μm, and a thickness of a cover layer of a recording layer L1 is set to approximately 75 μm.

Further, the optical disk 2 used here is, for example, a second optical disk 12 such as a DVD (Digital Versatile Disc), a DVD-R (Recordable), a DVD-RW (ReWritable), or a DVD+RW (ReWritable) using a semiconductor laser with an emission wavelength of approximately 665 nm (blue-violet) as a light source. The second optical disk 12 has a cover layer with a thickness of approximately 0.6 mm, and a light beam with a wavelength of approximately 655 nm is illuminated from the cover layer side. In the second optical disk 12, a plurality of recording layers may be provided.

Furthermore, the optical disk 2 used here is, for example, a third optical disk 13 such as a CD (Compact Disc), a CD-R (Recordable), or a CD-RW (ReWritable) using a semiconductor laser with an emission wavelength of approximately 785 nm as a light source. The third optical disk 13 has a cover layer with a thickness of approximately 1.2 mm, and a light beam with a wavelength of approximately 785 nm is illuminated from the cover layer side.

Furthermore, if not otherwise specified, hereinafter the first to third optical disks 11, 12, and 13 are simply referred to as the optical disk 2.

In the optical disk apparatus 1, a servo control section 9 controls the spindle motor 4 and the transport motor 5 to be driven in accordance with the type of the disk. For example, with such a configuration, the spindle motor 4 drives the first optical disk 11, second optical disk 12, and third optical disk 13 at predetermined revolutions.

The optical pickup 3 includes a three-wavelength compatible optical system. The optical pickup 3 emits light beams having different wavelengths to the recording layers of the optical disks conforming to different standards and detects the reflected light beams from the recording layer.

The optical disk apparatus 1 includes a preamp 14 that generates a focus error signal, a tracking error signal, an RF signal on the signal output from the optical pickup 3. Further, the optical disk apparatus 1 includes signal modem and error correction code block 15 (hereinafter, referred to as a signal modem & ECC block) that demodulates the signals received from the preamp 14 or modulates signals received from an external computer 17. Further, the optical disk apparatus 1 includes an interface 16, a D/A, A/D converter 18, an audio-visual processing section 19, and an audio-visual signal input output section 20.

The preamp 14 generates the focus error signal in an astigmatism method and the tracking error signal in a 3-beam method, a DPD method, and a DPP method, on the basis of the output from the optical detector of the optical pickup 3. Further, the preamp 14 generates the RF signal, and outputs the RF signal to the signal modem & ECC block 15. Further, the preamp 14 outputs the focus error signal and the tracking error signal to the servo control section 9.

The signal modem & ECC block 15 performs the following processes on digital signals input from the interface 16 or the D/A, A/D converter 18 when data is recorded on the first optical disk 11. That is, at the time of recording data on the first optical disk 11, the signal modem & ECC block 15 performs error correction processing in an error correction method such as an LDC-ECC, a BIS, or the like on the input digital signals. Then, the signal modem & ECC block 15 performs modulation processing such as a 1-7PP method or the like. Further, at the time of recording data on the second optical disk 12, the signal modem & ECC block 15 performs error correction processing in an error correction method such as a PC (Product Code) or the like, and then performs modulation processing such as 8-16 modulation or the like. At the time of recording data on the third optical disk 13, the signal modem & ECC block 15 performs error correction processing in an error correction method such as a CIRC or the like, and then performs modulation processing such as 8-14 modulation or the like. The signal modem & ECC block 15 then outputs the modulated data to a laser control section 21. Further, at the time of reproducing each of the optical disks, the signal modem & ECC block 15 performs demodulation processing according to the modulation methods on the basis of the RF signals input from the preamp 14. Further, the signal modem & ECC block 15 performs error correction processing, and outputs the data to the interface 16 or the D/A, A/D converter 18.

Furthermore, when compressing and recording data, a compression/decompression section may be provided between the signal modem & ECC block 15 and the interface 16 or D/A, A/D converter 18. In this case, the data is compressed with a method such as MPEG2 or MPEG4.

The servo control section 9 receives input of the focus error signals and the tracking error signals from the preamp 14. The servo control section 9 generates focus servo signals and tracking servo signals such that the focus error signals and tracking error signals become 0, and drives to control an objective lens driving section, such as a triaxial actuator or the like for driving the objective lens, on the basis of the servo signals. Also, the servo control section 9 detects a synchronizing signal and the like from the output from the preamp 14, and controls the spindle motor in a method of a CLV (Constant Linear Velocity), a CAV (Constant Angular Velocity), a combination thereof, or the like.

The laser control section 21 controls the laser source of the optical pickup 3. Particularly, in this specific example, the laser control section 21 performs control so as to make the output powers of the laser light source different between the recording mode and the reproducing mode. The laser control section 21 performs control so as to make the output power of the laser light source different in accordance with the type of the optical disk 2. The laser control section 21 switches the laser light source of the optical pickup 3 in accordance with the type of the optical disk 2 detected by a disk type determining section 22.

The disk type determining section 22 is configured to detect the different formats of the optical disk 2 by detecting change in the amount of reflected light based on the surface reflectance between the first to third optical disks 11, 12, and 13, differences in shape and outward shape, and the like.

The respective blocks constituting the optical disk apparatus 1 are configured to be able to perform signal processing based on the specification of the optical disk 2 which has been mounted thereon, in accordance with the detection results of the disk type determining section 22.

The system controller 7 controls the entire device in accordance with the type of the optical disk determined by the disk type determining section 22. Further, the system controller 7 controls the respective sections on the basis of on address information or table of contents (TOC) recorded in a premastered pit, a groove, or the like provided on the innermost periphery of the optical disk, in accordance with the operation input from a user. That is, the system controller 7 specifies the recording position or reproducing position of the optical disk to be recorded or reproduced on the basis of the above-mentioned information, and controls the respective sections on the basis of the specified position.

The optical disk apparatus 1 configured as described above operates to rotate the optical disk 2 by the spindle motor 4. Then, the optical disk apparatus 1 controls the transport motor 5 in accordance with the control signal from the servo control section 9, and moves the optical pickup 3 to the position corresponding to a desired recording track of the optical disk 2, thereby performing recording/reproducing of information on the optical disk 2.

Specifically, when the optical disk apparatus 1 performs recording and reproducing, the servo control section 9 rotates the optical disk 2 in a method of the CAV, the CLV or the combination thereof. The optical pickup 3 illuminates a light beam from the light source to detect the returning light beam from the optical disk 2 by detector, thereby generating the focus error signal and the tracking error signal. Further, the optical pickup 3 drives the objective lens by an objective lens driving section on the basis of these focus error signal and tracking error signal, thereby performing focus servo and tracking servo.

When the optical disk apparatus 1 performs recording, signals from an external computer 17 are input to the signal modem & ECC block 15 via the interface 16. The signal modem & ECC block 15 adds the above-described predetermined error correction code to the digital data which is input from the interface 16 or the D/A, A/D converter 18, performs predetermined modulation processing, and subsequently generates a recording signal. The laser control section 21 controls the laser light source of the optical pickup 3 on the basis of the recording signal which is generated by the signal modem & ECC block 15, and records on a predetermined optical disk.

When the optical disk apparatus 1 reproduces the information recorded on the optical disk 2, the signal modem & ECC block 15 performs the demodulation processing on a signal which is detected by the optical detector. When the recording signal demodulated by the signal modem & ECC block 15 is for data storage of the computer, the recording signal is output to the external computer 17 through the interface 16. Thereby, the external computer 17 is able to operate on the basis of the signal which is recorded on the optical disk 2. Further, when the recording signal demodulated by the signal modem & ECC block 15 is for audio visual, the recording signal is subjected to digital-to-analog conversion by the D/A, A/D converter 18, and is supplied to the audio-visual processing section 19. Subsequently, the recording signal is subjected to audio-visual processing by the audio-visual processing section 19, and is output to an external speaker or monitor, which is not shown in the drawing, through the audio-visual signal input output section 20.

2. Entire Configuration of Optical Pickup

Next, the optical pickup 3, which is used in the above-mentioned optical disk apparatus 1, according to a first embodiment of the invention will be described with reference to FIG. 2. The optical pickup 3 is an optical pickup having a so-called one-objective-lens configuration in which one objective lens is provided. Description will be given below under the assumption that the optical pickup 3 is a three-wavelength compatible optical pickup, which has a three-wavelength compatible objective lens, for performing recording and reproducing on the first to third optical disks for which different wavelengths are used.

Figure 2:
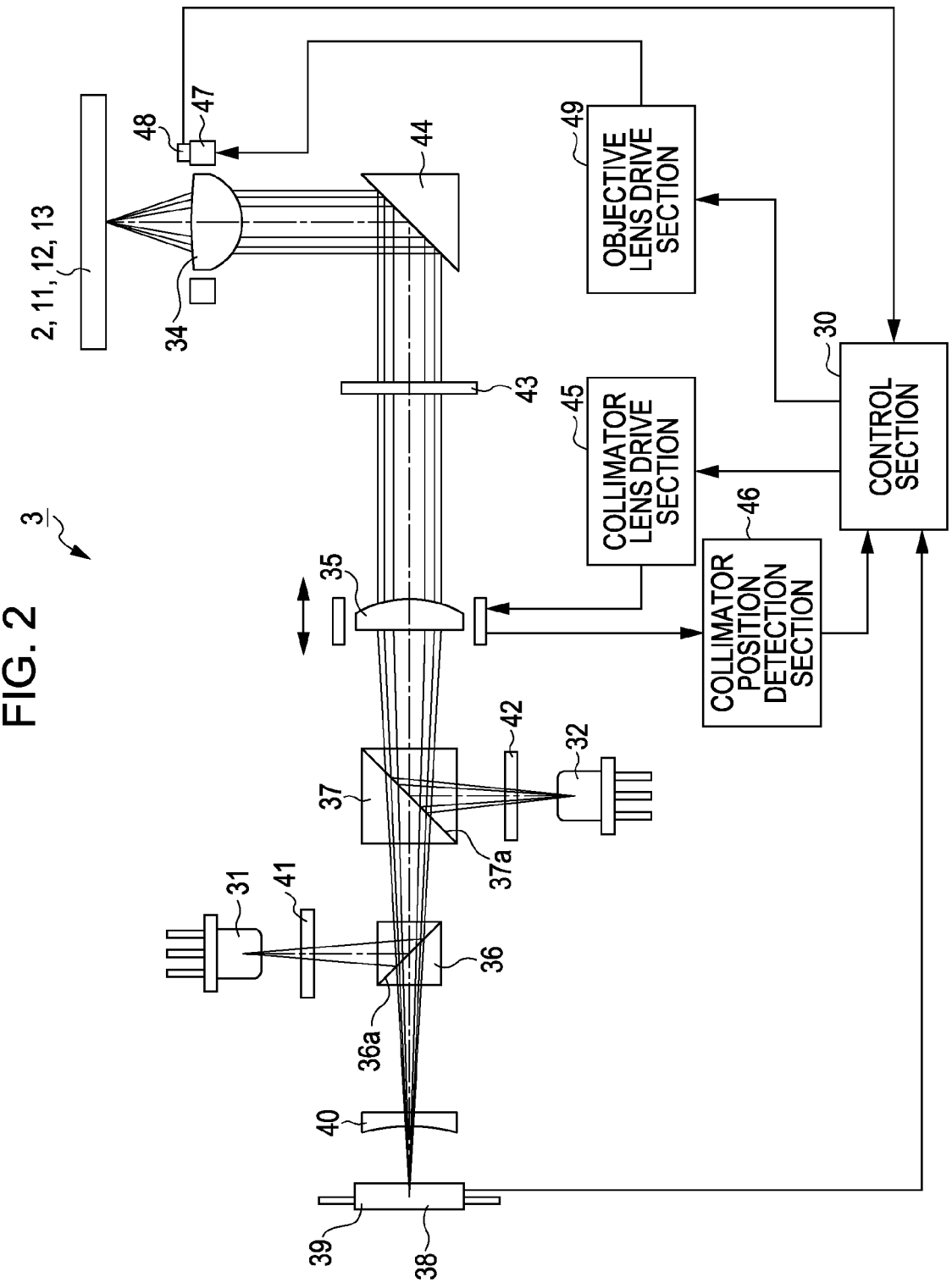
FIG. 2 is an optical path diagram illustrating an optical system of an optical pickup according to a first embodiment of the invention.

As shown in FIG. 2, the optical pickup 3 according to the embodiment of the invention includes a first light source section 31 having a first emission portion for emitting a light beam with a first wavelength. The optical pickup 3 also includes a second light source section 32 having a second emission portion for emitting a light beam with a second wavelength longer than the first wavelength and a third emission portion for emitting a light beam with a third wavelength longer than the second wavelength. The optical pickup 3 also includes an objective lens 34 serving as a light collecting optical device for collecting light beams, which is emitted from the first to third emission portions, onto the signal recording face of an optical disk 2. The optical pickup 3 also includes a collimator lens 35 which is disposed on the optical path between the first to third emission portions and the objective lens 34, and is movable in the direction of the optical axis. The collimator lens 35 functions as a divergent angle changing element that changes angles of divergence of the light beams with first to third wavelengths, adjusts the angles so as to make the light beams be approximately parallel light or have a predetermined angle of divergence, and emits the light beams.

The optical pickup 3 also includes first and second beam splitters 36 and 37 functioning as optical path separating sections. The first and second beam splitters 36 and 37 are optical path separating sections for separating returning optical paths of the light beams from outgoing optical paths of the respective light beams emitted from the first to third emission portions. Here, the light beams in the returning optical paths means returning light beams with first to third wavelengths which are collected on the signal recording face of the optical disk 2 by the objective lens 34, and reflected on this signal recording face. Further, the optical pickup 3 includes an optical detector 39 having a common light receiving portion 38 for receiving the returning light beams with first to third wavelengths separated by the first and second beam splitters 36 and 37. The optical pickup 3 also includes a multi lens 40 which is provided between the first beam splitter 36 and light receiving portion 38. The multi lens 40 functions as a coupling lens for collecting the light beams with first to third wavelengths, which return from the first beam splitter 36, on the light receiving face of the light receiving portion 38.

The optical pickup 3 also includes a first grating 41 provided between the first emission portion of the first light source section 31 and the first beam splitter 36. The first grating 41 has a function of diffracting the light beam with first wavelength, which is emitted from the first emission portion, into three beams to detect the tracking error or the like. Further, the optical pickup 3 includes a second grating 42 provided between the second and third emission portions of the second light source section 32 and the second beam splitter 37. The second grating 42 has a function of diffracting the light beams with second and third wavelengths, which are emitted from the second and third emission portions, into three beams to detect the tracking error signal or the like.

Further, the optical pickup 3 includes a ¼ wavelength plate 43 which is provided between the collimator lens 35 and objective lens 34 and provides a phase difference with a ¼ wavelength to the input light beams with first to third wavelengths. In addition, the optical pickup 3 includes a redirecting mirror 44 provided between the objective lens 34 and the ¼ wavelength plate 43. The redirecting mirror 44 reflects and redirects the light beam passing through the above-mentioned optical components within a plane orthogonal to the optical axis of the objective lens 34, thereby emitting the light beam in the optical axes of the objective lens 34.

The first light source section 31 is formed as, for example, a semiconductor laser or the like, and includes the first emission portion for emitting the light beam with first wavelength, which is around 405 nm in design, to support the first optical disk 11. The second light source section 32 includes the second emission portion for emitting the light beam with second wavelength, which is around 655 nm in design, to support the second optical disk 12. Further, the second light source section 32 includes the third emission portion for emitting the light beam with third wavelength, which is around 785 nm in design, to support the third optical disk 13. In the second light source section 32, the second and third emission portions are disposed such that each emission point is disposed within the same pale orthogonal to the optical axes of the light beams with second and third wavelengths emitted from the second and third emission portions. Here, an arrangement has been made in which the first emission portion is disposed in the first light source section 31, and the second and third emission portions are disposed in the second light source section 32. However, the invention is not limited to this, and an arrangement may be made in which the first to third emission portions are disposed in separate light source sections, respectively. Further, an arrangement may be made in which the first and third emission portions are disposed at substantially the same position in the common light source section.

The first grating 41 is provided between the first light source section 31 and first beam splitter 36. The first grating 41 diffracts the light beam with first wavelength emitted from the first emission portion of the first light source section 31 into three beams to detect the tracking error signal or the like, and emits the beams to the first beam splitter 36 side.

The second grating 42 is provided between the second light source section 32 and second beam splitter 37. The second grating 42 diffracts the light beams with second and third wavelengths emitted from the second and third emission portions of the second light source section 32 into three beams to detect the tracking error signal or the like, and emits the beams to the second beam splitter 37 side. The second grating 42 is a so-called two-wavelength grating having wavelength dependence, and has a function of diffracting the light beams with second and third wavelengths into predetermined three beams.

The first beam splitter 36 includes a separating face 36a having the following functions. The separating face 36a has a function of reflecting the light beam with first wavelength diffracted and input at the first grating 41 to emit this to the second beam splitter 37 side, and also transmitting the returning light beams with first to third wavelengths to emit the beams to the multi lens 40 side. The separating face 36a is formed so as to have wavelength dependence, polarization dependence, and so forth, thereby exhibiting such a function. The first beam splitter 36 functions as an optical path separating section for separating the optical path of the returning light beam with first wavelength from the optical path of the outgoing light beam with first wavelength emitted from the first emission portion through the separating face 36a.

The second beam splitter 37 includes a synthetic separating face 37a having the following functions. The synthetic separating face 37a has a function of transmitting the outgoing light beam with first wavelength from the first beam splitter 36 to emit this to the collimator lens 35 side. Further, the synthetic separating face 37a has a function of reflecting the outgoing light beams with second and third wavelengths from the second grating 42 to emit the beams to the collimator lens 35 side. In addition, the synthetic separating face 37a has a function of transmitting the returning light beams with first to third wavelengths to emit the beams to the first beam splitter 36 side. The synthetic separating face 37a is formed so as to have wavelength dependence, polarization dependence, and so forth, thereby exhibiting such a function. The second beam splitter 37 functions as an optical path synthesizing section for synthesizing the optical path of the outgoing light beam with first wavelength, and the optical paths of the outgoing light beams with second and third wavelengths to guide this to the collimator lens 35 side through the synthetic separating face 37a. The second beam splitter 37 also functions as an optical path separating section for separating the optical paths of the returning light beams with second and third wavelengths from the optical paths of the outgoing light beams with second and third wavelengths emitted from the second and third emission portions through the synthetic separating face 37a.

In the optical pickup 3, an arrangement has been made here in which the first and second beam splitters 36 and 37 have a function as an optical path separating section, and the second beam splitter 37 has a function as an optical path synthesizing section, but the invention is not limited to this. That is, an arrangement may be made in which there are provided an optical path synthesizing section for synthesizing the optical paths of the outgoing light beams with first to third wavelengths. Anything can be used as the optical path separating section if only it is able to separate the optical paths of the returning light beams with first to third wavelengths from the optical paths of the outgoing light beams with first to third wavelengths to guide the beams to the light receiving portion 38 side.

The collimator lens 35, which is provided between the second beam splitter 37 and ¼ wavelength 43, and functions as a divergent angle changing section for changing the angles of divergence of the light beams transmitted therethrough. The collimator lens 35 changes the angles of divergence of the light beams, which are emitted from the light source sections 31 and 32 and incident thereto, into a desirable angle such as an angle of the substantially parallel light beam.

The collimator lens 35 is movable in order to correct spherical aberration caused by various factors such as an error in thickness of the cover layer and temperature change, and changes the angles of divergence of the light beams incident to the objective lens 34 in accordance with its position. Specifically, the collimator lens 35 is movable in the direction of the optical axis, and the optical pickup 3 is provided with a collimator lens drive section 45 for driving the collimator lens 35 to move in the direction of the optical axis. The collimator lens drive section 45 may move the collimator lens 35, for example, by allowing the transport motor to rotate a lead screw. Further, the collimator lens drive section 45 may move the collimator lens 35 by reaction of between a magnet and current flowing in a coil similarly to the objective lens drive section to be describe later. Furthermore, a linear motor may be used. The collimator lens 35 makes the beams incident to the objective lens 34 in a convergent light state, in which the beams are slightly converged rather than the parallel light beam, or in a divergent light state, in which the beams are slightly diverged, thereby reducing the caused spherical aberration. Furthermore, the optical pickup 3 may be configured to include a collimator position detection section 46 such as a position sensor for detecting a position of the collimator lens 35 which is moved by the collimator lens drive section 45.

When the optical pickup performs recording and/or reproducing the information signal on the optical disk having a plurality of recording layers, the collimator lens 35 is moved to an appropriate position for each recording layer on the basis of detection of surface reflectance change performed by focus search and readout identify signal. In this case, the collimator lens 35 is moved to the position corresponding to each recording layer, thereby reducing the spherical aberration caused by differences in thicknesses (referred to as a "cover layer thickness") from the respective recording layers to the light incident side surface of the optical disk. That is, the collimator lens 35 and the collimator lens drive section 45 are able to form appropriately respective beam spots of the respective light beams corresponding to the plurality of recording layers. As describe above, by driving the collimator lens 35 and the like in the direction of the optical axis, a magnification of the light beam incident to the objective lens 34 is changed. In such a manner, it is possible to reduce the spherical aberration caused by temperature change or change in the cover layer thickness. As a result, it is possible to form appropriate beam spots. Here, the incident magnification of the light beam to the objective lens 34 is a magnification defined by S'/S. S is a distance from the object point to the object side principal surface of the objective lens 34 in the direction of the optical axis, and S' is a distance from the image side principal surface of the objective lens 34 to the image point in the direction of the optical axis.

As described above, the collimator lens 35 and the collimator lens drive section 45 function as an incident magnification varying section for changing the magnification of the light beam incident to the objective lens 34. Here, the incident magnification varying section constituting the optical pickup 3 according to the embodiment of the invention is not limited to this, but may employ a so-called beam expander or a liquid crystal device.

The ¼ wavelength plate 43 adds a ¼-wavelength phase to the outgoing light beams with first to third wavelengths of which the angles of divergence have been changed by the collimator lens 35, thereby emitting the light beams to the redirecting mirror 44 side in a circular polarized state changed from a linear polarized state. Further, the ¼ wavelength plate 43 adds a ¼-wavelength phase to the light beams, which return from the redirecting mirror 44, with first to third wavelengths, thereby emitting the light beams to the collimator lens 35 side in a linear polarized state changed from a circular polarized state.

The redirecting mirror 44 reflects the light beams, to which a ¼-wavelength phase difference has been added by the ¼ wavelength plate 43, and emits the light beams to the objective lens 34 side.

The objective lens 34 collects the input light beams with first to third wavelengths, which have the angles of divergence changed by the collimator lens 35 and are incident through the ¼ wavelength plate 43 and the redirecting mirror 44, on the signal recording face of the optical disk 2. In other words, the objective lens 34 is an object lens, which is used in the optical pickup for performing recording and/or reproducing on the first to third optical disks, with three-wavelength compatibility capable of collecting the light beams with first to third wavelengths corresponding to the optical disks on the recording layers of the respective optical disks. On the incident side of the objective lens 34, an aperture diaphragm is provided, and the aperture diaphragm performs aperture restriction so as to make a numerical aperture of the light beam incident to the objective lens 34 equal to a desirable numerical aperture. Specifically, the aperture restriction is performed such that the numerical aperture is for example NA of around 0.85 at the first wavelength, for example NA of around 0.60 at the second wavelength, and for example NA of around 0.45 at the third wavelength. Further, on the incident side or exit side surface of the objective lens 34, there may be provided a diffractive portion for achieving the three-wavelength compatibility based on a common objective lens.

The objective lens 34 is held by a lens holder 47. The lens holder 47 is supported at a fixing portion by a suspension so as to be movable in a tracking direction or a focus direction. The lens holder 47 is provided with a temperature detection element 48 in the vicinity of the objective lens 34. The temperature detection element 48 is a CMOS temperature sensor IC, a thermistor, or the like, and linearly changes an output voltage (a temperature signal) in response to temperature change. Thereby, the temperature detection element 48 detects a temperature of the objective lens 34 or a temperature around the objective lens 34. Furthermore, the temperature detection element 48 is used to detect the change in spherical aberration and the like accompanied with temperature change of the objective lens 34. Hence, if only it is possible to detect the temperature of the objective lens 34 or the temperature near the objective lens 34, the attaching position is not limited to the lens holder 47.

The objective lens 34 is movably held by the objective lens drive section 49 provided in the optical pickup 3. The objective lens 34 is movable by using the objective lens drive section 49 on the basis of the tracking error signal and focus error signal generated by the returning light, which is detected by the optical detector 39, from the optical disk 2. Thereby, the objective lens 34 is moved in directions of two axes of a direction (a focus direction), in which the lens approaches and separates to and from the optical disk 2, and a radial direction (a tracking direction) of the optical disk 2. The objective lens 34 collects the light beams emitted from the first to third emission portions so that the light beams are focused onto the recording surface of the optical disk 2 all the time, and makes the collected light beams follow the recording track formed on the recording surface of the optical disk 2. Further, the objective lens 34 is able to tilt not only in the above-mentioned directions of two axes but also in a tilt direction of the objective lens 34, and is tilted by the objective lens drive section 49 in the tilt direction on the basis of the RF signal detected by the optical detector 39. As described above, the objective lens drive section 49 is a so-called triaxial actuator for driving the objective lens 34 in the focus direction, the tracking direction, and the tilt direction. With such a configuration, by tilting the objective lens 34 in the tilt direction, it is possible to reduce comatic aberration.

Figure 3:
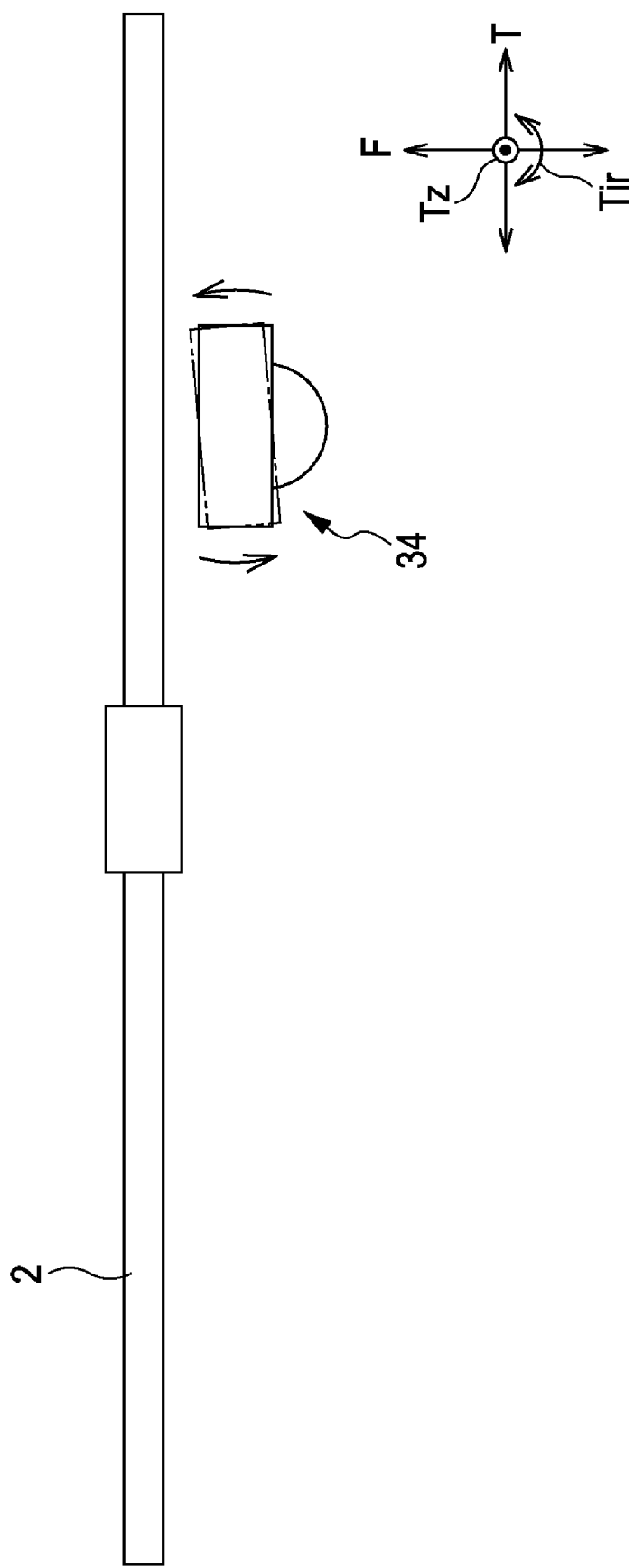
FIG. 3 is a schematic diagram illustrating 3-axis directions, in which the objective lens constituting the optical pickup is driven and operated, and illustrating a relationship between the objective lens and the optical disk.

Here, the tilt direction means, as shown in FIG. 3, a so-called radial tilt direction Tir which is a direction of rotation about the axis of the tangential direction Tz orthogonal to the above-mentioned focus direction F and tracking direction T, but the invention is not limited to this. That is, the objective lens 34 may be configured to be driven in a so-called tangential tilt direction which is a direction of rotation about the axis of the tracking direction. Further, the objective lens 34 may be configured to be driven in directions of four axes that enable the drive in the radial tilt direction and the tangential tilt direction. As described above, in the case of the configuration that enables the drive in the tangential tilt direction, due to the effects of the objective lens 34 to be described later, it is possible to satisfactorily decrease comatic aberration in the tangential tilt direction regardless of temperature change.

The objective lens drive section 49 includes the fixing portion and the lens holder 47 holding the objective lens 34 and serving as a movable portion which is movable relative to the fixing portion, and includes magnets and coils for generating driving forces in driving directions. Further, the objective lens drive section 49 may be the above-mentioned suspension supporting type, and may be a spindle-contact type which is mounted to be rotatable about the spindle of the fixing portion. The objective lens drive section 49 includes a magnet and a focus coil for generating a driving force in the focus direction, a magnet and a tracking coil for generating a driving force in the tracking direction, and a magnet and a tilt coil for generating a driving force in the tilt direction. Here, without the magnet and the tilt coil for the tilt provided separately, the driving force may be generated in the tilt direction by applying differences in driving forces, which are generated in the focus coil arranged in the tracking direction or the tangential direction, to the focus coils.

The objective lens 34 is a single element objective lens which has a numerical aperture (NA) of around 0.85 and is made of plastic. Since the objective lens 34 is made of plastic, it is possible to achieve mass productivity and weight saving as compared with the glass lens.

In the objective lens 34, change in the cover layer thickness of the optical disk 2 may be caused by a manufacturing error and switching of the recording layers, and change in the environmental temperature may be caused. In this case, by moving the collimator lens 35 in the direction of the optical axis and changing the incident magnification to the objective lens 34, spherical aberration is corrected, that is, reduced.

Further, in the objective lens 34, the cover layer thickness and the environmental temperature may be changed, and the incident magnification of the light beam may be changed in accordance with the change in environmental temperature. In this case, by allowing the control section 30, which will be described later, to control the objective lens and allowing the objective lens drive section 49 to tilt the objective lens in the tilt direction, comatic aberration is canceled.

The objective lens 34 is configured such that the maximum lens tilt sensitivity and the minimum lens tilt sensitivity for each recording layer in an environmental temperature range in use of the optical pickup 3 is in the following predetermined range. The use environment is that a temperature range is 0° C. to 70° C., and a wavelength range of the light beam is λ=400 to 410 nm. Here, the lens tilt sensitivity is defined as a ratio of comatic aberration to the tilt angle of lens, that is, an amount of 3rd order comatic aberration [λrms] caused when the objective lens is inclined (tilted) by only 1 degree. Further, regarding a polarity of the lens tilt coma sensitivity, it is defined that the lens tilt sensitivity of the lens whose image height sensitivity is 0 is positive. In other words, an algebraic sign of the lens tilt sensitivity is determined relative to the relationship with the disk tilt sensitivity, and is defined such that amounts of comatic aberration caused when the optical disk and the objective lens are tilted in the same direction have difference algebraic signs respectively. Specifically, in the objective lens 34, assuming that the maximum lens tilt sensitivity at the n-th layer is $\Delta W_{LT\_Max\_Ln}$ under the use environment, the relational expression of $0.034 \cdot f \leq \Delta W_{LT\_Max\_Ln} \leq 0.25 + 2.0 \cdot \Delta t_{L0-Ln}$ is satisfied in each layer. Further, assuming that the minimum lens tilt sensitivity at the n-th layer is $\Delta W_{LT\_Min\_Ln}$ under the use environment, the relational expression of $-0.053 \cdot f \leq \Delta W_{LT\_Min\_Ln} 0.25 + 2.0 \cdot \Delta t_{L0-Ln} - 0.068 \cdot f$ is satisfied in each layer. Here, regarding n, n=0 in a case of a single layer optical disk having one recording layer, n=0, 1 in a case of dual-layer optical disk having two recording layers, and n=0, 1, . . . , N−1 in a case of a multi-layer optical disk having a N recording layers. Hereinafter, description will be given under assumption that, in the multi-layer optical disk including two layers, a recording layer, of which a cover layer thickness is the maximum, is 0th layer, and the layers are referenced in order from the 0th layer, the 1st layer, and the 2nd layer toward the surface side. In addition, in the relational expressions, f is defined as a focal length [mm] of the objective lens at the wavelength λ, and $\Delta t_{L0-Ln}$ is defined as a through-thickness distance [mm], at which a thickness of the cover layer is the maximum, from the 0th layer to the n-th layer.

By satisfying the relational expressions, the objective lens 34 according to the embodiment of the invention is able to compensate comatic aberration even when the incident magnification is changed in accordance with temperature change and the like, and achieve favorable recording and reproducing characteristics. The relational expressions and the effects thereof will be described later in detail with reference to the following sections 5 to 7.

Furthermore, the objective lens 34 is configured such that, in a environment-basis state, the lens tilt sensitivity for each recording layer is within the following predetermined range. The environment-basis state is that a temperature is 35° C., and a wavelength λ of the light beam is 405 nm. Specifically, in the objective lens 34, assuming that the lens tilt sensitivity at the n-th layer is $\Delta W_{LT\_Ln\_TYP}$ under the environment-basis state, the relational expression of $-0.01 + 2.0 \cdot \Delta t_{L0-Ln} \leq \Delta W_{LT\_Ln\_TYP} \leq 0.04 + 2.0 \cdot \Delta t_{L0-Ln}$ is satisfied in each layer.

In the objective lens 34, which satisfies the relational expression, according to the embodiment of the invention, by setting an appropriate lens tilt sensitivity on the basis in which the image height characteristics are considered, the following effects are obtained. That is, the objective lens 34 is able to compensate comatic aberration even when the incident magnification is changed in accordance with temperature change and the like, and further reduce an amount of comatic aberration in the use environment range. Thereby, the objective lens 34 achieves further favorable recording and reproducing characteristics. The relational expressions and the effects thereof will be described later in detail with reference to the following section 10.

In addition, the objective lens 34 may be configured to satisfy the following range. In this case, the objective lens 34 can be used in an optical pickup having a two-objective-lens configuration in which two objective lenses are provided. As a condition therefor, it is necessary that the maximum lens tilt sensitivity $\Delta W_{LT\_Max\_Ln}$ at the n-th layer under the above-mentioned use environment satisfies the relational expression of $0.034 \cdot f \leq \Delta W_{LT\_Max\_Ln} \leq 0.15 + 2.0 \cdot \Delta t_{L0-Ln}$ in each layer. It is also necessary that the minimum lens tilt sensitivity $\Delta W_{LT\_Min\_Ln}$ at the n-th layer under the above-mentioned use environment satisfies the relational expression of $-0.053 \cdot f \leq \Delta W_{LT\_Min\_Ln} \leq 0.15 + 2.0 \cdot \Delta t_{L0-Ln} - 0.068 \cdot f$ in each layer. By satisfying the relational expressions, the objective lens 24 according to the embodiment of the invention is able to compensate comatic aberration even when the incident magnification is changed in accordance with temperature change and the like, and achieve favorable recording and reproducing characteristics. In addition, the objective lens can be used in the optical pickup having two objective lenses. The configuration of the optical pickup having the two-objective-lens configuration, the relational expressions and the effects thereof will be described later in detail with reference to the following sections 8 and 9.

Furthermore, the objective lens 34 described here satisfactorily collects the light beams with first to third wavelengths on the recording layers of the optical disks having different cover layer thicknesses in order to corresponding to the first to third optical disks 11, 12, and 13, but the invention is not limited to this. For example, it may be possible to adopt a configuration in which the objective lens 34 may be used as an objective lens dedicated to the first optical disk so as to collect satisfactorily the light beam with first wavelength on the first optical disk 11. This means that the objective lens 34 may be used as an objective lens, which is dedicated to the first optical disk, of the two objective lenses provided in the optical pickup for achieving the three-wavelength compatibility as described above. This also means that the objective lens 34 may be provided in the optical pickup dedicated to the first optical disk.

The multi lens 40 is disposed on the optical path between the first beam splitter 36 and light receiving portion 38, and for example, has a refractive surface, thereby obtaining the following effects. The multi lens 40 adds a predetermined magnification and a refractive power to the incident light beams, and appropriately collects the beams on the light receiving surface of the light receiving portion 38 such as the photodetector of the optical detector 39 or the like. The multi lens 40 functions as an element for changing the angles of divergence in order to collect the returning light beams with the respective wavelengths incident thereto on the common light receiving portion 38, thereby exhibiting a divergent angle changing function.

The optical detector 39 has the light receiving portion 38 formed of light receiving elements such as photodetectors or the like, and receives the returning light beams with first to third wavelengths, which are collected by the multi lens 40, in the common light receiving portion 38. With such a configuration, the optical detector 39 outputs the information signal (the RF signal) to the preamp 14, and detects various signals such as the tracking error signal and the focus error signal, thereby outputting the signals to the servo control section 9.

The optical pickup 3 configured as described above drives to move the objective lens 34 on the basis of the focus error signal and tracking error signal generated from the returning light detected by the optical detector 39, thereby performing the focus servo and the tracking servo. In the optical pickup 3, the objective lens 34 is driven to be moved to the focusing position on the signal recording face of the optical disk 2, and the light beam is focused on the signal recording face of the optical disk 2, thereby recording or reproducing the information signal on the optical disk 2. The optical pickup 3 is able to reduce comatic aberration caused by deformation of the optical disk and the like by allowing objective lens drive section 49 to tilt the objective lens 34 in the tilt direction. With such a configuration, the optical pickup 3 and the optical disk apparatus 1 using the same have favorable recording and reproducing characteristics.

When the numerical aperture of the lens for BD is set to be high similarly to the objective lens 34, there is a large amount of spherical aberration caused by change in cover layer thickness resulting from switching of the recording layers and a thickness error of the cover layer. Further, since the material of the objective lens 34 is changed from glass to plastic, temperature dependence of refractive index is high, and thus the amount of spherical aberration caused by the temperature change is also large. In order to correct the spherical aberration, it is necessary to change the incident magnification of the light beam incident to the objective lens 34. Accordingly, the lens tilt sensitivity is also changed by the change in incident magnification. As a result, a tilt correction value of the objective lens 34 is deviated from the optimum value thereof.

The optical pickup 3 according to the embodiment of the invention includes a control section 30 that performs calculation for adjusting the position of the collimator lens 35 and the tilt of the objective lens 34 in accordance with temperature change. The control section 30 receives an input of the RF signal from the optical detector 39, and receives an input of the temperature signal as to temperature from the temperature detection element 48. The control section 30 monitors amounts of jitter of the input temperature signal and RF signal, drives the collimator lens drive section 45, moves the collimator lens 35 in the direction of the optical axis, thereby performing spherical aberration correction. Further, the control section 30 drives the objective lens drive section 49 to tilt the objective lens 34 so as to make the signal, which is detected by the optical detector 39, desirable, thereby performing comatic aberration correction.

Further, in the optical pickup 3, the control section 30 functions as a lens tilt sensitivity detection section for detecting the lens tilt sensitivity of the objective lens 34. The control section 30 as a lens tilt sensitivity detection section detects the lens tilt sensitivity at the present temperature on the basis of the signal detected by the temperature detection element 48. Here, the lens tilt sensitivity is a value uniquely determined for each temperature on the basis of a refractive index of a component material and a shape of the objective lens 34. The lens tilt sensitivity is determined by the relationship between the lens tilt sensitivity and temperature and the temperature based on the signal which is detected by the temperature detection element 48.

Here, the lens tilt sensitivity is detected by the control section 30 on the basis of the temperature which is detected by the temperature detection element 48, but the invention is not limited to this. That is, the control section 30 may detect the lens tilt sensitivity on the basis of the position of the collimator lens 35 detected by the collimator position detection section 46. In this case, the lens tilt sensitivity is determined by the relationship between the lens tilt sensitivity and the incident magnification of the light beam incident to the objective lens 34 and the position of the collimator lens 35 based on the signal detected by the collimator position detection section 46. This is based on the fact that the relationship between the position of the collimator lens 35 and the incident magnification is uniquely determined, and the incident magnification for correcting spherical aberration is uniquely determined in accordance with temperature change. When the detection result of the collimator position detection section 46 is used, the above-mentioned temperature detection element 48 may not be provided. Furthermore, when the detection result of the collimator position detection section 46 is used in detection of the lens tilt sensitivity, and in the case of the multi-layer optical disk, the lens tilt sensitivity may be detected on the basis of the relationship between the lens tilt sensitivity and the incident magnification for each recording layer. The reason is that the recording layers of the multi-layer optical disk have cover layer thicknesses different from each other and thus the positions of the collimator lens 35 for making respective spherical aberrations appropriate are different. As a result, by using the relationship for each recording layer, it is possible to reduce comatic aberration further satisfactorily.

Next, ranges of the lens tilt sensitivity of the objective lens 34 constituting the optical pickup 3 and the objective lens 134A constituting the optical pickup 103 to be described later will be described. However, ahead of the description, summary of the principal parts of the embodiment of the invention and the like will be described in detail.

3. Premise of Embodiments of the Invention and Summary of Principal Parts of Embodiments of the Invention Ahead of description of the following sections 4 to 10, simple summary of the embodiments is described herein. First, a method of using a general plastic lens is studied. In a plastic lens, when a temperature is change as described above, large spherical aberration occurs. In order to eliminate spherical aberration, the above-mentioned method is effective in which the collimator lens drive section 45 moves the collimator lens 35 in accordance with temperature.

When spherical aberration is canceled in such a manner, a divergent state of the light beam incident to the objective lens is changed, and thus the incident magnification is fluctuated. As described above, when the incident magnification is fluctuated, comatic aberration, which is caused when the objective lens is tilted, is fluctuated, thereby fluctuating the lens tilt sensitivity. In addition, when there is no problem in the lens tilt sensitivity in design, in the lens tilt sensitivity at the time of fluctuation, there is concern about deterioration in signal quality at the time of reading signals. Consequently, in order to utilize the plastic objective lens, it is necessary for the lens tilt sensitivity under use environment to be within a certain range. Hereinafter, a method of defining the range will be described.

Figure 4:
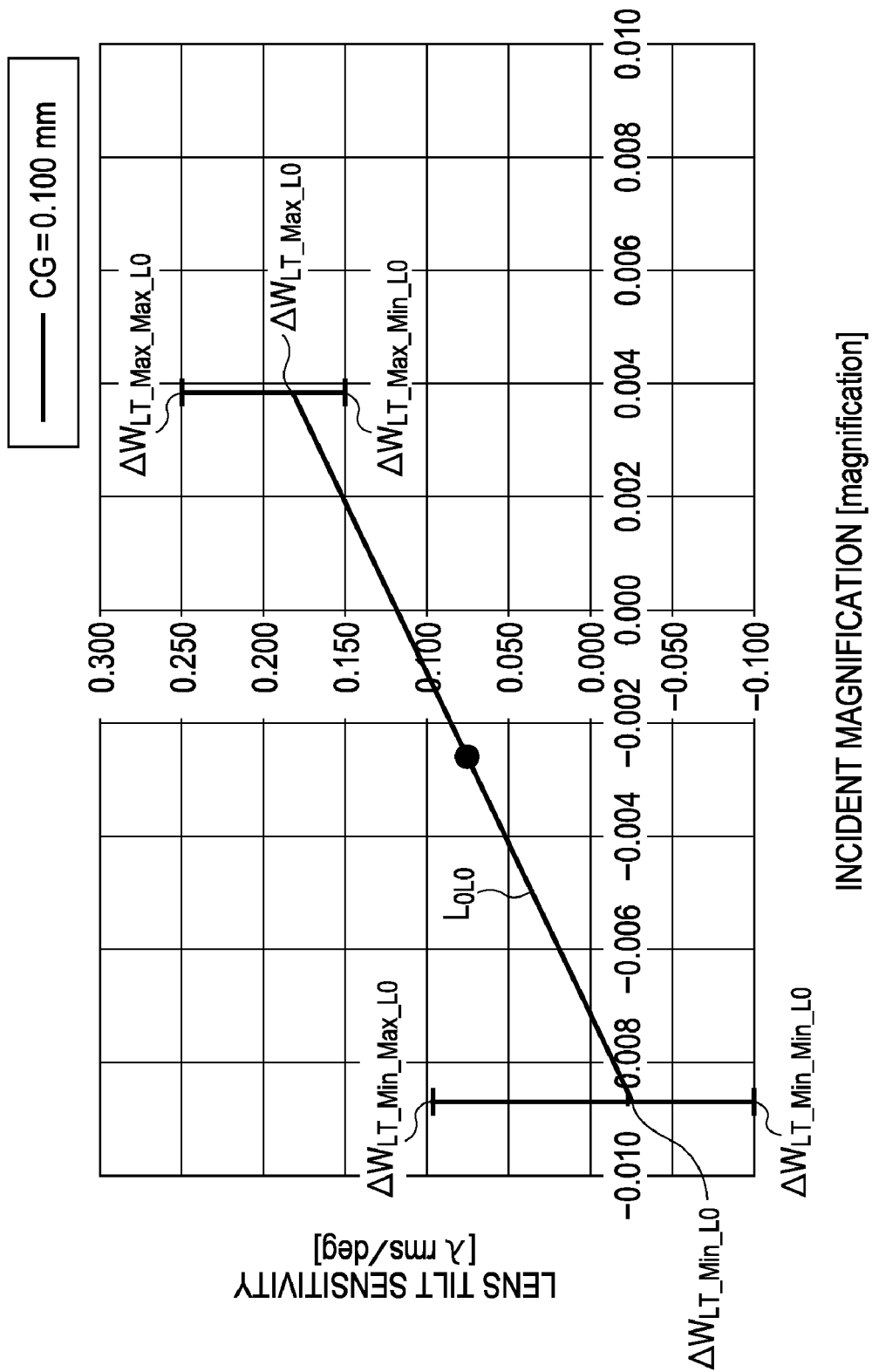
FIG. 4 is a conceptual diagram illustrating an motion of fluctuation of a lens tilt sensitivity relative to an incident magnification, a range of the lens tilt sensitivity defined in the embodiments of the invention, and fluctuation in the lens tilt sensitivity to the incident magnification in an L0 layer.

A motion of fluctuation in lens tilt sensitivity fluctuated by the incident magnification can be figured out by the graph of the incident magnification-lens tilt sensitivity. In FIG. 4, fluctuation of the lens tilt sensitivity relative to the incident magnification is represented by the straight line $L_{OL0}$. FIG. 4 shows an example of fluctuation of the lens tilt sensitivity at the recording layer which is generally called L0 layer and has a cover layer thickness of 0.1 mm. Here, a first method of defining the range of the lens tilt sensitivity is described, which defines the range of the lens tilt sensitivity at the maximum incident magnification and the range of the lens tilt sensitivity at the minimum incident magnification. That is, in FIGS. 4 and 5, the maximum value of the lens tilt sensitivity of the L0 layer at the maximum incident magnification is represented by $\Delta W_{LT\_Max\_Max\_L0}$ is defined as, and the minimum value thereof is represented by $\Delta W_{LT\_Max\_Min\_L0}$. Further, the maximum value of the lens tilt sensitivity at the minimum incident magnification is represented by $\Delta W_{LT\_Min\_Max\_L0}$, and the minimum value thereof is represented by $\Delta W_{LT\_Min\_Min\_L0}$. The lens tilt sensitivity $\Delta W_{LT\_Min\_L0}$ at the minimum incident magnification plotted on the left lower side of FIG. 4 is in a condition of a high temperature and a long wavelength. The lens tilt sensitivity $\Delta W_{LT\_Max\_L0}$ at the maximum incident magnification plotted on the right upper side thereof is in a condition of a low temperature and a short wavelength. In the first method, a desired effect is obtained by defining the ranges of the lens tilt sensitivity at the maximum and minimum incident magnifications as described later. Further, in the second method of defining the range of the lens tilt sensitivity to be described later, an additional effect is obtained by defining the range of the lens tilt sensitivity in the environment-basis state.

Figure 5:
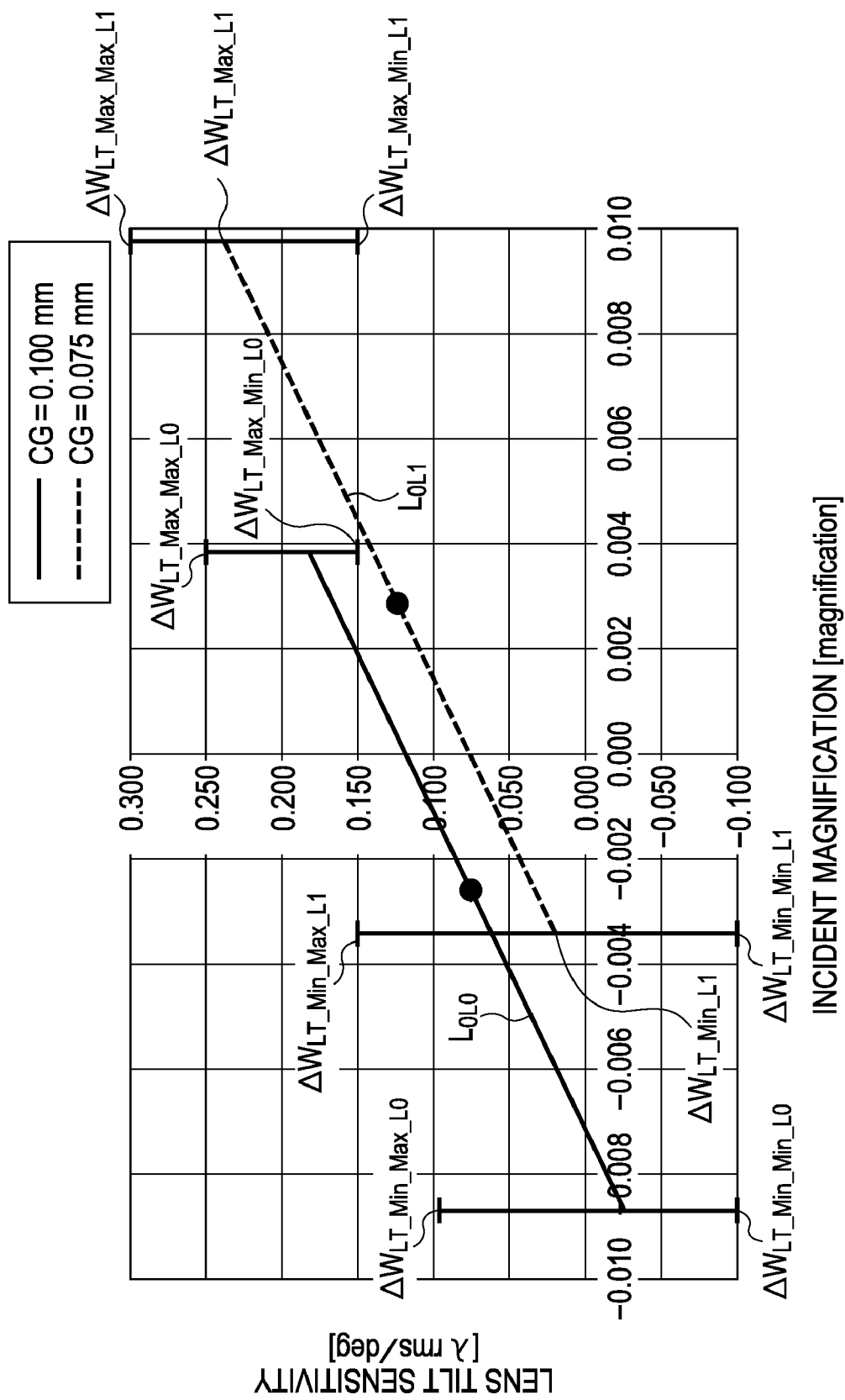
FIG. 5 is a conceptual diagram illustrating an motion of fluctuation of a lens tilt sensitivity relative to an incident magnification, a range of the lens tilt sensitivity defined in the embodiments of the invention, and fluctuation in the lens tilt sensitivity to the incident magnification in each of the L0 layer and an L1 layer.

Further, the motion of the line representing fluctuation of the lens tilt sensitivity as described in FIG. 4 is fluctuated by the differences of thicknesses of the cover layers of the recording layers. FIG. 5 shows fluctuation of the lens tilt sensitivity relative to the respective incident magnifications of both recording layers in the case of a so-called dual-layer optical disk. That is, in FIG. 5, in addition to $L_{OL0}$ representing the above-mentioned L0 layer, an example of fluctuation of the lens tilt sensitivity at the recording layer which is generally called L1 layer and has a cover layer thickness of 0.075 mm is represented by $L_{OL1}$. In FIG. 5, the maximum value of the lens tilt sensitivity of the L1 layer at the maximum incident magnification is represented by $\Delta W_{LT\_Max\_Max\_L1}$ is defined as, and the minimum value thereof is represented by $\Delta W_{LT\_Max\_Min\_L1}$. Further, the maximum value of the lens tilt sensitivity at the minimum incident magnification is represented by $\Delta W_{LT\_Min\_Max\_L1}$, and the minimum value thereof is represented by $\Delta W_{LT\_Min\_Min\_L1}$. In the above-mentioned first method and second method, the lens tilt sensitivity at the L0 and L1 layers in the above-defined predetermined condition is defined as described later, thereby obtaining a desired effect for the dual-layer optical disk and achieving comatic aberration compensation. Likewise, the lens tilt sensitivities at the recording layers in the multi-layer optical disk under the respective conditions are represented by $\Delta W_{LT\_Max\_Max\_Ln}$, $\Delta W_{LT\_Max\_Min\_Ln}$, $\Delta W_{LT\_Min\_Max\_Ln}$, and $\Delta W_{LT\_Min\_Min\_Ln}$, and ranges of those are defined so as to be additionally applicable to a multi-layer optical disk.

In the objective lens and the optical pickup using the same, the range of $\Delta W_{LT\_Max\_Max\_Ln}$ is defined by an amount of surface vibration of the optical disk and the like, but the range becomes different depending on whether the number of the objective lenses provided on the optical pickup is one or two. Although described later in detail, when a common three-wavelength compatible objective lens is used for the respective wavelengths, that is, when the number of the objective lens provided on the optical pickup is one, the range is favorable.

Further, although describe later in detail, the range of $\Delta W_{LT\_Min\_Max\_Ln}$ is derived from $\Delta W_{LT\_Max\_Max\_Ln}$ in the viewpoint as to typically how much the lens tilt sensitivity fluctuates under normal environment, thereby obtaining a desired effect. Further, the ranges of $\Delta W_{LT\_Max\_Min\_Ln}$ and $\Delta W_{LT\_Min\_Min\_Ln}$ are derived from the condition in which both of the image height sensitivity and the lens tilt sensitivity are advantageous in the optical pickup, thereby obtaining a desired effect. Here, the image height sensitivity is represented by $\Delta W_{IH}$ which has the relationship of $\Delta W_{IH}=W_{IH}/\theta$ where $W_{IH}$ is 3rd order comatic aberration caused when the parallel light beam incident to the lens is tilted by $\theta$ [deg]. Generally, when a format is determined, the relationship (Expression (28B) of $\Delta W_{IH}=\Delta W_{LT}+$Const. is established between the image height sensitivity and the lens tilt sensitivity. Hence, there are the trade-off relationship between the image height sensitivity and the lens tilt sensitivity.

4. Regarding Correction of SA due to Temperature Characteristics and Tilt Sensitivity Described herein are motion of spherical aberration (referred to as "SA") caused on the basis of temperature characteristics when the plastic objective lens is used and a mechanism of correcting the caused spherical aberration. Further, fluctuation in lens tilt sensitivity at the time of correction of SA due to temperature characteristics is described herein.

Figure 6:
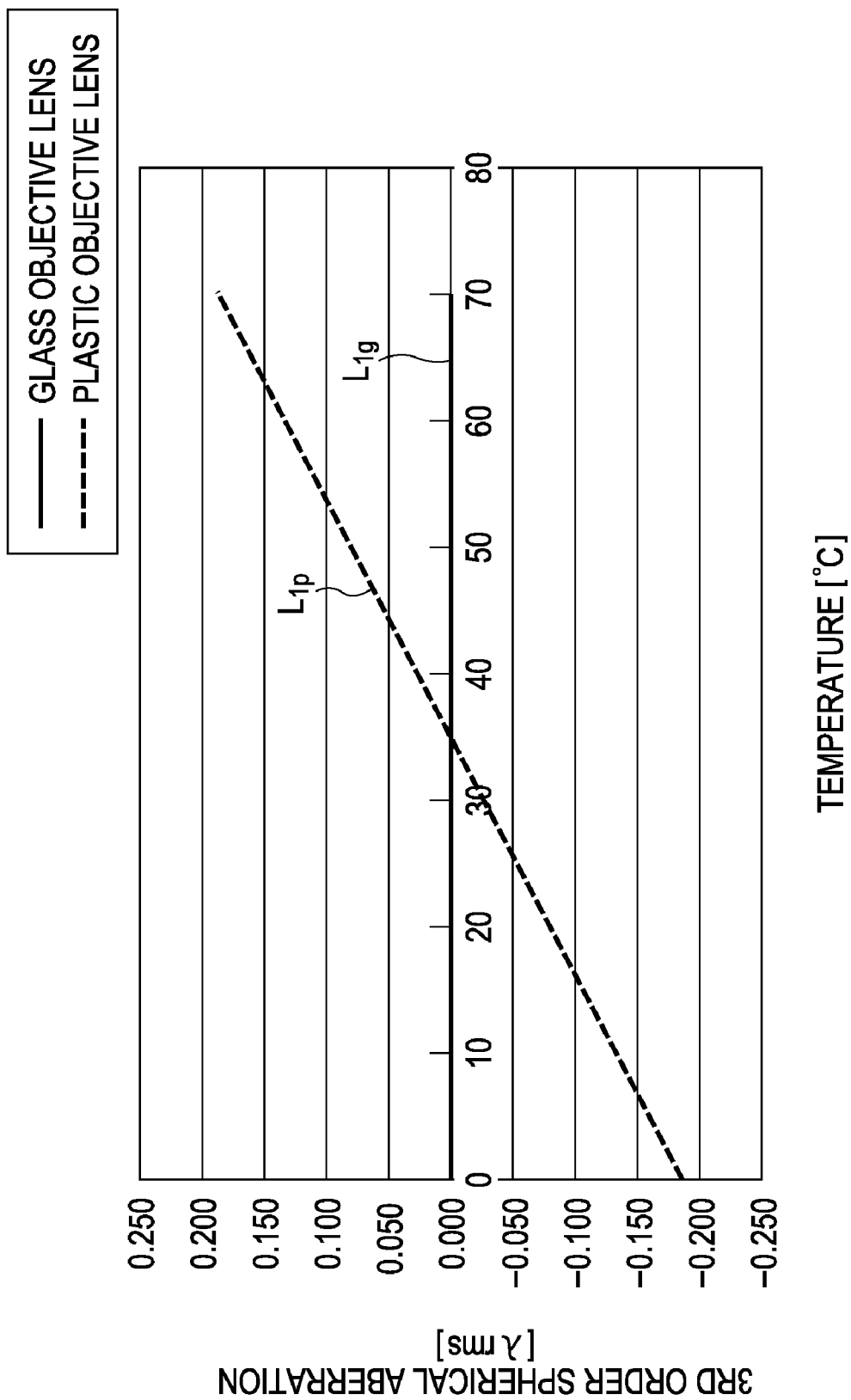
FIG. 6 is a diagram illustrating a relationship between temperature change and an amount of caused spherical aberration of a glass objective lens and a plastic objective lens.

FIG. 6 shows the relationship between an amount of caused spherical aberration and temperature change of the glass objective lens for BD and the plastic objective lens for BD which have the same focal length on the design basis in which a temperature is 35° C. In FIG. 6, the horizontal axis represents the temperature [° C.], and the vertical axis represents the 3rd order spherical aberration [λrms]. Further, $L_{1g}$ represents the relationship with the glass objective lens, and $L_{1p}$ represents the relationship with the plastic objective lens. As shown in FIG. 6, in the plastic objective lens, since the refractive index change caused by temperature change is large, a change amount of spherical aberration depending on temperature change is larger than that of the glass objective lens. For this reason, in the plastic objective lens, spherical aberration is caused at the time of temperature change, and thus a method or means for correcting this is necessary therefor.

Figure 7:
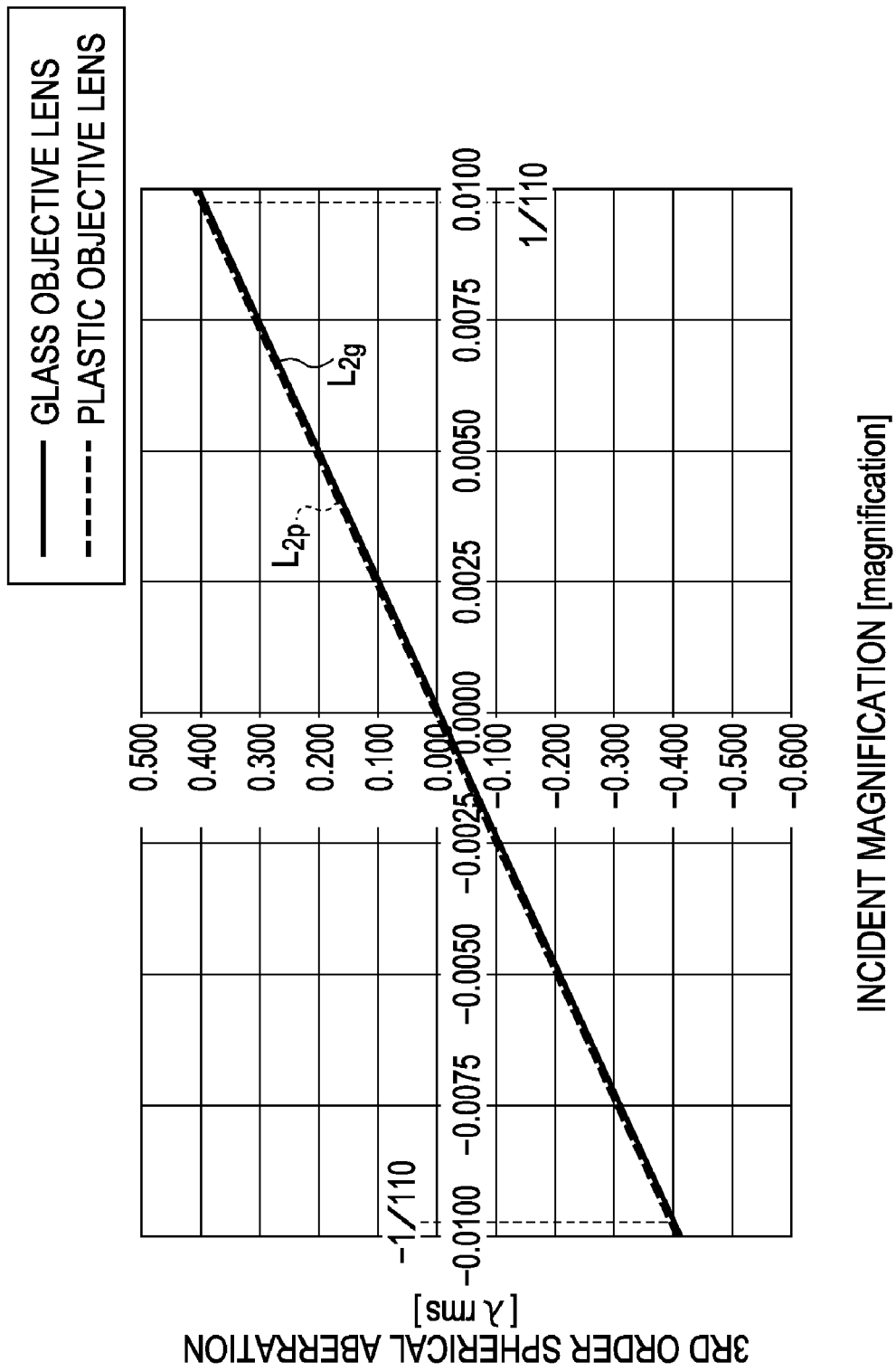
FIG. 7 is a diagram illustrating a relationship between 3rd order spherical aberration and the incident magnification as magnification characteristics of the glass objective lens and the plastic objective lens.

Here, a general correction method uses magnification spherical aberration. Next, FIG. 7 shows magnification characteristics of glass and plastic objective lenses. In FIG. 7, the horizontal axis represents the incident magnification to the objective lens, and the vertical axis represents the 3rd order spherical aberration [λrms]. Further, $L_{2g}$ represents the relationship with the glass objective lens, and $L_{2p}$ represents the relationship with the plastic objective lens. As shown in FIG. 7, since the magnification characteristics depend on a focal length and a numerical aperture NA, there is no difference between characteristics of the two lenses. That is, FIG. 7 shows that the same magnification change is necessary to cause the same amount of spherical aberration by using the glass and plastic objective lenses.

As shown in FIGS. 6 and 7, in the glass objective lens, spherical aberration is scarcely changed by environmental temperature change, and thus it is not necessary to perform the magnification correction. In contrast, in the plastic objective lens, spherical aberration is significantly changed depending on temperature, and thus it is necessary to perform magnification correction to the extent that spherical aberration caused by temperature change is canceled.

Figure 8:
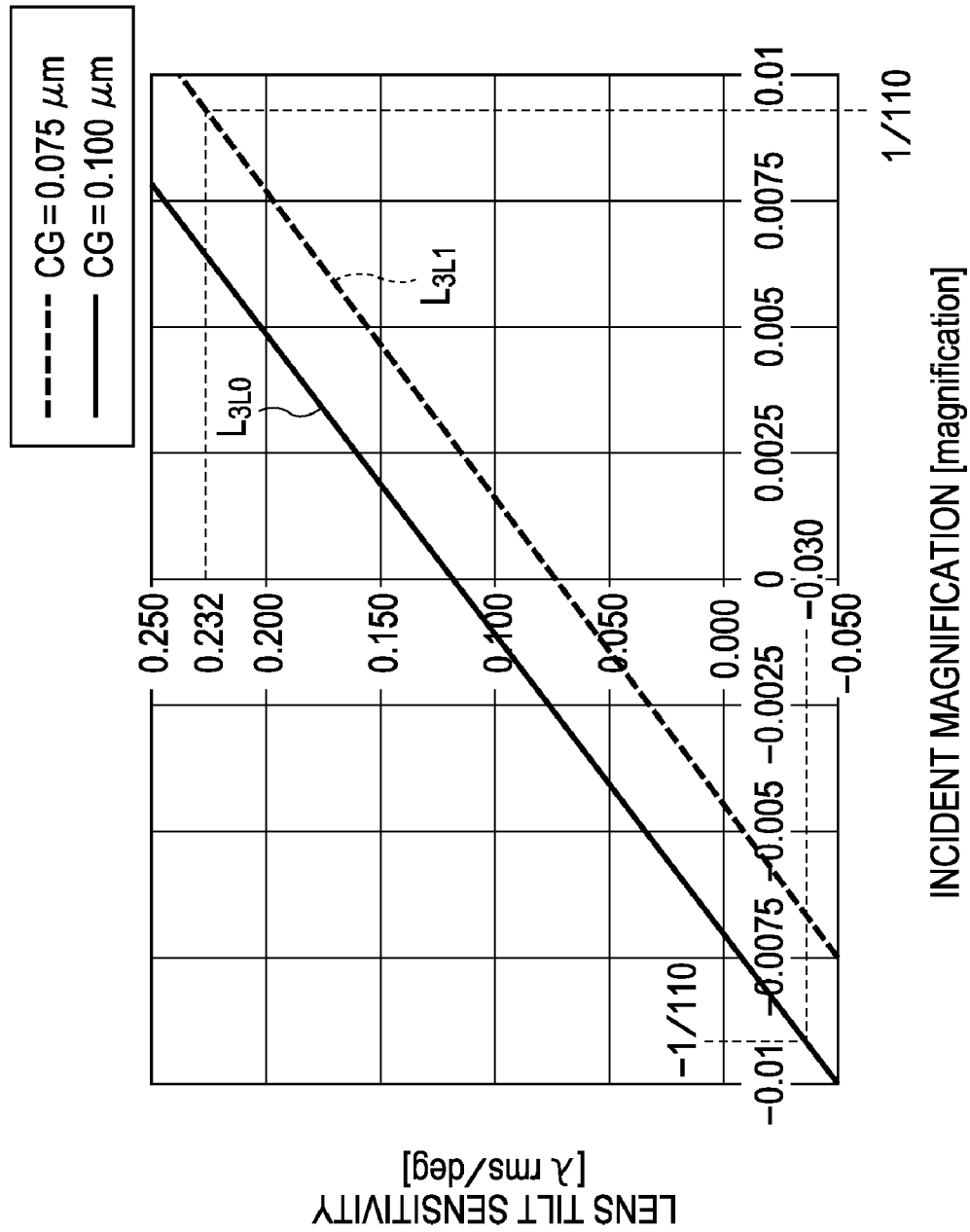
FIG. 8 is a diagram illustrating a relationship between the incident magnification and the lens tilt sensitivity for each recording layer in a dual-layer optical disk.

Next, FIG. 8 shows the relationship between the lens tilt sensitivity and the incident magnification of the light beam incident to the objective lens 34 made of plastic. The lens tilt sensitivity has a different value for each cover layer thickness, and FIG. 8 shows the relationship for each of the recording layers L0 and L1. In FIG. 8, the horizontal axis represents the incident magnification, and the vertical axis represents the lens tilt sensitivity. Further, $L_{3L0}$ represents the lens tilt sensitivity in a case where light is collected on the L0 layer of which the cover layer thickness is 0.100 μm, and $L_{3L1}$ represents the lens tilt sensitivity in a case where light is collected on the L1 layer of which the cover layer thickness is 0.075 μm. It can be seen from FIG. 8 that the lens tilt sensitivity is changed when the incident magnification is changed in accordance with a predetermined relationship for each recording layer. In addition, it can be seen from FIG. 8 that the lens tilt sensitivity is changed when the incident magnification is changed. As a result, as described above, when SA due to temperature characteristics is corrected by changing the incident magnification, the lens tilt sensitivity is changed in accordance with fluctuation of the incident magnification.

The spherical aberration that changes the incident magnification to the objective lens 34 is described herein. It is conceivable that factors of causing spherical aberration, which changes the incident magnification, include temperature change, wavelength change, cover layer thickness change, and an amount of initial spherical aberration. In the following description, the sensitivity $\Delta SA_T/\Delta T$ caused by temperature change is represented by α, the sensitivity $\Delta SA_\lambda/\Delta\lambda$ caused by wavelength change is represented by β, the sensitivity $\Delta SA_d/\Delta d$ caused by change in cover layer thickness is represented by γ, and the amount of initial spherical aberration is represented by $SA_{org}$. By using α, β, γ, and $SA_{org}$, the maximum amount of caused spherical aberration $\Delta SA$ can be written as the following Expression (1).

$$\Delta SA = \alpha \cdot \Delta T + \beta \cdot \Delta\lambda + \gamma \cdot \Delta d + SA_{org} \tag{1}$$

Considering the environment and condition in which the optical pickup 3 is used, maximally caused spherical aberration is around ±0.400 λrms. When the magnification correction is performed by driving the collimator lens 35 in order to correct the spherical aberration, the rage of use magnification m is determined from the relationships of FIGS. 6 and 7. The amount of caused magnification spherical aberration ΔSA depends on substantially only f [mm], NA, and m, and specifically a value thereof is given by the following Expression (2). Thereby, when the range of the incident magnification m is calculated at f=2.2 mm, the following Relational Expression (3) can be obtained. The correction based on the incident magnification is performed actually by driving collimator lens 35 and controlling a ray angle of the light beam incident to the objective lens 34. In this case, the lens tilt sensitivity of the objective lens 34 shown in FIG. 8 is written as the following Expression (4). Consequently, it would appear that comatic aberration caused at the same tilt angle of lens is significantly changed by the incident magnification.

$$\Delta SA \approx 38 \cdot m \cdot NA^4 \cdot f \tag{2}$$

$$-1/110 \leq m \leq 1/110 \tag{3}$$

$$0 \leq |\Delta W/\Delta\theta| 0.232 \tag{4}$$

The operation of the optical pickup 3 at the time of temperature change is as described above. Specifically, when the temperature change occurs near the objective lens 34 within the optical pickup 3, an amount of spherical aberration ΔSA given by the above-mentioned Expression (1) occurs. The ΔSA is canceled by driving the collimator lens 35 to cause the magnification spherical aberration. In the optical pickup 3, the temperature detection element 48 as a temperature detection unit for detecting a temperature around the objective lens 34 is provided, and occasionally detects the temperature of the objective lens 34. The control section 30 as a signal calculation unit calculates an amount of driving the collimator lens 35 from the detected temperature on the basis of the relationships of FIGS. 6 and 7, transmits an operation signal for driving the collimator lens drive section 45, and operates the collimator lens 35. In such a manner, it is possible to cancel ΔSA, but there is still a concern about deterioration in reproducing signal caused by change in lens tilt sensitivity accompanied with temperature change in a case where the range is inappropriate. In the optical pickup 3, in order to prevent the signal deterioration problem, the objective lens 34 satisfying the predetermined range is used from the following viewpoints. However, the range will be described in the sections 5 to 10. As described above, in the embodiment of invention, it is considered that, in the past, there may be no guide as to which degree the lens tilt sensitivity is equal to or not more than and it is very difficult to adjust the lens tilt sensitivity by using the objective lens. That is, in the embodiment of the invention, the range thereof is apparently defined, thereby compensating comatic aberration of the plastic objective lens. In other words, in the embodiment of the invention, the amount of the lens tilt sensitivity caused when the plastic lens is used is suppressed to be a certain value or less, thereby obtaining an effect that a certain amount of margin is secured when the lens tilt is performed by the optical pickup.

5. Regarding Upper Limit of Lens Tilt Sensitivity of Objective Lens

Figure 9:
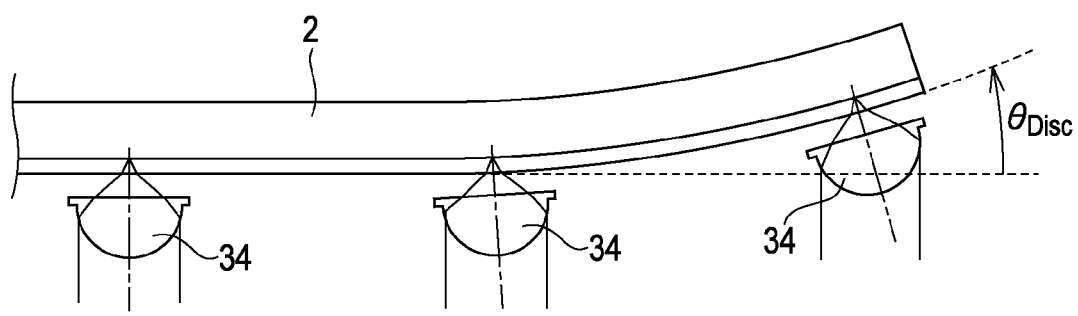
FIG. 9 is a schematic diagram illustrating deformation of the optical disk in a radial direction and lens tilt correction in inner and outer peripheries of the disk.

The upper limit of the lens sensitivity is described herein. The lens tilt sensitivity has various effects on the configuration of the optical pickup. If the lens tilt sensitivity is excessively low, it is difficult to perform sufficient signal correction on, for example, deformation of the optical disk. Similarly to the general optical pickup, it is conceivable that there is a method of performing control to cancel comatic aberration, which is caused by deformation of the optical disk, by comatic aberration caused by tilting the objective lens 34 as shown in FIG. 9. For example, if the temperature is high and the lens tilt sensitivity is low, a large amount of lens tilt is necessary even in the case of coping with the same deformation of the optical disk. When the lens tilt sensitivity is excessively low, there are concerns about problems that it is out of the allowable range of operating an actuator and the amount of comatic aberration is not changed and correction is not performed even when the actuator is driven. This may be solved by adopting a method of stopping the lens tilt correction in a case where the lens tilt sensitivity is a certain value or less.

In contrast, if the lens tilt sensitivity is excessively high, large comatic aberration is caused by the remainder which is processed by lens tilt adjustment at the time of manufacturing the optical pickup, and thus there is a problem in that the signal quality is remarkably lowered. Here, the maximum allowance of comatic aberration in a system such as the optical pickup 3 is represented by $W_{max}$ [λrms], and the remainder processed by the lens tilt adjustment is represented by $\theta_{LT\_Max}$ [deg]. Then, the upper limit of the lens tilt sensitivity $\Delta W_{LT\_Max}$ is written as the following Expression (5).

$$\Delta W_{LT\_Max} = W_{Max}/\theta_{LT\_Max} \tag{5}$$

Generally, it is conceivable that allowance of comatic aberration $W_{max}$ is determined by Marechal condition of 0.070 λrms. Here, deformation of the optical disk and the like have an effect as surface vibration in view of the tangential direction, and thus a problem arises in that the surface vibration in the tangential direction occurs at the time of rotation. That is, it is difficult to follow and tilt the objective lens in response to the surface vibration of the rotational direction, and it is difficult to suppress aberration $W_{Sur\_Vib}$[λrms], which is caused by the surface vibration, by applying a normal tilt. As a result, $W_{max}$ satisfies the relationship of the following Expression (6). Further, aberration $W_{Sur\_Vib}$ caused by the surface vibration can be calculated from the maximum angle of surface vibration $\theta_{DT\_Max}$ and the like similarly to the following Expression (7). Here, the maximum angle of surface vibration $\theta_{DT\_Max}$ at which the surface vibration of BD is the maximum is $\theta_{DT\_Max}$=±0.3 deg or less. Further, $\Delta W_{DT}$ [λrms/deg] in Expression (7) is a tilt sensitivity of the optical disk (hereinafter, referred to as a "disk tilt sensitivity"), and is a value changed by the cover layer thickness of the optical disk. Here, in the lens tilt sensitivity, the polarity of the lens tilt sensitivity is positive in a lens of which the image height sensitivity is 0.

$$W_{Max}=0.07-W_{Sur\_Vib} \tag{6}$$

$$W_{Sur\_Vib}=|\theta_{DT\_Max} \cdot \Delta W_{DT}| \tag{7}$$

For example, in the dual-layer optical disk of BD, the recording layer of which the cover layer thickness is large is called L0 layer, and has a cover layer thickness of 0.100 mm, and the recording layer of which the cover layer thickness is small is called L1 layer, and has a cover layer thickness of 0.075 mm. The disk tilt sensitivity of L0 layer is $\Delta W_{DT\_L0}$=−0.110 λrms/deg, that of L1 layer is $\Delta W_{DT\_L1}$=−0.080 λrms/deg, and the L0 layer has a higher disk tilt sensitivity. Furthermore, the disk tilt sensitivity depends on the cover layer thickness and the ray angle, and the ray angle depends on the numerical aperture NA.

Accordingly, the allowances of comatic aberration $W_{Max}$ at the respective layers can be calculated as the following Expressions (8A) and (8B) on the basis of the disk tilt sensitivities $\Delta W_{DT\_L0}$ and $\Delta W_{DT\_L1}$ at the respective layers of Expressions (6) and (7). Consequently, the allowance of comatic aberration at L0 layer $W_{Max\_L0}$ can be calculated from Expression (8A), and the allowance of comatic aberration at L1 layer $W_{Max\_L1}$ can be calculated from Expression (8B).

$$W_{Max\_L0}=0.037 \tag{8A}$$

$$W_{Max\_L1}=0.046 \tag{8B}$$

Further, the maximum remainder processed by the lens tilt at the time of attaching and adjusting a general lens is around $\theta_{LT\_Max}$=0.15 if assembly deviation is included therein. From the $\theta_{LT\_Max}$ and Expressions (5), (8A) and (8B), the maximum lens tilt sensitivities $\Delta W_{LT\_Max\_L0}$ and $\Delta W_{LT\_Max\_L1}$ at the respective layers are calculated as the following Expressions (9A) and (9B).

$$\Delta W_{LT\_Max\_L0}=0.25 \tag{9A}$$

$$\Delta W_{LT\_Max\_L1}=0.31 \tag{9B}$$

Furthermore, in consideration of the disk radial direction, the lens tilt sensitivity larger than this is permissible, but the minimum criterion value is as described above, and is defined only by the tangential direction.

Further, the lens tilt sensitivity $\Delta W_{LT}$ has linearity relative to the cover layer thickness of the optical disk. That is, the relationship of the following Expression (10) is established. Here, in Expression (10), $\Delta W_{LT\_Cen}$ represents the design basis of the lens tilt sensitivity, and generally is defined by 0.1 to 0.08 [λrms/deg] as the basis of the lens tilt sensitivity at the L0 and L1 layers. The reason is that, in order to satisfy the aplanatic condition, it is necessary to set the basis to approximately the value. Further, $\Delta t$[mm] represents difference in cover layer thickness relative to the cover layer thickness $t_{Cen}$ on the design basis, and the cover layer thickness at the n-th layer is represented by $t_n$, and then the relationship of $\Delta t=t_n-t_{Cen}$ is satisfied. This point can be described in detail as follows. The fluctuation of the lens tilt sensitivity caused by the difference of the cover layer thickness depends on the following two factors. First factor is fluctuation in incident magnification caused by difference of cover layer thicknesses. The reason is, as described above, that spherical aberration fluctuates with linearity if the cover layer thicknesses are different, and thus it is necessary to adjust the incident magnification by that amount. Further, the incident magnification has a linear relationship with the lens tilt sensitivity as described above. Accordingly, there is a linear relationship between the lens tilt sensitivity and the fluctuation of the incident magnification caused by the difference of cover layer thicknesses. Second factor is that comatic aberration caused from the tilted lens is amplified on the optical disk surface. There is linearity with the cover layer thickness of the optical disk. The amount of fluctuation caused by the two factors, since both of them have linearity with t which is a cover layer thickness, has the relationship of Expression (10) on the basis of the lens tilt sensitivity $\Delta W_{LT\_Cen}$ of the cover layer thickness center. $k_{LT-t}$ is approximately 1.6 to 2.0 [λrms/deg/mm] in actual measurement.

$$\Delta W_{LT}=k_{LT-t} \cdot \Delta t + \Delta W_{LT\_Cen} \tag{10}$$

On the basis of the linear relationship between the lens tilt sensitivity and the cover layer thickness, the maximum lens tilt sensitivity at each layer defined by Expressions (9A) and (9B) is restricted by the relationship of Expression (10). That is, $\Delta W_{LT\_Max\_L0}$ obtained from the relationships of Expressions (9B) and (10) does not restrict Expression (9A). However, $\Delta W_{LT\_Max\_L1}$ obtained from the relationships of Expressions (9A) and (10) defines the relationship which is more restricted than Expression (9B). Specifically, by using maximum $k_{LT\text{-}t}=2.0$ and the distance $\Delta t_{L0\text{-}L1}=0.025$ between the L0 and L1 layers, $\Delta W_{LT\_Max\_L1}$ is defined as the relationship of Expression (11) from $\Delta W_{LT\_Max\_L0}$ of Expression (9A) on the basis of the relationship of Expression (10).

$$\Delta W_{LT\_Max\_L1} \leq \Delta W_{LT\_Max\_Max\_L1} = \Delta W_{LT\_Max\_L0} + k_{LT\text{-}t} \cdot \Delta t_{L0\text{-}L1} = 0.30 \quad (11)$$

From the above, considering general multi-layering, multi-layering progresses toward the side thinner than the L0 layer. Hence, on the basis of the L0 layer, it is necessary to define the maximum value of the lens tilt sensitivity by the relationship of Expression (12).

$$\Delta W_{LT\_Max\_Ln} \leq \Delta W_{LT\_Max\_Max\_L0} = \Delta W_{LT\_Max\_L0} + k_{LT\text{-}t} \cdot \Delta t_{L0\text{-}Ln} = 0.25 + 2 \cdot \Delta t_{L0\text{-}Ln} \quad (12)$$

6. Regarding Lower Limit of Lens Tilt Sensitivity of Objective Lens

Hereinafter, it is described that the lower limit of the lens tilt sensitivity is defined by the other restrictions.

The above-mentioned Expression (12) is for defining the maximum value of $\Delta W_{LT\_Max\_Ln}$, but actually defines the minimum value thereof. The amount of fluctuation in lens tilt sensitivity $\Delta W_{LT\_\Delta M}$ relative to the incident magnification M is approximately proportional to f, and can substantially be written as the following Expression (13). Here, $\Delta M$ represents the amount of fluctuation in incident magnification, and in FIG. 8, represents the horizontal-axis fluctuation amount. Further, $\Delta W_{LT\_\Delta M}$ represents the vertical-axis fluctuation amount in FIG. 8.

$$\Delta W_{LT\_\Delta M} = 7.5 \cdot f \cdot \Delta M \quad (13)$$

Here, $\Delta M$ in a non-diffractive plastic lens or a three-wavelength compatible objective lens is studied in a case where the design temperature is 35° C. and the central wavelength in design is 405 nm. The $\Delta M$ has the maximum value of, for example, around 0.007 with respect to the single positive side in consideration of the environment change in the use environmental temperature range of 0° C. to 70° C. and the use light wavelength range of 400 to 410 nm, and the maximum amount of fluctuation in magnification $\Delta M\_Max$ is written as the following Expression (14).

$$\Delta M\_Max=0.007 \quad (14)$$

Further, the magnification fluctuation range depends on materials of lens components and a focusing state, and thus the amount of fluctuation in magnification has a range, and the minimum amount of fluctuation in magnification $\Delta M\_Min$ is written as the following Expression (15).

$$\Delta M\_Min=0.0045 \quad (15)$$

On the basis of the above-mentioned Expression (13), by using the relationships of Expressions (14) and (15), $\Delta W_{LT\_\Delta M\_Max}$, which is the maximum magnitude of fluctuation under the environment of the lens tilt sensitivity, and $\Delta W_{LT\_\Delta M\_Min}$, which is the minimum magnitude of fluctuation under the environment, are respectively written as Expressions (16) and (17).

$$\Delta W_{LT\_\Delta M\_Max}=7.5 \cdot f \cdot \Delta M\_Max=0.053 \cdot f \quad (16)$$

$$\Delta W_{LT\_\Delta M\_Min}=7.5 \cdot f \cdot \Delta M\_Min=0.034 \cdot f \quad (17)$$

The lens tilt sensitivity $\Delta W_{LT}$ in the objective lens has a value fluctuated by various environmental fluctuation, but it is advantageous to have a positive value as described later. Although described later in detail, the reason is that, when the lens tilt sensitivity is a negative value, the absolute value of the image height sensitivity increases as the absolute value of the lens tilt sensitivity increases, and this moves only in an adverse direction. Accordingly, in the above-mentioned linear group of FIG. 8, it is preferable that the values of lens tilt sensitivity under the use environment should be biased to the positive side as a whole. When this point of view is expressed by a numerical formula, it is preferable that the lens tilt sensitivity in the design-basis state should be set to 0 or more regardless of the cover layer thickness and the minimum value $\Delta W_{LT\_Max\_Min\_Ln}$ of the maximum lens tilt sensitivity should satisfy the relationship of the following Expression (18). Likewise, it is preferable that the minimum value $\Delta W_{LT\_Min\_Min\_Ln}$ of the minimum lens tilt sensitivity should satisfy the relationship of the following Expression (19).

$$\Delta W_{LT\_Max\_Min\_Ln} = \Delta W_{LT\_\Delta M\_Min} = 0.034 \cdot f \quad (18)$$

$$\Delta W_{LT\_Min\_Min\_Ln} = -\Delta W_{LT\_\Delta M\_Max} = -0.053 \cdot f \quad (19)$$

Figure 10:
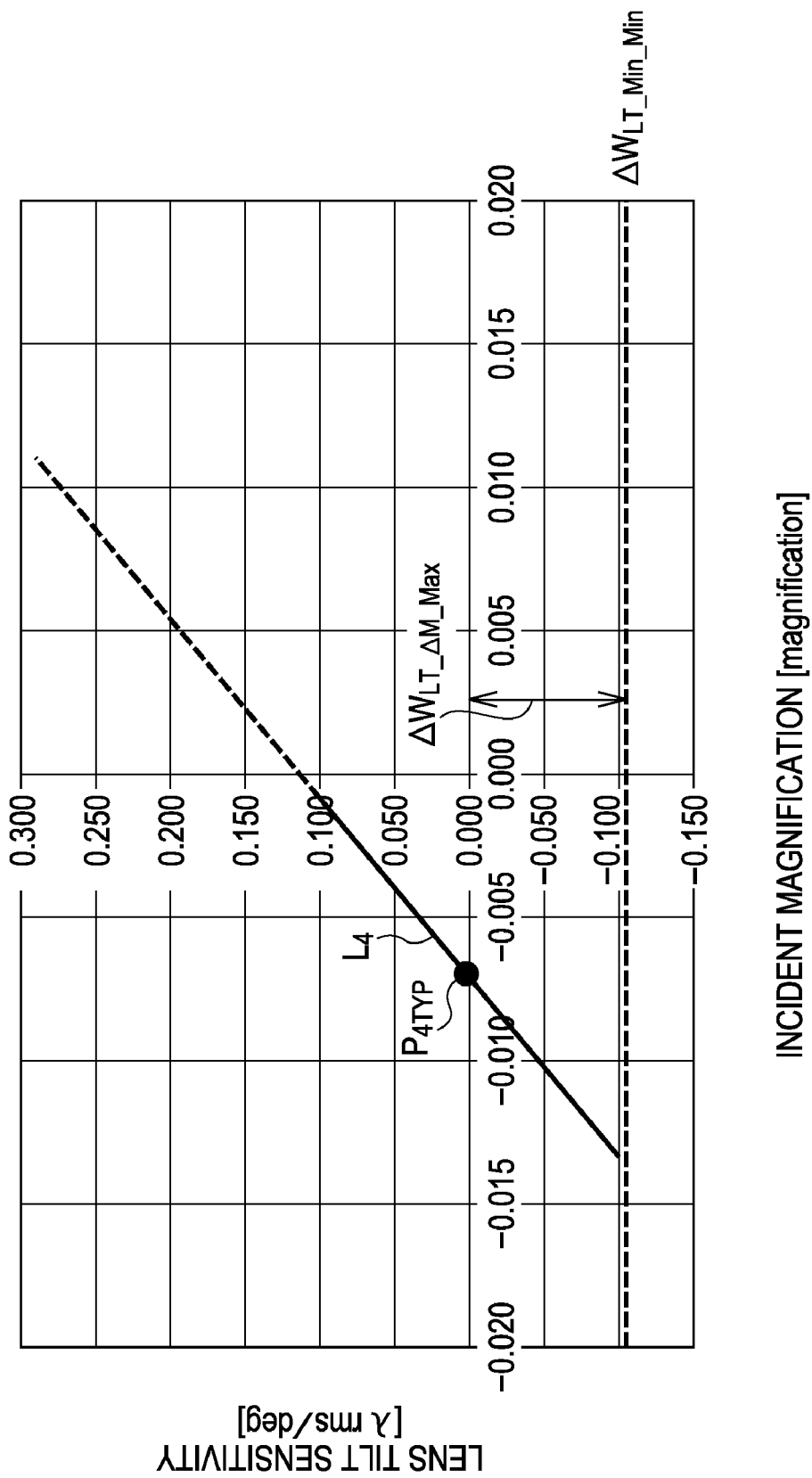
FIG. 10 is a diagram illustrating a condition which defines the lower limit of the lens tilt sensitivity in the objective lens according to the embodiment of the invention, and illustrating fluctuation in the lens tilt sensitivity to the incident magnification and the minimum value of the minimum lens tilt sensitivity.
Figure 11:
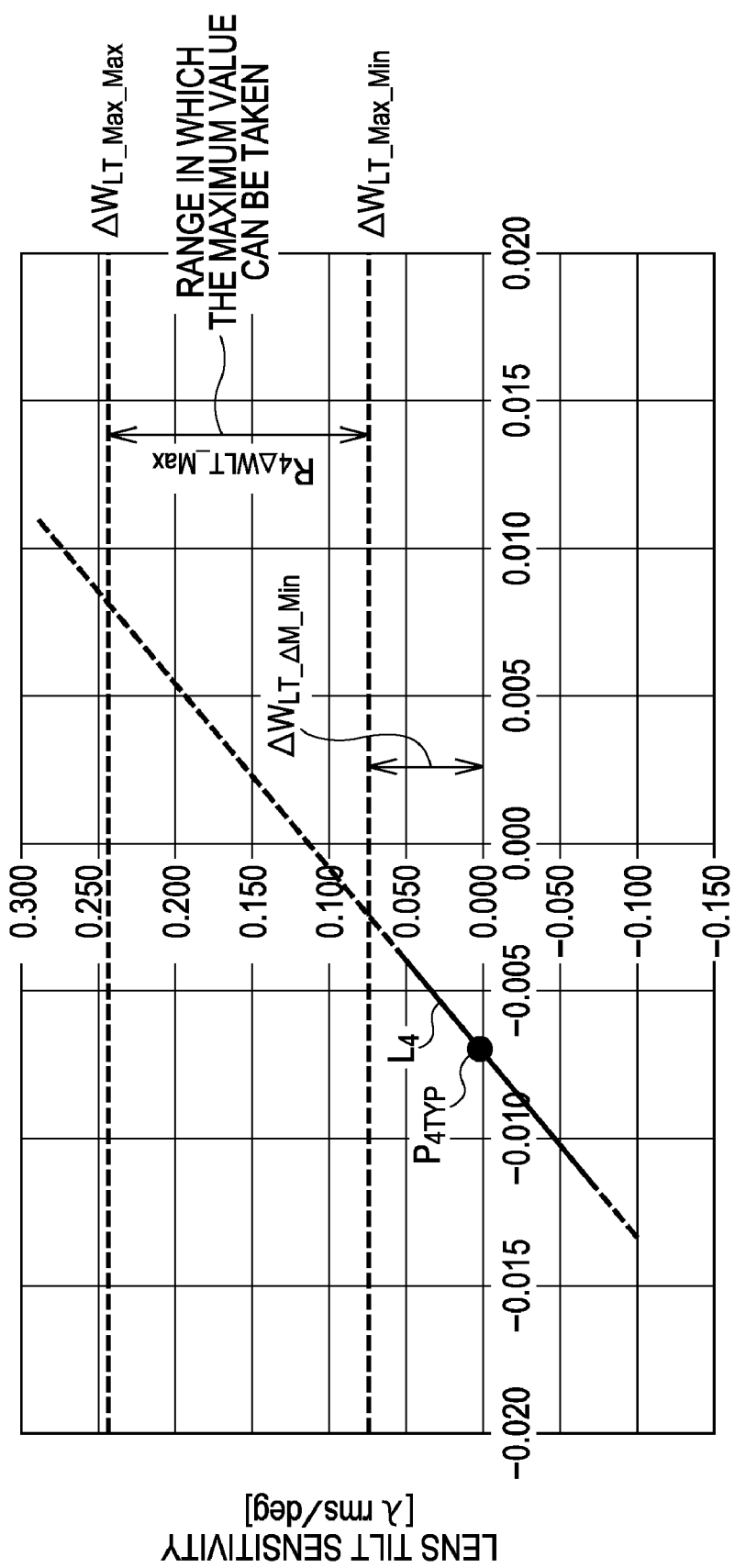
FIG. 11 is a diagram illustrating a condition which defines the lower limit of the lens tilt sensitivity in the objective lens according to the embodiment of the invention, and illustrating fluctuation in the lens tilt sensitivity to the incident magnification and the minimum value and an appropriate range of the maximum lens tilt sensitivity.

The relationships of Expressions (18) and (19) are additionally described with reference to the conceptual diagrams shown in FIG. 10 and FIG. 11. In FIGS. 10 and 11, the solid line $L_4$ represents distribution of the lens tilt sensitivity relative to the incident magnification within the use environment range of the L0 layer, and $P_{4TYP}$ represents the lens tilt sensitivity in the environment-basis state. Furthermore, the dashed line portion represents the lens tilt sensitivity relative to the incident magnification substantially determined by the cover layer thickness and the focal length f. Relative to this, the lens tilt sensitivity and the amount of fluctuation in magnification $\Delta M$ in the environment-basis state are adjusted, and thereby it is possible to adjust the above-mentioned distribution of the lens tilt sensitivity.

Here, it is advantageous that the linear distribution is biased to the positive side. Hence, the case where the lens tilt sensitivity $P_{4TYP}$ in the environment-basis state in FIG. 10 is 0 is defined as the lower limit of the distribution. Accordingly, as shown in FIG. 10, the minimum value $\Delta W_{LT\_Min\_Min\_Ln}$ of the minimum lens tilt sensitivity is defined by $\Delta W_{LT\_\Delta M\_Max}$ which represents the maximum magnitude of fluctuation of the lens tilt sensitivity caused by the above-mentioned environmental fluctuation. In FIG. 10, it would appear that the relationship of the above-mentioned Expression (19) represents an appropriate range.

On the other hand, as shown in FIG. 11, the minimum value $\Delta W_{LT\_Max\_Min\_Ln}$ of the maximum lens tilt sensitivity is determined as follows. First, the case of FIG. 11 is the same as the case of FIG. 10 in the following points: it is advantageous that the line distribution is biased to the positive; and the case where the lens tilt sensitivity $P_{4TYP}$ in the environment-basis state is 0 is defined as the lower limit of the distribution. Further, the state where the linear distribution is biased to the positive means that the minimum value $\Delta W_{LT\_Max\_Min\_Ln}$ of the maximum lens tilt sensitivity is at least a positive value. Accordingly, as shown in FIG. 11, the minimum value $\Delta W_{LT\_Max\_Min\_Ln}$ of the maximum lens tilt sensitivity is defined by $\Delta W_{LT\_\Delta M\_Min}$ which represents the minimum magnitude of fluctuation of the lens tilt sensitivity caused by the above-mentioned environmental fluctuation. In FIG. 11, it would appear that the relationship of the above-mentioned Expression (18) represents an appropriate range. Furthermore, FIG. 11 shows the appropriate range of the maximum lens tilt sensitivity represented by $R_{4\Delta WLT\_Max}$ together with the above-mentioned facts. Further, $\Delta W_{LT\_Max\_Max}$ for representing the range is determined by the above-mentioned Expression (12).

Next, the minimum value $\Delta W_{LT\_Min\_Max\_Ln}$ of the maximum lens tilt sensitivity relative to the maximum value $\Delta W_{LT\_Max\_Max\_Ln}$ of the maximum lens tilt sensitivity, which is defined by Expression (12), is defined by the following Expression (20).

$$\Delta W_{LT\_Min\_Max\_Ln} = \Delta W_{LT\_Max\_Max\_Ln} - 2 \cdot \Delta W_{LT\_\Delta M\_Min} \quad (20)$$

Figure 12:
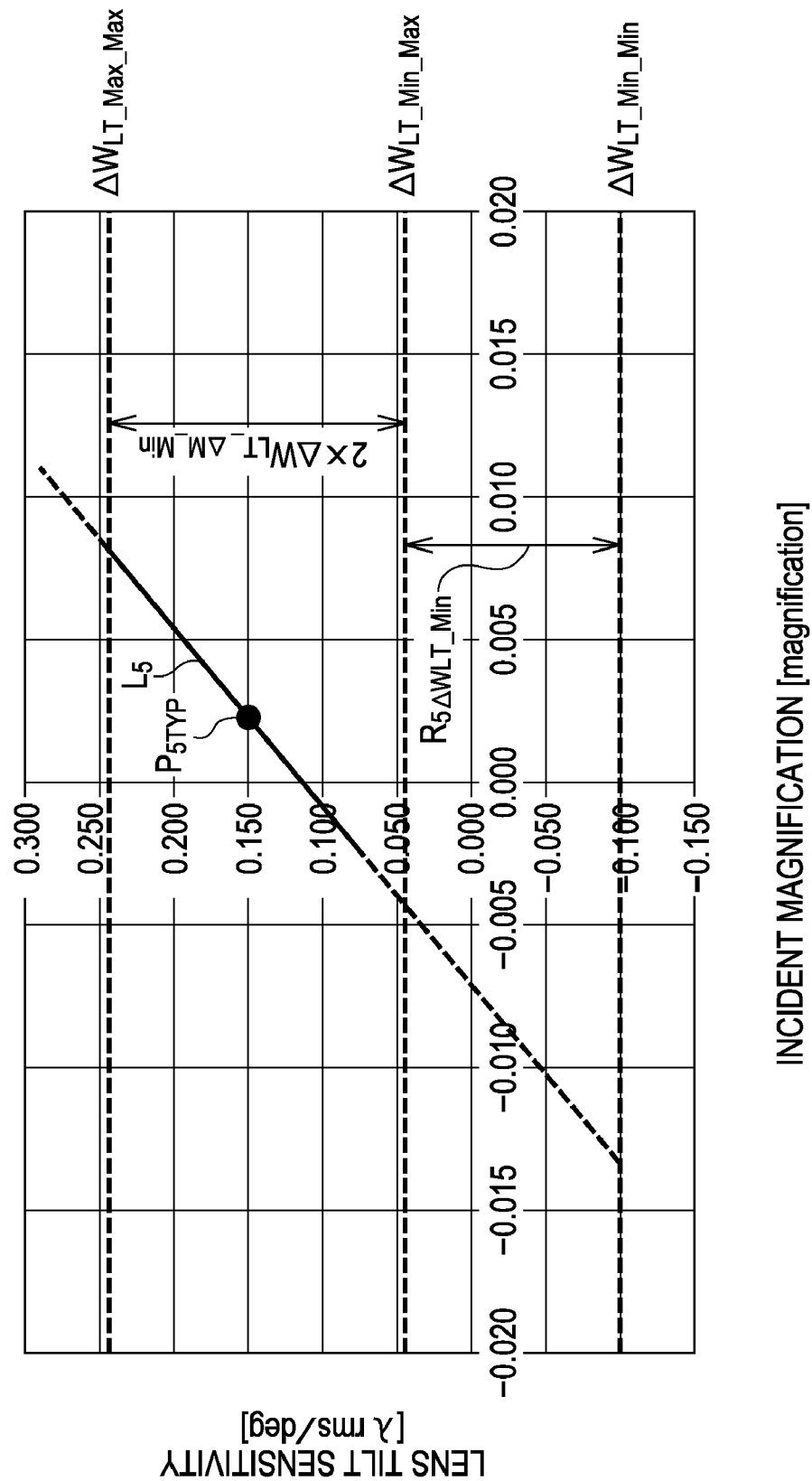
FIG. 12 is a diagram illustrating a condition which defines the upper limit of the minimum lens tilt sensitivity in the objective lens according to the embodiment of the invention, and illustrating fluctuation in the lens tilt sensitivity to the incident magnification and the maximum value and an appropriate range of the minimum lens tilt sensitivity.

The relationship of Expression (20) is additionally described with reference to the conceptual diagram shown in FIG. 12. In FIG. 12, the solid line $L_5$ represents distribution of the lens tilt sensitivity relative to the incident magnification within the use environment range of the L0 layer, and $P_{5TYP}$ represents the lens tilt sensitivity in the environment-basis state. When $\Delta W_{LT\_Max\_Max\_Ln}$ is determined by Expression (12), this means the maximum value of the maximum environmental lens tilt sensitivity. Relative to this, the maximum value $\Delta W_{LT\_Max\_Max\_Ln}$ of the minimum environmental lens tilt sensitivity is determined at a position set on the lower side by $2 \times \Delta W_{LT\_\Delta M\_Min}$ which is two times the minimum magnitude of the lens tilt sensitivity caused by environmental fluctuation. Furthermore, FIG. 12 shows the appropriate range of the minimum lens tilt sensitivity represented by $R_{5\Delta WLT\_Min}$ together with the above-mentioned facts. Further, $\Delta W_{LT\_Min\_Min}$ for representing the range is determined by the above-mentioned Expression (19) and FIG. 10.

Specifically, as shown in Expression (15), $\Delta M\_Min = 0.0045$, and thus similarly to the case of Expression (16), the maximum value $\Delta W_{LT\_Min\_Max\_Ln}$ of the minimum lens tilt sensitivity is defined by Expression (21).

$$\Delta W_{LT\_Min\_Max\_} = 0.25 + 2.0 \cdot \Delta t_{L0\text{-}Ln} - 0.068 \cdot f \quad (21)$$

7. Regarding Range of Lens Tilt Sensitivity of Three-wavelength compatible Objective Lens in Optical Pickup The range of the restricted value of the lens tilt sensitivity as described above is restricted to a certain extent in accordance with the type of the objective lens. For example, in the objective lens 34 with the three-wavelength compatibility used in the above-mentioned optical pickup 3, just one lens is provided in the lens holder of the optical pickup 3, and thus it is possible to relax the restriction of the lens tilt sensitivity relatively. Described herein is the range of the lens tilt sensitivity of the three-wavelength compatible objective lens such as the objective lens 34.

Since it is not necessary to consider facts other than the above-mentioned restriction, in the case of the objective lens 34 with the three-wavelength compatibility, the ranges defined by Expressions (12) and (18) to (20) are set to the maximum and minimum values of the maximum and minimum lens tilt sensitivities in the same way. Specifically, on the basis of Expressions (12) and (18), it is possible to derive the range of Expression (22A) with respect to the maximum lens tilt sensitivity. Further, on the basis of the Expressions (19) and (21), it is possible to derive the range of the Expression (22B) with respect to the minimum lens tilt sensitivity.

$$0.034 \cdot f \leq \Delta W_{LT\_Max\_Ln} \leq 0.25 + 2.0 \cdot \Delta t_{L0\text{-}Ln} \quad (22A)$$

$$-0.053 \cdot f \leq \Delta W_{LT\_Min\_Ln} 0.25 + 2.0 \cdot \Delta t_{L0\text{-}Ln} - 0.068 \cdot f \quad (22B)$$

By adopting the configuration in which the above-mentioned Expressions (22A) and (22B) are satisfied, the three-wavelength compatible objective lens has the following effects. With such a configuration, it is possible to prevent various signal deterioration due to the remainder, which is processed by the lens tilt adjustment at the time of manufacturing the optical pickup, and the excess of the allowance of comatic aberration which is significantly caused by the tangential surface vibration. Consequently, such an objective lens is able to compensate comatic aberration even when the incident magnification is changed in accordance with temperature change and the like, and achieve favorable characteristics in recording and reproducing performed by the optical pickup.

The reason is that, when the objective lens with three-wavelength compatibility is used, it is possible to make directions of the comatic aberration of the first optical disk such as a BD and the second and third optical disks such as a DVD and a CD substantially coincide with each other. That is, the reason is that it is possible to cancel amounts of comatic aberration uniformly, for example, in a way that the tilt adjustment is performed on the spindle of the optical disk, the guide shaft of the optical pickup 3, and the like and the tilt states of the optical disk and the optical pickup 3 are relatively adjusted. This concept is described in detail with reference to FIGS. 13A, 13B, 13C, and 13D. In the case where one objective lens is provided as shown in FIG. 13A, the directions of comatic aberration caused with respect to the first to third optical disks (for example, a BD, a DVD, and a CD) becomes substantially the same direction as indicated by $C_{10}$. In practice, the directions of comatic aberration at the objective lens with respect to the first to third optical disks are slightly different from each other, but the difference does not increase. Further, the direction of comatic aberration in the fixing portion of the optical pickup 3 is common with respect to the first to third optical disks. The comatic aberration caused therefrom has the same direction $C_{10}$ regardless of type of media of the first to third optical disks, and is canceled and eliminated by the inclination (tilt) of the optical disk or the inclination (tilt) of the optical pickup 3 in the same manner as described above. Furthermore, in FIG. 13A, $C_{1H}$ represents the direction of comatic aberration which is caused to be canceled by tilting the optical disks or optical pickup 3 and relatively adjusting angles of those. FIG. 13B is a diagram illustrating the state, in which the comatic aberration is canceled by causing comatic aberration with the direction represented by $C_{1H}$ against the comatic aberration with the direction $C_{10}$ shown in FIG. 13A. It can be seen from FIG. 13B that the total comatic aberration of those becomes substantially 0 by canceling the comatic aberrations as described above. By performing such adjustment, the upper limit values of the lens tilt sensitivities and the like in Expressions (22A) and (22B) are not restricted by presence of other media. Further, there is a room for the second and third optical disks (for example, a DVD and a CD) and the lens tilt sensitivity, and thus there is no actual restriction.

The definitions of Expressions (22A) and (22B) are derived in the same manner as the above-mentioned sections 5 and 6. Accordingly, the expressions are established when the numerical aperture is in the range of NA>0.8, the cover layer thickness is in the range of t=0.1 mm to 0.075 mm, the wavelength $\lambda$ of the light beam is in the range of $\lambda$=400 to 410 nm, and the use temperature range is the range of 0° C. to 75° C. In other words, since these ranges based on the disk tilt sensitivity and the disk tilt sensitivity is proportional to $NA^3 \cdot t/\lambda$, when the numerical aperture is small, the amount of fluctuation of the lens tilt sensitivity has no great influence by that amount, and thus it is not necessary to consider the above-mentioned problems.

The objective lens 34 and the optical pickup 3 using the same according to the embodiment of the invention are able to improve mass productivity and achieve weight saving while compensating comatic aberration even when environmental temperature is changed in a way that the objective lens is made of plastic. The objective lens 34 and the optical pickup 3 are able to improve mass productivity and achieve weight saving while achieving favorable recording and reproducing characteristics by satisfactorily correcting aberrations.

8. Entire Configuration of Optical Pickup According to Second Embodiment

Figure 14:
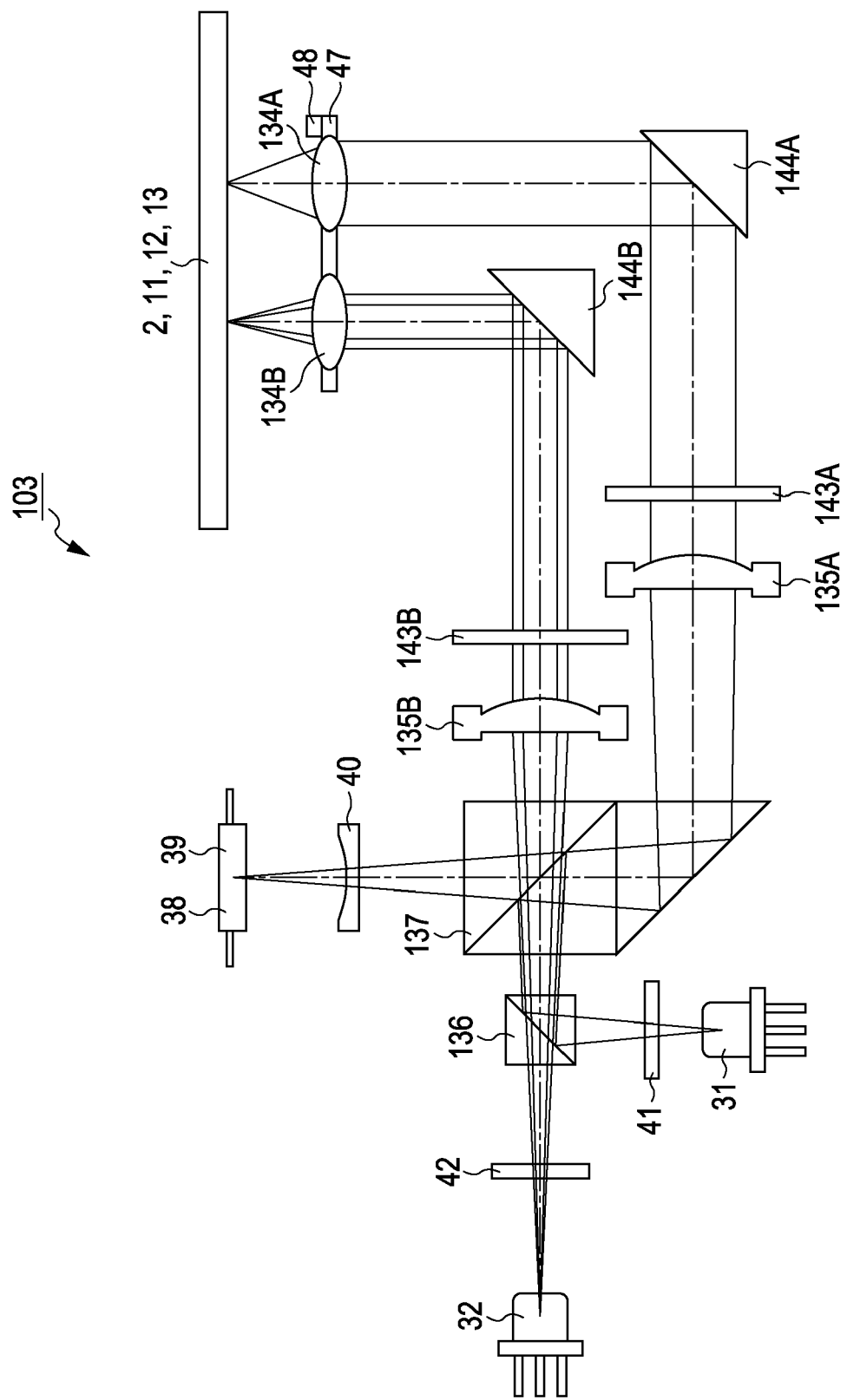
FIG. 14 is an optical path diagram illustrating the optical system having a so-called two-objective-lens configuration as another example of an optical pickup according to a second embodiment of the invention.

Next, the optical pickup 103, which is used in the above-mentioned optical disk apparatus 1, according to a second embodiment of the invention will be described with reference to FIG. 14. The optical pickup 103 is an optical pickup having a so-called two-objective-lens configuration including two types of the objective lenses. The two types include an objective lens 134A dedicated to the first optical disk which is a high density optical disk and an objective lens 134B dedicated to the second and third optical disks. The optical pickup 103 is a so-called three-wavelength compatible optical pickup for performing recording and reproducing on the first to third optical disks, similarly to the above-mentioned optical pickup 3 having a so-called one-objective-lens configuration. Furthermore, in the case where the elements common to the above-mentioned optical pickup 3 exist in the following description, those elements will be referenced by the same reference numerals and signs, and description thereof will be omitted.

The optical pickup 103 according to the embodiment of the invention includes the first light source section 31 and the second light source section 32. Further, the optical pickup 103 includes an objective lens 134A for collecting the light beam with first wavelength emitted from the first light source section 31 on the signal recording face of the first optical disk (a BD or the like). Further, the optical pickup 103 includes an objective lens 134B for collecting the light beams with the second and third wavelengths emitted from the second light source section 32 on the signal recording faces of the second and third optical disks (a DVD, a CD, or the like) respectively. The objective lenses 134A and 134B are movably held by the objective lens drive section 49 and are mounted on the common lens holder 47, similarly to the above-mentioned objective lens 34. The objective lenses 134A and 134B are driven by the objective lens drive section in the focus direction, the tracking direction, and the tilt direction.

Further, the optical pickup 103 includes collimator lenses 135A and 135B for changing the angles of divergence of the light beams with the respective wavelengths and guiding the beams to the corresponding objective lenses. The collimator lenses 135A and 135B are, similarly to the above-mentioned collimator lens 35, provided with the collimator lens drive section and the collimator position detection section as occasion arises.

Further, the optical pickup 103, similarly to the above-mentioned optical pickup 3, includes the first and second beam splitters 136 and 137 and the redirecting mirrors 144A and 144B for guiding the light beams to the corresponding optical components. Further, the optical pickup 103 includes the optical detector 39 having the common light receiving portion 38, the multi lens 40, the first and second gratings 41 and 42, and the control section 30.

The objective lens 134A constituting the optical pickup 103 is a one-wavelength-only objective lens as described above, and a single element objective lens which has a numerical aperture (NA) of around 0.85 and is made of plastic. Since the objective lens 134A is made of plastic, it is possible to achieve mass productivity and weight saving as compared with the glass lens. In the objective lens 134A, change in the cover layer thickness of the optical disk 2 may be caused by a manufacturing error and switching of the recording layers, and change in the environmental temperature may be caused. In this case, the collimator lens 135A is moved in the direction of the optical axis. In such a manner, by changing the incident magnification to the objective lens 134A, spherical aberration is corrected, that is, reduced. Further, in the objective lens 134A, the cover layer thickness and the environmental temperature may be changed, and the incident magnification of the light beam may be changed in accordance with the change in environmental temperature. In this case, by allowing the control section 30, which will be described later, to control the objective lens and allowing the objective lens drive section 49 to tilt the objective lens in the tilt direction, comatic aberration is canceled. Furthermore, the objective lens 134B constituting the optical pickup 103 is, as described above, an objective lens for the second and third optical disks, and two-wavelength-compatible objective lens corresponding to the optical disks such as a DVD and a CD which are generally used. As described above, in the optical pickup for performing recording and reading on the first to third optical disks, the objective lens 134A is used together with the objective lens 134B that collects the corresponding light beams on the second and third optical disks. The objective lens 134A is the one-wavelength-only objective lens that collects the light beam with first wavelength of around 400 to 410 nm corresponding to the first optical disk on the recording layer of the first optical disk.

In the objective lens 134A, assuming that the maximum lens tilt sensitivity at the n-th layer is $\Delta W_{LT\_Max\_Ln}$ under the use environment described in the above-mentioned objective lens 34, the relational expression of $0.034 \cdot f \leq \Delta W_{LT\_Max\_Ln} \leq 0.15 + 2.0 \cdot \Delta t_{L0-Ln}$ is satisfied in each layer. Further, assuming that the minimum lens tilt sensitivity at the n-th layer is $\Delta W_{LT\_Min\_Ln}$ under the use environment, the relational expression of $-0.053 \cdot f \leq \Delta W_{LT\_Min\_Ln} \leq 0.15 + 2.0 \cdot \Delta t_{L0-Ln} - 0.068 \cdot f$ is satisfied in each layer.

By satisfying the relational expressions, the objective lens 134A according to the embodiment of the invention is able to compensate comatic aberration even when the incident magnification is changed in accordance with temperature change and the like, and achieve favorable recording and reproducing characteristics. The relational expressions and the effects thereof will be described later in detail with reference to the following section 9.

Furthermore, the objective lens 134A is configured such that, in a environment-basis state, the lens tilt sensitivity for each recording layer is within the following predetermined range. The environment-basis state is that a temperature is 35° C., and a wavelength λ of the light beam is 405 nm. Specifically, in the objective lens 134A, assuming that the lens tilt sensitivity at the n-th layer is $\Delta W_{LT\_Ln\_TYP}$ under the environment-basis state, the relational expression of $-0.01 + 2.0 \cdot \Delta t_{L0-Ln} \leq \Delta W_{LT\_Ln\_TYP} \leq 0.04 + 2.0 \cdot \Delta t_{L0-Ln}$ is satisfied in each layer.

In the objective lens 134A, which satisfies the relational expression, according to the embodiment of the invention, by setting an appropriate lens tilt sensitivity on the basis in which the image height characteristics are considered, the following effects are obtained. That is, the objective lens 134A is able to compensate comatic aberration even when the incident magnification is changed in accordance with temperature change and the like, and further reduce an amount of comatic aberration in the use environment range. Thereby, the objective lens 134A achieves further favorable recording and reproducing characteristics.

The optical pickup 103 configured as described above drives to move the objective lenses 134A and 134B on the basis of the focus error signal and tracking error signal generated from the returning light detected by the optical detector 39. Then, the optical pickup 103 performs the focus servo and the tracking servo. In the optical pickup 103, the objective lenses 134A and 134B are driven to be moved to the focusing position on the signal recording face of the optical disk 2, and the light beams are focused on the signal recording face of the optical disk 2, thereby recording or reproducing the information signal on the optical disk 2. The optical pickup 103 is able to reduce comatic aberration caused by deformation of the optical disk and the like by allowing objective lens drive section 49 to tilt the objective lens 134A and the like in the tilt direction. With such a configuration, the optical pickup 103 and the optical disk apparatus 1 using the same have favorable recording and reproducing characteristics.

9. Regarding Range of Lens Tilt Sensitivity of Objective Lens Dedicated to High Density Recordable Optical Disk in Optical Pickup Having Two-Objective-Lens Configuration Next, description is made about an exemplary case of using the objective lens, which is dedicated to the first optical disk (the high density recordable optical disk) such as a BD, like the above-mentioned objective lens 134A. That is, the description is made about the range of the lens tilt sensitivity in a case of a so-called configuration using two objective lenses in which the one-wavelength-only objective lens 134A corresponding to the first optical disk in the three-wavelength compatible optical pickup and the different two-wavelength objective lens 134B are provided. Furthermore, in the case of the one-wavelength-only objective lens, the optical pickup itself may be dedicated to one wavelength. In this case, the optical pickup is free from the restriction described here, and obtains a desirable effect when being used in the same range as the above-mentioned section 7.

When the objective lens 134A dedicated to the first optical disk is used, it is difficult to exhibit a sufficient effect even in the ranges of Expressions (22A) and (22B) in the adjustment method of balancing with a coma amount of the objective lens 134B side dedicated to the second and third optical disks such as a DVD and a CD. In the case of the configuration having two objective lenses, the following restrictions are added to the definitions of Expressions (22A) and (22B). That is, in such a configuration, there is a difference between directions of comatic aberrations of the first optical disk (BD) and the second and third optical disks (DVD/CD) in the two objective lenses 134A and 134B which are the fixing portion and the movable portion of the optical pickup 103. Specifically, as shown in FIG. 13C, the direction of comatic aberration with respect to the first optical disk becomes, for example, the same direction as indicated by $C_{2B}$. In addition, the direction of comatic aberration with respect to the second and third optical disks becomes, for example, the same direction as indicated by $C_{2DC}$. From the state shown in FIG. 13C, by tilting the optical disk 2 or optical pickup 103 and relatively adjusting angles of those, it is possible to cancel the comatic aberration in one direction. For example, in FIG. 13C, $C_{2H}$ represents the direction of comatic aberration which is caused to be canceled by relatively adjusting the angles. FIG. 13D is a diagram illustrating the state, in which the comatic aberration is canceled by causing comatic aberration with the direction represented by $C_{2H}$ against the comatic aberrations with the directions $C_{2B}$ and $C_{2DC}$ shown in FIG. 13C. It can be seen from the drawing that the total comatic aberration in the second and third optical disks becomes substantially 0. In FIG. 13D, $C_{2TB}$ represents the direction of total comatic aberration in the first optical disk. Furthermore, $C_{2TB}$ means that the comatic aberration with the direction $C_{2H}$ subject to the relative angle adjustment has no cancel effect on the comatic aberration with the direction $C_{2B}$ in the objective lens and the fixing portion of the optical pickup 3 and thus comatic aberration remains. As shown in FIGS. 13C and 13D mentioned above, the difference of the coma directions formed between the first optical disk (BD) and the second and third optical disks (DVD/CD) is accumulated on the first optical disk side without the cancel effect when being adjusted by the second optical disk.

Here, a study is conducted on the allowance of comatic aberration $W_{max}$, at each layer in the case where the comatic aberration adjustment is performed on the second optical disk (DVD) by relatively adjusting the angles of the optical disk and the optical pickup 3 as shown in FIGS. 13C and 13D. In this case, as described above, the amount of comatic aberration is added to the first optical disk (BD) side by an amount of the adjustment. Consequently, assuming that the amount of adjusted comatic aberration is $W_{BD-DVD}$, the allowance of comatic aberration $W_{Max\_L0'}$ at L0 layer can be calculated from Expression (23A), and the allowance of comatic aberration $W_{Max\_L1'}$ at L1 layer can be calculated from Expression (23B).

$$W_{Max\_L0'} = W_{Max\_L0} - W_{BD-DVD} \tag{23A}$$

$$W_{Max\_L1'} = W_{Max\_L1} - W_{BD-DVD} \tag{23B}$$

Further, since $W_{BD-DVD} = W_{BD-CD} = 0.015$ λrms or so, the relationship between following Expressions (24A) and (24B) is calculated from Expressions (23A) and (23B) and the above-mentioned Expressions (8A) and (8B).

$$W_{Max\_L0'} = 0.022 \tag{24A}$$

$$W_{Max\_L1'} = 0.031 \tag{24B}$$

By using the same concept as the above-mentioned Expressions (9A) and (9B), the amounts of the maximum lens tilt sensitivities $\Delta W_{LT\_Max\_L0'}$ and $\Delta W_{LT\_Max\_L1'}$ at the respective layers are calculated as the following Expressions (25A) and (25B) from Expressions (24A) and (24B).

$$\Delta W_{LT\_Max\_L0'} = 0.15 \tag{25A}$$

$$\Delta W_{LT\_Max\_L1'} = 0.21 \tag{25B}$$

As described above, in the case of the objective lens dedicated to the first optical disk in the three-wavelength compatible optical pickup, when the adjustment in the objective lens on the second optical disk (DVD) side is performed, it is necessary for the objective lens to satisfy the upper limit defined in the above-mentioned Expressions (25A) and (25B). Further, also in this case, the objective lens is restricted by Expression (10) as defined in Expressions (11) and (12).

That is, the maximum lens tilt sensitivity at each layer defined in Expressions (25A) and (25B) is restricted by the relationship of Expression (10) on the basis of the linear relationship between the lens tilt sensitivity and the cover layer thickness. Similarly to the above-mentioned Expression (12), when this is studied in the case of the general multi-layered optical disk, it is necessary for the maximum value of the lens tilt sensitivity to be defined as Expression (25C) on the basis of the L0 layer.

$$\Delta W_{LT\_Max\_Ln'} \leq \Delta W_{LT\_Max\_Max\_L0'} = \Delta W_{LT\_Max\_L0'} + k_{LT\_i} \cdot \Delta t_{L0\text{-}Ln} = 0.15 + 2.0 \cdot \Delta t_{L0\text{-}Ln} \tag{25C}$$

Further, the other restriction, which defines the lower limits of the maximum and minimum lens tilt sensitivity and the like, is the same as described in the above-mentioned section 6 "Regarding Lower Limit of Lens Tilt Sensitivity of Objective Lens". By using Expressions (13) to (21), the relationship the same as described above is derived.

In the case of the objective lens dedicated to the first optical disk in the three-wavelength compatible optical pickup, the maximum and minimum values of the maximum and minimum lens tilt sensitivities can be defined from the same relationship as defined by Expression (25C) and the above-mentioned Expressions (18) to (20). Specifically, on the basis of the same relationship as Expression (25C) and the above-mentioned Expression (18), the range of the maximum lens tilt sensitivity in Expression (26A) can be derived. Further, on the basis of the same relationship as Expression (25C) and the above-mentioned Expressions (19) and (21), the range of the minimum lens tilt sensitivity in Expression (26B) can be derived.

$$0.034 \cdot f \leq \Delta W_{LT\_Max\_Ln} \leq 0.15 + 2.0 \cdot \Delta t_{L0-Ln} \quad (26A)$$

$$-0.053 \cdot f \leq \Delta W_{LT\_Min\_Ln} \leq 0.15 + 2.0 \cdot \Delta t_{L0-Ln} - 0.068 \cdot f \quad (26B)$$

The objective lens dedicated to the high density recordable optical disk provided in the optical pickup of the so-called two-objective-lens configuration is configured to satisfy the above-mentioned Expressions (26A) and (26B), thereby exhibiting the following effects. Specifically, with such a configuration, even when the initial adjustment at the time of manufacture is performed on any one of the two objective lenses, it is possible to reduce comatic aberration on the objective lens side dedicated to the high density recordable optical disk with a strict condition. That is, with such a configuration, it is possible to prevent various signal deterioration due to an excess of the allowance of comatic aberration significantly caused by the tangential surface vibration on the objective lens side dedicated to the high density recordable optical disk with the strict condition. Thereby, the other objective lens can be assembled in a state where aberrations are sufficiently reduced by the initial adjustment at the time of manufacturing the optical pickup, and it is possible to perform favorable recording and reproducing on the second and third optical disks by using the general objective lens. Consequently, such an objective lens dedicated to the high density recordable optical disk configured as described above is able to compensate comatic aberration even when the incident magnification is changed in accordance with temperature change and the like, and achieve favorable characteristics in recording and reproducing performed by the optical pickup.

The objective lens 134A and the optical pickup 103 using the same according to the embodiment of the invention are able to improve mass productivity and achieve weight saving while compensating comatic aberration even when environmental temperature is changed in a way that the objective lens is made of plastic. The objective lens 134A and the optical pickup 103 are able to improve mass productivity and achieve weight saving while achieving favorable recording and reproducing characteristics by satisfactorily correcting aberrations.

Furthermore, also in the case of the objective lens dedicated to the first optical disk in the three-wavelength compatible optical pickup, the relative angle adjustment represented by $C_{2H}$ shown in FIG. 13C can be performed to cancel the comatic aberration in the first optical disk. When the objective lens dedicated to the first optical disk is adjusted, the restriction of the comatic aberration in the first optical disk is the same as the case of the one-objective-lens configuration, and thus it is possible to achieve compensation of comatic aberration. That is, when any one of the objective lenses is adjusted, the objective lens dedicated to the first optical disk is configured to satisfy the definition of the above-mentioned Expressions (26A) and (26B), and thereby it is possible to achieve compensation of comatic aberration. In the optical pickup, as described above, the objective lens dedicated to the first optical disk satisfies such a configuration, and is able to prevent the coma adjustment from having an effect on the second and third optical disks when the objective lens for the second and third optical disks is adjusted.

10. Regarding Condition for Obtaining Optimum Lens Tilt Sensitivity

Next, as a condition for further obtaining the optimum lens tilt sensitivity, a method of reducing the lens tilt sensitivity will be described. The method is applicable to the above-mentioned three-wavelength compatible objective lens 34 and also the one-wavelength-only objective lens 134A, and it is possible to obtain the excellent effects to be described later in each case. The upper limit of the lens sensitivity is defined as described above, but hereinafter, in further consideration of comatic aberration of the entire optical system, the optimum lens tilt sensitivity is further defined for the objective lens constituting the optical pickup.

Generally, when the lens tilt sensitivity is changed, the image height characteristics are fluctuated in accordance therewith. Accordingly, when the lens tilt sensitivity is reduced as described above, the image height characteristics becomes trade-off, and there is a concern about deterioration in the characteristics. The method of determining the range of the lens tilt sensitivity in consideration of balance between reduction in lens tilt sensitivity and fluctuation in image height characteristics is adopted below.

The image height sensitivity $\Delta W_{IH}$ is expressed by the sum of the lens tilt sensitivity $\Delta W_{LT}$ and the disk tilt sensitivity $\Delta W_{DT}$, that is, has a relationship as represented by the following Expression (27).

$$\Delta W_{IH} = \Delta W_{LT} + \Delta W_{DT} \quad (27)$$

The disk tilt sensitivity is defined by the cover layer thickness and the numerical aperture NA, and thus is a constant value regardless of the specification of the objective lens and design when a format thereof is determined. This is the same as represented by the following Expression (28A), and the relationship of Expression (28B) is derived from Expressions (28A) and (27).

$$\Delta W_{DT} = \text{Const.} \quad (28A)$$

$$\Delta W_{IH} = \Delta W_{LT} + \text{Const.} \quad (28B)$$

Accordingly, in order to decrease lens tilt sensitivity, the image height should be decreased. This point is described with reference to FIGS. 15A to 15F. As shown in FIGS. 15A to 15C, in the general aplanatic design, the lens tilt sensitivity is selected such that the lens tilt sensitivity and the disk tilt sensitivity are canceled to each other. That is, the aplanatic design means that the image height sensitivity is designed to be 0 on the design basis, and the general lens is formed in such a condition. Thereby, the image height sensitivity is set to 0 as represented by Expression (27) and shown in FIG. 15A. Here, FIG. 15B and FIG. 15E to be described later show the lens tilt sensitivity, and FIGS. 15C and 15F show the disk tilt sensitivity. In addition, as described in Expression (27), the image height sensitivity shown in FIG. 15A is the sum of the lens tilt sensitivity shown in FIG. 15B and the disk tilt sensitivity shown in FIG. 15C, and the image height sensitivity shown in FIG. 15D is the sum of the lens tilt sensitivity shown in FIG. 15E and the disk tilt sensitivity shown in FIG. 15F. In FIGS. 15A to 15F, the horizontal axis represents an angle [deg], and the vertical axis represents 3rd order comatic aberration (referred to as "COMA3") with respect to the angle. In FIGS. 15A to 15C, when the lens tilt sensitivity is changed as shown in FIG. 15E, the image height characteristic is fluctuated. The reason is that the disk tilt sensitivity is substantially determined by the format and is constant. In addition, since the lens tilt sensitivity is decreased, it means that comatic aberration is caused by off-axis incident rays when design to decrease the image height is performed. As shown in FIG. 15 mentioned above, when the lens tilt sensitivity is fluctuated, there is a concern about deterioration in image height characteristics.

However, the image height indicates an amount of comatic aberration caused when the luminescent point is deviated from the optical axis. Generally, the image height $\Delta\theta_{IH}$ results from an installation error of the collimator lens. This is approximately $\Delta\theta_{IH}$=0.1 deg. Since the objective lens side is tilted by $\Delta\theta_{LT}$=0.15 deg as a tilt allowance, it can be figured out that it is advantageous to assign a lot of sensitivity to the image height side. In other words, as shown in FIG. 15B, in a case where the lens tilt sensitivity is positive, by canceling the lens tilt sensitivity and the disk tilt sensitivity to each other, it is possible to set the image height sensitivity to be close to 0. In contrast, in a case where the lens tilt sensitivity is negative, the lens tilt sensitivity is added to the disk tilt sensitivity, and thus a large absolute value of image height sensitivity is obtained. This is the reason of the above.

Next, the amount of comatic aberration $W_{Coma\_Total}$ of the optical system canceled by the image height and the lens tilt is written as the relationship of Expression (29).

$$W_{Coma\_Total} = \sqrt{(\Delta\theta_{IH} \cdot \Delta W_{IH})^2 + (\Delta\theta_{LT} \cdot \Delta W_{LT})^2} \quad (29)$$
$$= \sqrt{(\Delta\theta_{IH} \cdot (\Delta W_{LT} \cdot \Delta W_{DT}))^2 + (\Delta\theta_{LT} \cdot \Delta W_{LT})^2}$$
$$= \sqrt{(\Delta\theta_{IH}^2 \cdot \Delta\theta_{LT}^2) \cdot \Delta W_{LT}^2 + 2\Delta\theta_{IH}^2 \cdot \Delta W_{DT} \cdot \Delta W_{LT} + \Delta\theta_{IH}^2 \cdot \Delta W_{DT}^2}$$

Here, the reason why root mean square relational expression is used in Expression (29) is that the respective unbalance problems are considered in view of mass productivity and the total amount is almost no matter. The minimum value of $W_{Coma\_Total}$ represented in Expression (29) is given when $\Delta W_{LT}$ satisfies the following Expression (30). By using the lens tilt sensitivity around the minimum value of $W_{Coma\_Total}$, it is possible to obtain the above-mentioned advantages due to the lens tilt sensitivity and the image height characteristics in the appropriate range in use.

$$\Delta W_{LT} = \frac{\Delta\theta_{IH}^2 \cdot \Delta W_{DT}}{\Delta\theta_{IH}^2 + \Delta\theta_{LT}^2} \quad (30)$$

$\Delta\theta_{IH}$=0.1 and $\Delta\theta_{LT}$=0.15, which are actual values, are used in Expression (30), and then Expression (31) is obtained. Further, when $\Delta W_{DT}$ at each of layers L0 and L1 is used in Expression (31), $\Delta W_{LT\_L0}$ is obtained by Expression (32A), and then $\Delta W_{LT\_L1}$ is obtained by Expression (32B).

$$\Delta W_{LT} = -0.31 \cdot \Delta W_{DT} \quad (31)$$

$$\Delta W_{LT\_L0} = 0.033 \quad (32A)$$

$$\Delta W_{LT\_L1} = 0.025 \quad (32B)$$

Figure 16:
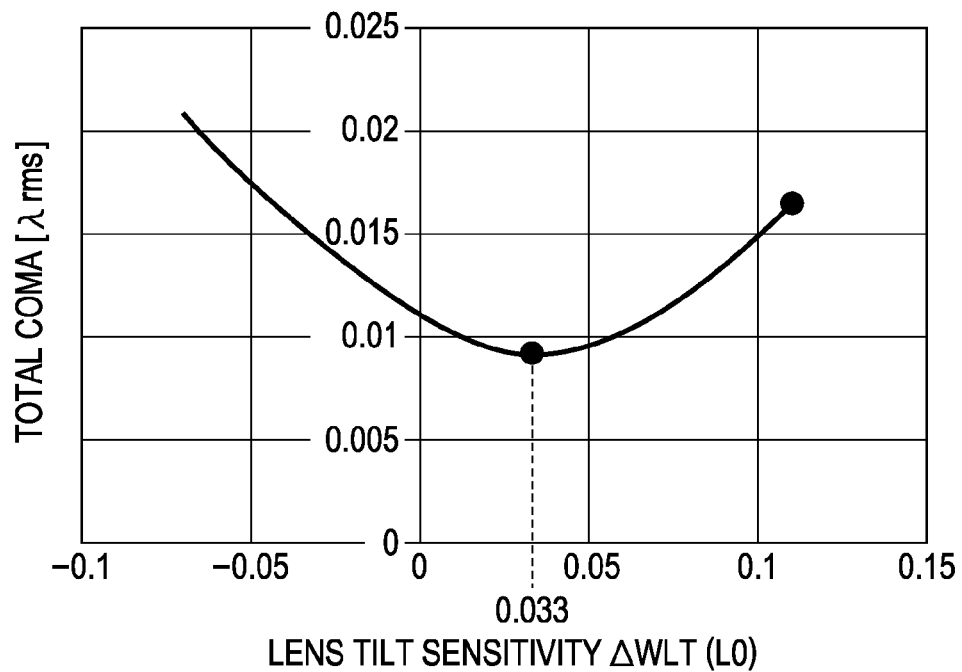
FIG. 16 is a diagram illustrating change in a total amount of comatic aberration caused by fluctuation of the lens tilt sensitivity, and illustrating change in a total amount of comatic aberration $W_{Coma\_Total\_L0}$ relative to the lens tilt sensitivity $\Delta W_{LT\_L0}$ in the L0 layer.
Figure 17:
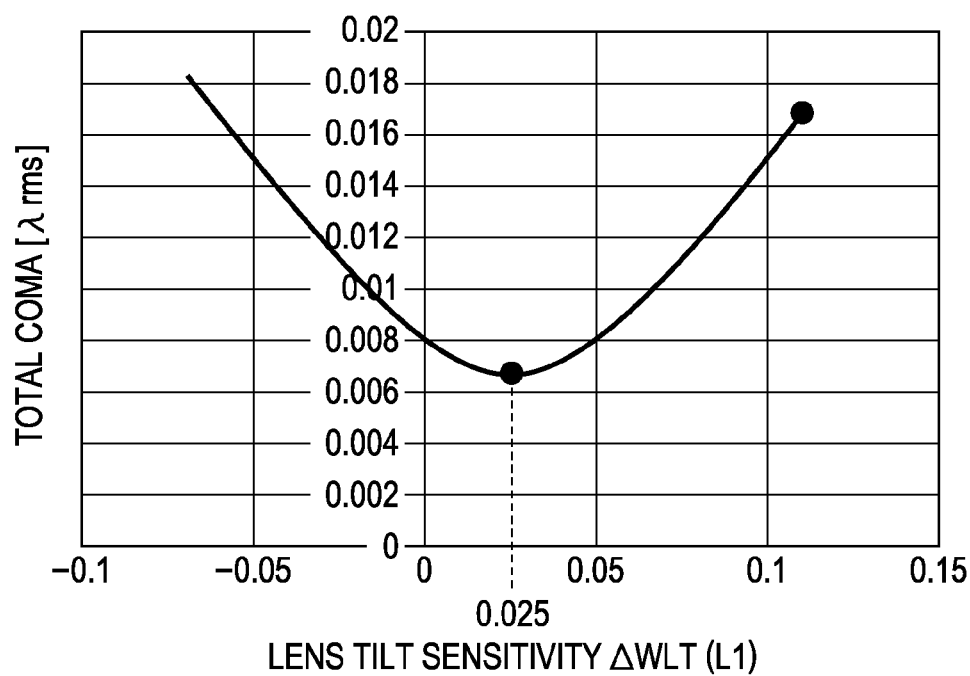
FIG. 17 is a diagram illustrating change in a total amount of comatic aberration caused by fluctuation of the lens tilt sensitivity, and illustrating change in a total amount of comatic aberration $W_{Coma\_Total\_L1}$ relative to the lens tilt sensitivity $\Delta W_{LT\_L1}$ in the L1 layer.

When the design basis is set near the value obtained in Expressions (32A) and (32B), it is possible to reduce the amount of comatic aberration as a whole. FIGS. 16 and 17 show the relationship between $\Delta W_{LT}$ and the total amount of comatic aberration at this time. In FIG. 16 and FIG. 17, the horizontal axis represents the lens tilt sensitivity ($\Delta W_{LT}$) at each of L0 and L1 layers, and the vertical axis represents the total coma [λrms] expressed as $W_{Coma\_Total}$ calculated in Expression (29) at this time. On the other hand, since the relationship of Expression (10) is established in the same manner as described above, it is also necessary to establish the relationship of Expressions (33A) and (33B).

$$\Delta W_{LT\_L0} = W_{LT\_LCen} - 0.025 \quad (33A)$$

$$\Delta W_{LT\_L1} = \Delta W_{LT\_LCen} + 0.025 \quad (33B)$$

Figure 18:
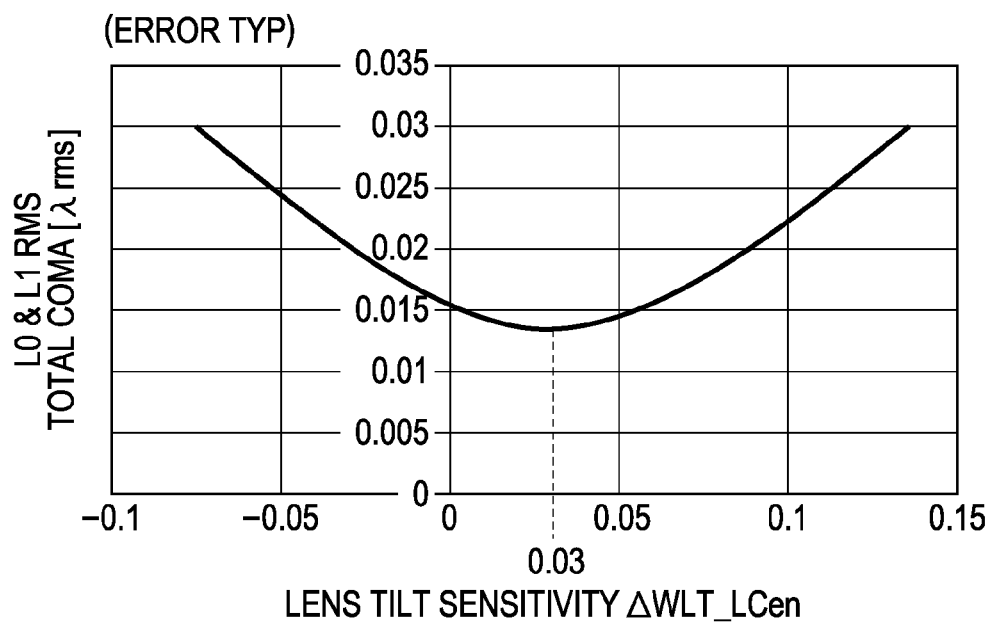
FIG. 18 is a diagram illustrating change in a root-mean-square value of a total amount of comatic aberration $W_{RMS\_L0L1\_Coma\_Total}$ of the L0 and L1 layers relative to a lens tilt sensitivity $\Delta W_{LT\_LCen}$ in an LCen layer in a case of an error TYP condition ($\Delta\theta_{IH}=0.1$, $\Delta\theta_{LT}=0.15$)

$W_{RMS\_L0L1\_Coma\_Total}$ representing the root mean square (RMS) of the total comatic aberration caused at each of the L0 and L1 layers is given by Expression (34). FIG. 18 shows the segment by which the relationship between $W_{RMS\_L0L1\_Coma\_Total}$ and $\Delta W_{LT\_LCen}$ is plotted from the relationship between Expression (34) and the above-mentioned Expressions (29), (33A), and (33B).

$$W_{RMS\_L0L1\_Coma\_Total} = \sqrt{W_{Coma\_Total\_L0}^2 W_{Coma\_Total\_L1}^2} \quad (34)$$

Figure 19:
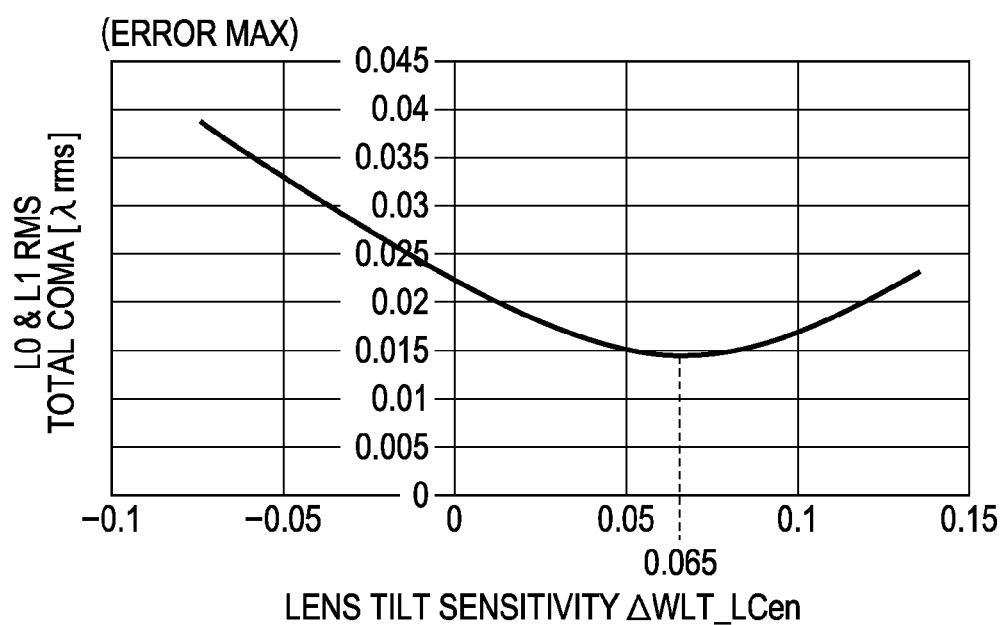
FIG. 19 is a diagram illustrating change in a root-mean-square value of a total amount of comatic aberration $W_{RMS\_L0L1\_Coma\_Total}$ of the L0 and L1 layers relative to a lens tilt sensitivity $\Delta W_{LT\_LCen}$ in the LCen layer in a case of an error MAX condition ($\Delta\theta_{IH}=0.15$, $\Delta\theta_{LT}=0.1$)
Figure 20:
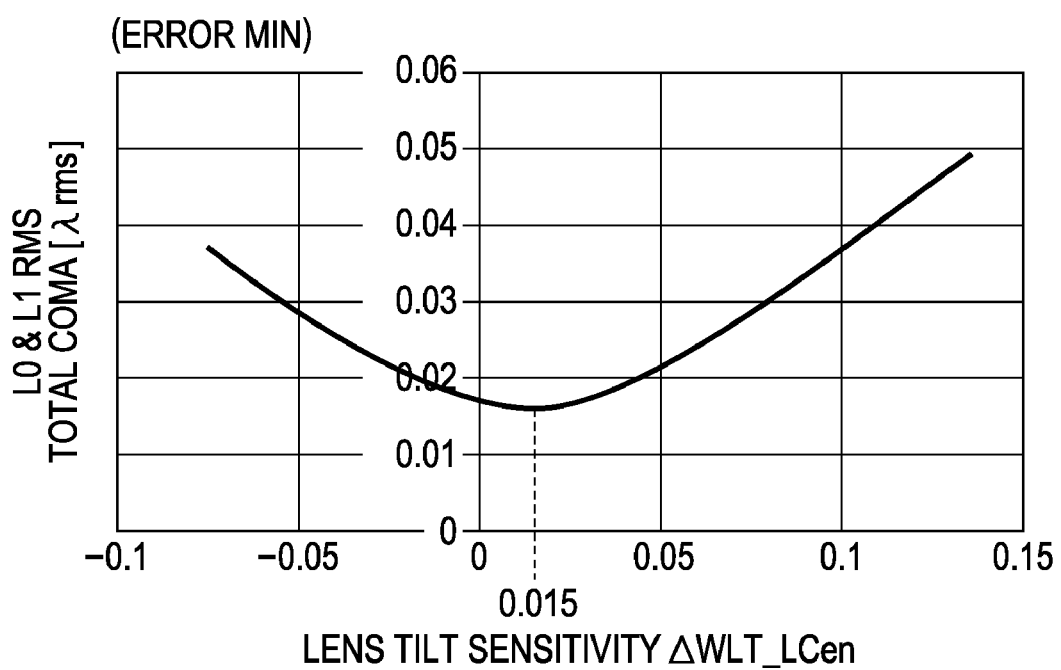
FIG. 20 is a diagram illustrating change in a root-mean-square value of a total amount of comatic aberration $W_{RMS\_L0L1\_Coma\_Total}$ of the L0 and L1 layers relative to a lens tilt sensitivity $\Delta W_{LT\_LCen}$ in the LCen layer in a case of an error MIN condition ($\Delta\theta_{IH}=0.1$, $\Delta\theta_{LT}=0.25$)

As can be seen from the result shown in FIG. 18, when $\Delta W_{LT\_LCen}$=0.03, a value of $W_{RMS\_L0L1\_Coma\_Total}$ is the minimum, that is, the total amount of aberration is the minimum and is appropriate. In practice, deviation amount of $\Delta\theta_{IH}$ and $\Delta\theta_{LT}$ changes in accordance with the alignment method at the time of manufacturing the optical pickup, and thus it is necessary to consider the maximum and minimum deviation amounts of $\Delta\theta_{IH}$ and $\Delta\theta_{LT}$ as the deviation of manufacture tolerance. Here, as the alignment at the time of manufacture, it may be considered that $\Delta\theta_{IH}$ is around 0.1 to 0.15 and $\Delta\theta_{LT}$ is around 0.1 to 0.25. Accordingly, assuming that a MAX condition as a maximum condition is $\Delta\theta_{IH}$=0.15 and $\Delta\theta_{LT}$=0.1, the relationship shown in FIG. 19 is established. In addition, assuming that a MIN condition as a minimum condition is $\Delta\theta_{IH}$=0.1 and $\Delta\theta_{LT}$=0.25, the relationship shown in FIG. 20 is established. Furthermore, in FIGS. 18 to 20, the horizontal axis represents the lens tilt sensitivity ($\Delta WLT\_LCen$) at the center of the cover layer thickness Lcen, and the vertical axis represents the root mean square of the total comatic aberration caused at each of the L0 and L1 layers calculated by Expression (29) at the center. As a condition, FIG. 18 shows a case of a so-called error TYP condition in which $\Delta\theta_{IH}$=0.1 and $\Delta\theta_{LT}$=0.15. FIG. 19 shows a case of an error MAX condition in which $\Delta\theta_{IH}$=0.15 and $\Delta\theta_{LT}$=0.1, and FIG. 20 shows a case of an error MIN condition in which $\Delta\theta_{IH}$=0.1 and $\Delta\theta_{LT}$=0.25. As can be seen from FIGS. 19 and 20, the lens tilt sensitivity $\Delta W_{LT\_LCen\_TYP}$ satisfies the relationship of Expression (35) at the cover layer thickness LCen in the TYP condition on the environment basis.

$$0.015 \leq \Delta W_{LT\_LCen\_TYP} \leq 0.065 \quad (35)$$

Here, as described above, Expression (35) is established when NA>0.8, the environmental temperature is 35° C., the wavelength λ is equal to 405 nm, and the cover layer thickness is 0.0875 mm. Here, the algebraic sign is biased to the positive side. The reason is that, on the negative side of the lens tilt, the absolute value of the image height sensitivity increases as the absolute value of the lens tilt sensitivity increases, and this moves only in an adverse direction. When Expression (35) is changed by the restriction of Expression (10), the following Expression (36) is obtained. Specifically, by using the relationship between Expression (10) and maximum $k_{LT\text{-}t}$=2.0, the cover layer thickness of Expression (35) is changed from LCen to L0. In this case, $\Delta t_{LCen\text{-}L0}$=−0.0125. This can be changed into $0.015 + k_{LT\text{-}t} \cdot \Delta t_{LCen\text{-}L0} \leq \Delta W_{LT\_L0\_TYP} \leq 0.065 + k_{LT\text{-}t} \cdot \Delta t_{LCen\text{-}L0}$. By changing this, the relationship of 0.015−0.025 ≤ $\Delta W_{LT\_L0\_TYP}$ ≤ 0.065−0.025 is obtained. This can further be changed into $-0.01 \leq \Delta W_{LT\_L0\_TYP} \leq 0.04$. Furthermore, when the respective layers are defined on the basis of the L0 layer, also Expression (10) is added to the present expression, thereby obtaining the following Expression (36).

$$-0.01+2.0 \cdot \Delta t_{L0\text{-}Ln} \leq \Delta W_{LT\_Ln\_TYP} \leq 0.04+2.0 \cdot \Delta t_{L0\text{-}Ln} \quad (36)$$

By satisfying Expression (36), the objective lens is able to further reduce comatic aberration of the optical system on the basis in which the disk tilt sensitivity and the image height sensitivity are considered. Furthermore, the relationship of Expression (36) is applicable to any one of the objective lens 34 of the optical pickup 3 having the so-called one-objective-lens configuration and the objective lens 134A for the high density recordable optical disk of the optical pickup 103 having the so-called two-objective-lens configuration, and thus the above-mentioned desirable effects are obtained.

With such a configuration satisfying the above mentioned Expression (36), the objective lenses 34 and 134A and the optical pickups 3 and 103 using the same according to the embodiment of the invention are able to not only compensate comatic aberration but also further reduce comatic aberration of the entire optical system of the optical pickup even when environmental temperature is changed. Accordingly, the objective lenses 34 and 134A, which further satisfy Expression (36), and the optical pickups 3 and 103, which have these lenses, are able to improve mass productivity, achieve weight saving, and further reduce aberrations, thereby achieving favorable recording and reproducing characteristics.

11. Regarding Diffractive Structure in Three-wavelength compatible Objective Lens Described Herein is, in order to describe a diffractive structure for achieving the three-wavelength compatibility, an objective lens 34A provided with a diffractive portion 50 for achieving the three-wavelength compatibility shown in FIG. 21 as an example of the objective lens 34 constituting the above-mentioned optical pickup 3. Furthermore, the diffractive portion 50 may be provided separately from the objective lens. That is, instead of the objective lens 34A, the objective lens 34B having only a diffractive function and a diffractive optical element 34C having the diffractive portion 50 are provided as shown in FIG. 22.

The objective lens 34A shown in FIG. 21 is provided with the diffractive portion 50 including a plurality of diffraction areas formed on one surface of the lens such as the incident side surface. By using the diffractive portion 50, the objective lens 34A diffracts the respective light beams with first to third wavelengths transmitted through the respective plurality of diffraction areas so that the beams have predetermined diffraction order numbers. As described above, the diffractive portion 50 allows the light beams to have a predetermined angle of divergence in the divergent state or the convergent state and to be incident into the objective lens 34A. In addition, by using a single objective lens 34A, the diffractive portion 50 is able to collect appropriately the light beams with first to third wavelengths on the signal recording faces of the corresponding three type optical disks so as not to cause spherical aberration. That is, the objective lens 34A having the diffractive portion 50 has a diffractive structure, which is configured to generate a diffractive power, formed on the basis of the lens surface shape which is configured to generate a refractive power as a basis. With such a configuration, the objective lens 34A functions as a light collecting optical device that appropriately collects the light beams with three different wavelengths on the signal recording faces of the optical disks corresponding thereto without causing spherical aberration. Further, as described above, the objective lens 34A has a function of a refractive element in combination with a function of a diffraction element. That is, the objective lens 34A has a refractive function resulting from a curved surface of the lens in combination with a diffractive function resulting from the diffractive portion 50 provided on one surface.

Described herein is, in order to describe the diffractive function of the diffractive portion 50 conceptually, an exemplary case (refer to FIG. 22) where the diffractive portion 50 is provided on the diffractive optical element 34C separate from the objective lens 34B having the refractive power as described later. The diffractive optical element 34C, which is used together with the objective lens 34B having only the refractive function and has the diffractive portion 50 as described later, has, for example, the following diffractive effects on the light beams with the respective wavelengths. As shown in FIG. 23A, the diffractive portion 50 diffracts the light beam with first wavelength BB0, which is transmitted through the diffractive portion 50, into +1st order diffracted light BB1, and allows the beams to be incident to the objective lens 34B. That is, the diffractive portion 50 allows the light beams to have a predetermined angle of divergence in a divergent state and to be incident to the objective lens 34B. Thereby, the diffractive portion 50 is able to collect the light beam appropriately on the signal recording face of the first optical disk 11. As shown in FIG. 23B, the diffractive portion 50 diffracts the light beam with second wavelength BD0, which is transmitted through the diffractive portion 50, into −1st order diffracted light BD1, and allows the beams to be incident to the objective lens 34B. That is, the diffractive portion 50 allows the light beams to have a predetermined angle of divergence in a convergent state and to be incident to the objective lens 34B. Thereby, the diffractive portion 50 is able to collect the light beam appropriately on the signal recording face of the second optical disk 12. As shown in FIG. 23C, the diffractive portion 50 diffracts the light beam with third wavelength BC0, which is transmitted through the diffractive portion 50, into −2nd order diffracted light BC1, and allows the beams to be incident to the objective lens 34B. That is, the diffractive portion 50 allows the light beams to have a predetermined angle of divergence in a convergent state and to be incident to the objective lens 34B. Thereby, the diffractive portion 50 is able to collect the light beam appropriately on the signal recording face of the third optical disk 13. The diffractive portion 50 and the diffractive optical element 34C are able to collect light beams appropriately on the signal recording faces of the three type optical disks without causing spherical aberration by using the single objective lens 34B. Furthermore, here, description was made about an example, in which the light beams with the same wavelength is changed into diffracted light beams with the same diffraction order number in a plurality of diffraction areas of the diffractive portion 50, with reference to FIG. 23. That is, the diffractive portion 50 constituting the optical pickup 3 according to the embodiment of the invention is, as described later, able to set diffraction order numbers corresponding to the respective wavelengths for each area, perform appropriate aperture restriction, and reduce spherical aberration. In the above embodiment, the case where the diffractive portion 50 is provided on the optical element separate from the objective lens is exemplified for explanation. However, the diffractive portion 50 integrally provided on the one surface of the objective lens 34A described herein is also has the same function by applying a diffractive power thereto in accordance with the diffractive structure. Consequently, the objective lens shown in FIG. 21 is able to collect the light beams with the respective wavelength appropriately on the signal recording faces of the corresponding optical disks so as not to cause spherical aberration by a diffractive power of the diffractive portion 50 and a refractive power resulting from the curved surface of the lens as a basis of the objective lens 34A.

Regarding the above-mentioned and the following descriptions of the diffraction order number, the diffraction order number of the incident light beam, which is diffracted in a direction of approaching the optical axis side as it propagates in an advance direction, is defined as a positive diffraction order number, and the diffraction order number of the incident light beam, which is diffracted in a direction of separating from the optical axis side as it propagates in an advance direction, is defined as a negative diffraction order number. In other words, the diffraction order number of the incident light beam, which is diffracted toward the direction of the optical axis, is defined as a positive diffraction order number.

Figure 21A:
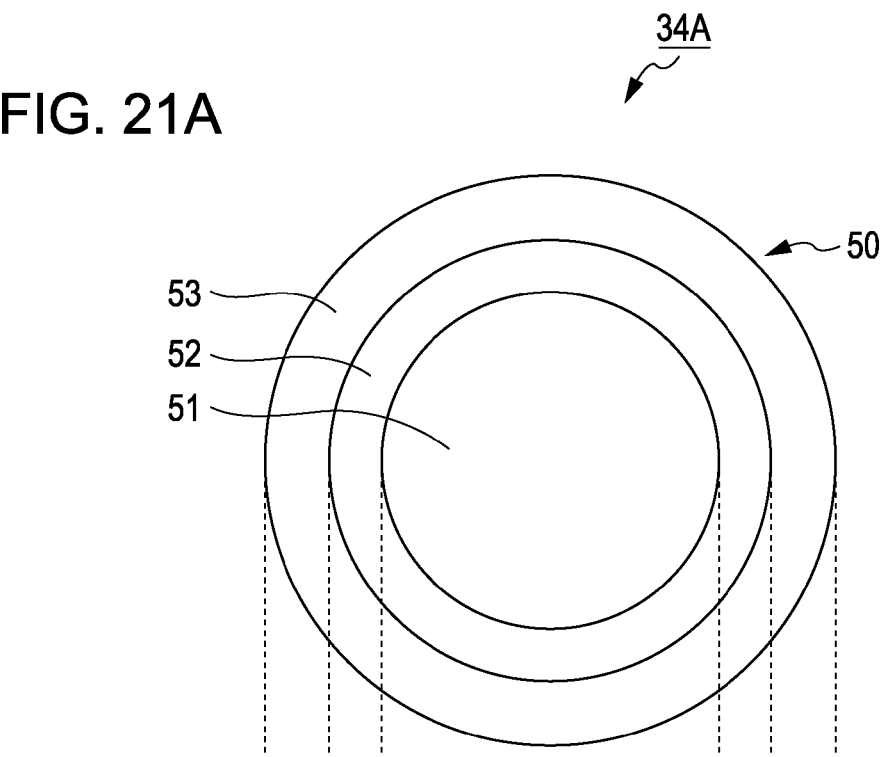
FIGS. 21A and 21B are diagrams illustrating an objective lens having a diffractive structure as an example of the objective lens constituting the optical pickup shown in FIG. 2, where
Figure 21B:
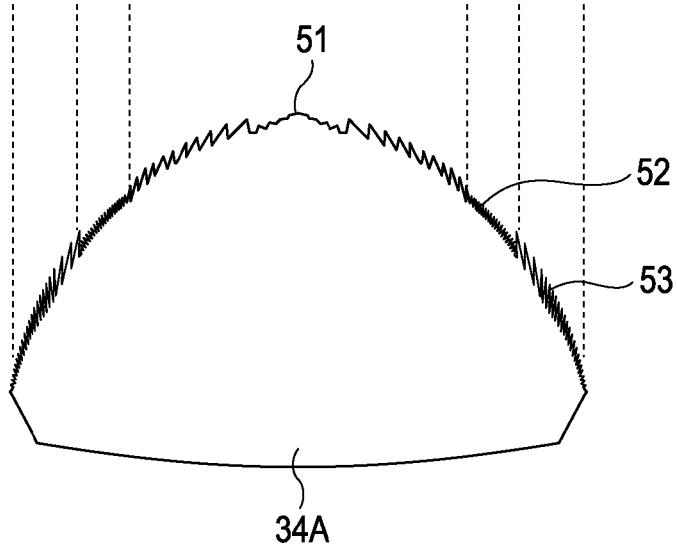

Specifically, as shown in FIGS. 21A and 21B, the diffractive portion 50 provided on the incident side surface of the objective lens 34A has a first diffraction area (hereinafter, referred to as an "inner orbicular zone") 51 which is provided in the innermost peripheral portion and has a substantially circular shape. Further, the diffractive portion 50 is provided outside the first diffraction area 51, and has a second diffraction area (hereinafter, referred to as an "intermediate orbicular zone") 52 which has an orbicular zone shape. Further, the diffractive portion 50 is provided outside the second diffraction area 52, and has a third diffraction area (hereinafter, referred to as an "outer orbicular zone") 53 having an orbicular zone shape.

The first diffraction area 51 as the inner orbicular zone has a first diffractive structure which has an orbicular zone shape and has a predetermined depth. The first diffraction area 51 is configured to generate diffracted light so that the diffracted light with the diffraction order number, which is collected through the objective lens 34A to form an appropriate spot on the signal recording face of the first optical disk, of the light beam with first wavelength transmitted therethrough is dominant. Consequently, the first diffraction area 51 makes the diffraction order number have the maximum diffraction efficiency relative to the diffracted light with other diffraction order numbers.

Further, by using the first diffractive structure, the first diffraction area 51 is configured to generate diffracted light so that the diffracted light with the diffraction order number, which is collected through the objective lens 34A to form an appropriate spot on the signal recording face of the second optical disk, of the light beam with second wavelength transmitted therethrough is dominant. Consequently, the first diffraction area 51 makes the diffraction order number have the maximum diffraction efficiency relative to the diffracted light with other diffraction order numbers.

Further, by using the first diffractive structure, the first diffraction area 51 is configured to generate diffracted light so that the diffracted light with the diffraction order number, which is collected through the objective lens 34A to form an appropriate spot on the signal recording face of the third optical disk, of the light beam with third wavelength transmitted therethrough is dominant. Consequently, the first diffraction area 51 makes the diffraction order number have the maximum diffraction efficiency relative to the diffracted light with other diffraction order numbers.

As described above, the first diffraction area 51 has a diffractive structure that is suitable in order for the diffracted light with the above-mentioned predetermined diffraction order number to be dominant to the light beams of the respective wavelengths. Thereby, the first diffraction area 51 is able to correct and reduce spherical aberration caused when the light beams with the respective wavelengths, which are transmitted through the first diffraction area 51 and are changed into the diffracted light with the predetermined diffraction order number, are collected by the objective lens 34A on the signal recording faces of the respective optical disks. Furthermore, in the first diffraction area 51 and the second and third diffraction areas 52 and 53 to be described later in detail, the diffracted light with the predetermined diffraction order numbers is selected so as to be dominant to the light beams with the respective wavelengths include the transmitted light, that is, 0th order light as described above and later.

Further, the first diffractive structure and the diffractive structures formed on the second and third diffraction areas 52 and 53 to be described later have the orbicular zone shapes, and are periodic structures in which unitary periodic structures having a concave and convex shape formed of a plurality of steps and the like relative to the reference surface are successively formed in a radial direction of the orbicular zone. Here, the respective diffractive structures are formed with a pitch which is constant or changed continuously, in which heights of the respective steps relative to the reference surface in the direction of the optical axis and ratios of widths of the respective steps to the width of one period are formed to be periodic. Furthermore, the above-mentioned concave and convex shape includes a blade shape.

For example, the diffractive structure has the orbicular zone shape centered about the optical axis, in which a sectional shape of the orbicular zone relative to the reference surface is formed to have a predetermined number of periods successive in the radial direction when a step shape having a predetermined groove depth d and a predetermined number of steps is set as one period. Further, in the respective diffractive structure, the unitary periodic structures having a predetermined shape formed of blades are successively formed with the predetermined period number in the radial direction. Here, the sectional shape of the orbicular zone in the above-mentioned diffractive structure means a sectional shape in the face including the radial direction of the orbicular zone, that is, the face orthogonal to the direction tangential to the orbicular zone. Further, the reference surface means a shape of the incident side surface for functioning as a refractive element of the objective lens 34A. In addition, in practice, in the respective diffraction areas 51, 52, and 53, assuming that the shape of the incident side surface for functioning as a refractive element of the objective lens 34A is the reference surface, and the shape of the surface is formed as combination between the reference surface shape and the orbicular zone shape having a diffractive structure having a diffraction function and stepwise surface shape combined therewith. Additionally, in the diffractive structures, groove depths and the number of steps are determined in consideration of the dominant diffraction order number and diffraction efficiency.

In the second diffraction area 52 as the intermediate orbicular zone, the second diffractive structure, which has the orbicular zone shape, has a predetermined depth, and is different from the first diffractive structure, is formed. The second diffraction area 52 is configured to generate diffracted light so that the diffracted light with the diffraction order number, which is collected through the objective lens 34A to form an appropriate spot on the signal recording face of the first optical disk, of the light beam with first wavelength transmitted therethrough is dominant. Consequently, the second diffraction area 52 makes the diffraction order number have the maximum diffraction efficiency relative to the diffracted light with other diffraction order numbers.

Further, by using the second diffractive structure, the second diffraction area 52 is configured to generate diffracted light so that the diffracted light with the diffraction order number, which is collected through the objective lens 34A to form an appropriate spot on the signal recording face of the second optical disk, of the light beam with second wavelength transmitted therethrough is dominant. Consequently, the second diffraction area 52 makes the diffraction order number have the maximum diffraction efficiency relative to the diffracted light with other diffraction order numbers.

Further, by using the second diffractive structure, the second diffraction area 52 is configured to generate diffracted light so that the diffracted light with the diffraction order number other than the diffracted light with the diffraction order number, which is collected through the objective lens 34A to form an appropriate spot on the signal recording face of the third optical disk, of the light beam with third wavelength transmitted therethrough is dominant. Consequently, the second diffraction area 52 makes the diffraction order number have the maximum diffraction efficiency relative to the diffracted light with other diffraction order numbers. In other words, by using the second diffractive structure, the second diffraction area 52 is configured so that the diffracted light with the predetermined diffraction order number is dominant on the basis in which effects of flaring and the like are considered. That is, the second diffraction area 52 is configured so that the diffracted light with the diffraction order number, which is collected through the objective lens 34A to form an appropriate spot on the signal recording face of the third optical disk, of the light beam with third wavelength transmitted therethrough is dominant. Here, the flaring means that, when the light beam with third wavelength is described as an example, the light beam with the diffraction order number at the wavelength is deviated from the state in which a focusing is performed on the signal recording surface of the third optical disk, thereby reducing the light amount of the light beam practically collected on the signal recording face. As described above, by using the second diffractive structure, the second diffraction area 52 is able to reduce the diffraction efficiency of the diffracted light with the diffraction order number, which is collected through the objective lens 34A to form an appropriate spot on the signal recording face of the third optical disk, of the light beam with third wavelength transmitted therethrough.

As described above, the second diffraction area 52 has a diffractive structure that is suitable in order for the diffracted light with the above-mentioned predetermined diffraction order number to be dominant to the light beams of the respective wavelengths. Thereby, the second diffraction area 52 is able to correct and reduce spherical aberration caused when the light beams with the first and second wavelengths, which are transmitted through the second diffraction area 52 and are changed into the diffracted light with the predetermined diffraction order number, are collected by the objective lens 34A on the signal recording faces of the respective optical disks.

Further, the second diffraction area 52 functions as described above for the light beams with first and second wavelengths, and has a predetermined function for the light beam with third wavelength. That is, in consideration of the effects of the flaring, the second diffraction area 52 is configured so that the diffracted light with the diffraction order number, which is transmitted through the second diffraction area 52 and is not collected on the signal recording face of the third optical disk through the objective lens 34A, is dominant. With such a configuration, in the second diffraction area 52, the light beam with third wavelength transmitted through the second diffraction area 52 has almost no effect on the signal recording face of the third optical disk even when being incident into the objective lens 34A. In other words, the second diffraction area 52 is able to function to perform the aperture restriction for the light beam with third wavelength by significantly reducing a light amount of the light beam with third wavelength, which is transmitted through the second diffraction area 52 and collected on the signal recording face by the objective lens 34A, up to approximately zero.

However, the above-mentioned first diffraction area 51 is formed to have a size equal to the size capable of making the light beam with third wavelength transmitted through the area be incident to the objective lens 34A in the same state as the beam restricted by NA of around 0.45. Further, the second diffraction area 52 formed outside the first diffraction area 51 is configured not to collect the light beam with third wavelength transmitted through the area on the third optical disk through the objective lens 34A. Hence, the diffractive portion 50 having the first and second diffraction areas 51 and 52 functions so as to perform the aperture restriction on the light beam with third wavelength by NA of around 0.45. Here, the diffractive portion 50 is configured so that the aperture restriction is performed on the light beam with third wavelength by numerical aperture NA of around 0.45, but the numerical aperture restricted by the above-mentioned configuration is not limited to this.

In the third diffraction area 53 as the outer orbicular zone, the third diffractive structure, which has the orbicular zone shape, has a predetermined depth, and is different from the first and second diffractive structures, is formed. The third diffraction area 53 is configured to generate diffracted light so that the diffracted light with the diffraction order number, which is collected through the objective lens 34A to form an appropriate spot on the signal recording face of the first optical disk, of the light beam with first wavelength transmitted therethrough is dominant. Consequently, the third diffraction area 53 makes the diffraction order number have the maximum diffraction efficiency relative to the diffracted light with other diffraction order numbers.

Further, by using the third diffractive structure, the third diffraction area 53 is configured to generate diffracted light so that the diffracted light with the diffraction order number other than the diffracted light with the diffraction order number, which is collected through the objective lens 34A to form an appropriate spot on the signal recording face of the second optical disk, of the light beam with second wavelength transmitted therethrough is dominant. Consequently, the third diffraction area 53 makes the diffraction order number have the maximum diffraction efficiency relative to the diffracted light with other diffraction order numbers. In other words, by using the third diffractive structure, the third diffraction area 53 is configured so that the diffracted light with the predetermined diffraction order number is dominant on the basis in which effects of flaring and the like are considered. That is, the third diffraction area 53 is configured so that the diffracted light with the diffraction order number, which is collected through the objective lens 34A to form an appropriate spot on the signal recording face of the second optical disk, of the light beam with second wavelength transmitted therethrough is dominant. Further, by using the third diffractive structure, the third diffraction area 53 is able to reduce the diffraction efficiency of the diffracted light with the diffraction order number, which is collected through the objective lens 34A to form an appropriate spot on the signal recording face of the second optical disk, of the light beam with second wavelength transmitted therethrough.

Further, by using the third diffractive structure, the third diffraction area 53 is configured to generate diffracted light so that the diffracted light with the diffraction order number other than the diffracted light with the diffraction order number, which is collected through the objective lens 34A to form an appropriate spot on the signal recording face of the third optical disk, of the light beam with third wavelength transmitted therethrough is dominant. Consequently, the third diffraction area 53 makes the diffraction order number have the maximum diffraction efficiency relative to the diffracted light with other diffraction order numbers. In other words, by using the third diffractive structure, the third diffraction area 53 is configured so that the diffracted light with the predetermined diffraction order number is dominant on the basis in which effects of flaring and the like are considered. That is, the third diffraction area 53 is configured so that the diffracted light with the diffraction order number, which is collected through the objective lens 34A to form an appropriate spot on the signal recording face of the third optical disk, of the light beam with third wavelength transmitted therethrough is dominant. Further, by using the third diffractive structure, the third diffraction area 53 is able to reduce the diffraction efficiency of the diffracted light with the diffraction order number, which is collected through the objective lens 34A to form an appropriate spot on the signal recording face of the third optical disk, of the light beam with third wavelength transmitted therethrough.

As described above, the third diffraction area 53 has a diffractive structure that is suitable in order for the diffracted light with the above-mentioned predetermined diffraction order number to be dominant to the light beams of the respective wavelengths. Thereby, the third diffraction area 53 is able to correct and reduce spherical aberration caused when the light beam with first wavelength, which is transmitted through the third diffraction area 53 and is changed into the diffracted light with the predetermined diffraction order number, is collected by the objective lens 34A on the signal recording faces of the respective optical disks.

Further, the third diffraction area 53 functions as described above for the light beams with first wavelength, and has a predetermined function for the light beams with second and third wavelengths. That is, in consideration of the effects of the flaring, the third diffraction area 53 is configured so that the diffracted light with the diffraction order number, which is transmitted through the third diffraction area 53 and is not collected on the signal recording face of the second and third optical disks through the objective lens 34A, is dominant. With such a configuration, in the third diffraction area 53, the light beams with second and third wavelengths transmitted through the third diffraction area 53 have almost no effect on the signal recording faces of the second and third optical disks even when being transmitted through the third diffraction area 53 are incident into the objective lens 34A. In other words, the third diffraction area 53 is able to function to perform the aperture restriction for the light beam with second wavelength by significantly reducing a light amount of the light beams with second and third wavelengths, which is transmitted through the third diffraction area 53 and collected on the signal recording face by the objective lens 34A, up to approximately zero. Furthermore, the third diffraction area 53 is able to function to perform the aperture restriction for the light beam with third wavelength, together with the above-mentioned second diffraction area 52.

However, the above-mentioned second diffraction area 52 is formed to have a size equal to the size capable of making the light beam with second wavelength transmitted through the area be incident to the objective lens 34A in the same state as the beam restricted by NA of around 0.6. Further, the third diffraction area 53 formed outside the second diffraction area 52 is configured not to collect the light beam with second wavelength transmitted through the area on the third optical disk through the objective lens 34A. Hence, the diffractive portion 50 having the second and third diffraction areas 52 and 53 functions so as to perform the aperture restriction on the light beam with second wavelength by NA of around 0.6. Here, the diffractive portion 50 is configured so that the aperture restriction is performed on the light beam with second wavelength by numerical aperture NA of around 0.6, but the numerical aperture restricted by the above-mentioned configuration is not limited to this.

Further, the third diffraction area 53 is formed to have a size equal to the size capable of making the light beam with first wavelength transmitted through the area be incident to the objective lens 34A in the same state as the beam restricted by NA of around 0.85. Since the diffractive structure is not formed outside the third diffraction area 53, the light beam with first wavelength transmitted through the area is not collected on the first optical disk through the objective lens 34A. Hence, the diffractive portion 50 having the third diffraction area 53 functions so as to perform the aperture restriction on the light beam with first wavelength by NA of around 0.85. Furthermore, in the light beam with first wavelength transmitted through the third diffraction area 53, for example, 1st order and 4th order light is dominant. Hence, the 0th order light transmitted through the area outside the third diffraction area 53 is mostly not collected on the first optical disk through the objective lens 34A. Here, when the 0th order light is collected on the first optical disk through the objective lens 34A, the aperture restriction may be performed by providing a shielding section for shielding the transmitted light beams in the area outside the third diffraction area 53. Further, the aperture restriction may be performed by providing, instead of the shielding section, a diffraction area having a diffractive structure in which the light beam with the diffraction order number other than the diffraction order number of the transmitted light beam collected on the first optical disk through the objective lens 34A is dominant. Here, the diffractive portion 50 is configured so that the aperture restriction is performed on the light beam with first wavelength by numerical aperture NA of around 0.85, but the numerical aperture restricted by the above-mentioned configuration is not limited to this.

Further, as a modified example of the above-mentioned first to third diffraction areas 51, 52, and 53, instead of the third diffraction area, a third area formed as a so-called continuous aspheric surface may be provided.

Further, exemplary combinations having an excellent diffraction order number, which is selected in the first and second diffraction areas 51 and 52 constituting the diffractive portion 50 and is dominant, are as follows. In the first diffraction area 51 as the inner orbicular zone, it is assumed that the dominant diffraction order number of the light beam with first wavelength is k1$i$, the dominant diffraction order number of the light beam with second wavelength is k2$i$, and the dominant diffraction order number of the light beam with third wavelength is k3$i$. The dominant diffraction order number means the case where the diffraction efficiency is the maximum. In this case, for example, (k1$i$, k2$i$, k3$i$) includes combinations of (+1, −1, −2), (−1, +1, +2), (+1, −2, −3), (−1, +2, +3), (+2, −1, −2), (−2, +1, +2), (+2, −2, −3), (−2, +2, +3), (+1, +1, +1), (0, −1, −2), and (0, −2, −3). In the second diffraction area 52 as the intermediate orbicular zone, it is assumed that the dominant diffraction order number of the light beam with first wavelength is k1$m$ and the dominant diffraction order number of the light beam with second wavelength is k2$m$. In this case, for example, (k1$m$, k2$m$) includes combinations of (+1, −1), (−1, +1), (+1, −2), (−1, +2), (+2, −1), (−2, +1), (+1, +1), (+3, +2), (−1, −1), (0, +2), (0, −2), (0, +1), (0, −1), (+1, 0), (−1, 0), (−3, −2), (+2, +1), (−2, −1), (+1, +1), and (−1, −1).

The diffractive portion 50 having the first to third diffraction areas 51, 52, and 53 configured as described above has the following effects. The diffractive portion 50 diffracts the light beams with first to third wavelengths transmitted through the first diffraction area 51 by a diffractive power that makes the beams be in a divergent angle state in which spherical aberration is not caused on the signal recording faces of the optical disks of the corresponding types by the refractive power of the common objective lens 34A. In addition, the diffractive portion 50 is able to collect the appropriate spot on the signal recording faces of the corresponding optical disks by the refractive power of the objective lens 34A. Further, the diffractive portion 50 diffracts the light beams with first and second wavelengths transmitted through the second diffraction area 52 by a diffractive power that makes the beams be in the divergent angle state in which spherical aberration is not caused on the signal recording faces of the optical disks of the corresponding types by the refractive power of the common objective lens 34A. In addition, the diffractive portion 50 is able to collect the appropriate spot on the signal recording faces of the corresponding optical disks by the refractive power of the objective lens 34A. Furthermore, the diffractive portion 50 diffracts the light beam with first wavelength transmitted through the third diffraction area 53 by a diffractive power that makes the beams be in the divergent angle state in which spherical aberration is not caused on the signal recording faces of the optical disks of the corresponding types by the refractive power of the common objective lens 34A. In addition, the diffractive portion 50 is able to collect light the appropriate spot on the signal recording faces of the corresponding optical disks by the refractive power of the objective lens 34A. Here, "the divergent angle state in which spherical aberration is not caused" includes the divergent state, the convergent state, and the parallel light state, and means a state in which spherical aberration is corrected by the refractive power of the curved surface of the lens.

Further, the diffractive portion 50 flares the diffracted light with the diffraction order number having the maximum diffraction efficiency and predetermined diffraction efficiency by transmitting the light beam with third wavelength through the second and third diffraction areas 52 and 53, and thus deviates an imaging position from the signal recording face. By adopting the configuration that reduces the diffraction efficiency of the diffracted light with the diffraction order number, the diffractive portion 50 collects only a part of the light beam, which is transmitted through the first diffraction area 51, of the light beam with third wavelength on the signal recording face of the optical disk by the objective lens 34A. In addition, the diffractive portion 50 is formed to have a size capable of satisfying a predetermined NA, thereby enabling the aperture restriction such that the NA is, for example, around 0.45 relative to the light beam with third wavelength.

Further, the diffractive portion 50 flares the diffracted light with the diffraction order number having the maximum diffraction efficiency and predetermined diffraction efficiency by transmitting the light beam with second wavelength through the third diffraction area 53, and thus deviates an imaging position from the signal recording face. Thereby, the diffractive portion 50 collects only a part of the light beam, which is transmitted through the first and second diffraction areas 51 and 52, of the light beam with second wavelength on the signal recording face of the optical disk by the objective lens 34A. In addition, the diffractive portion 50 is formed to have a size capable of satisfying a predetermined NA, thereby enabling the aperture restriction such that the NA is, for example, around 0.60 relative to the light beam with second wavelength.

Further, the diffractive portion 50 allows the light beam with first wavelength, which is transmitted through the area outside the third diffraction area 53, not to be appropriately collected on the signal recording face of the corresponding type optical disk by the objective lens 34A, or shields the light beam. Thereby, the diffractive portion 50 collects only a part of the light beam, which is transmitted through the first to third diffraction areas 51, 52, and 53, of the light beam with first wavelength on the signal recording face of the optical disk by the objective lens 34A. In addition, the diffractive portion 50 is formed to have a size capable of satisfying a predetermined NA, thereby enabling the aperture restriction such that the NA is, for example, around 0.85 relative to the light beam with first wavelength.

As described above, the diffractive portion 50 provided on one face of the objective lens 34A disposed in the above-mentioned optical path is able to not only achieve the three-wavelength compatibility but also make the light beams with the respective wavelengths be incident to the common objective lens 34A with the respectively adapted numerical apertures restricted. Consequently, the diffractive portion 50 has not only the function of the aberration correction corresponding to three wavelengths, but also the function as an aperture restriction section.

Figure 22A:
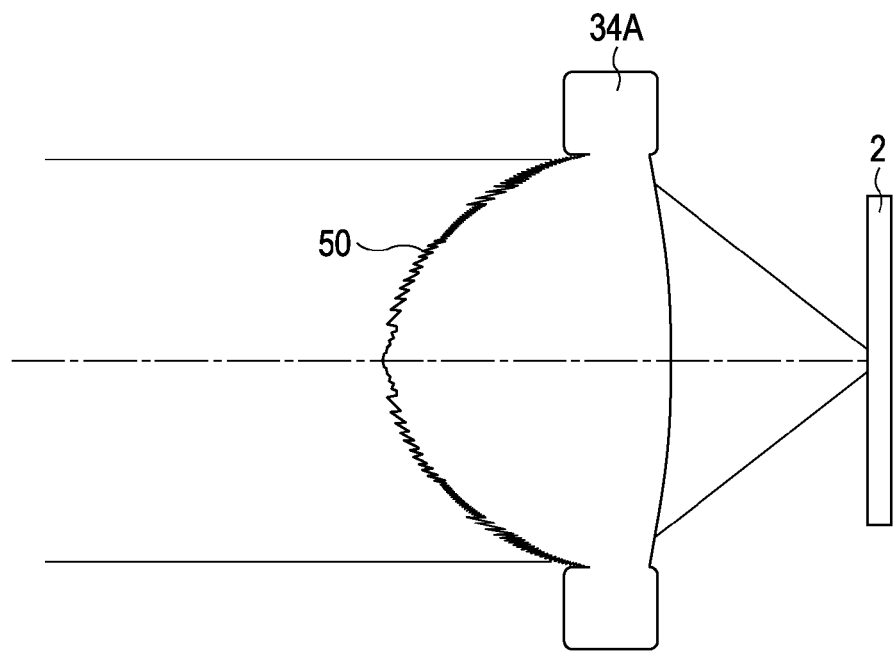
FIGS. 22A and 22B are diagrams illustrating examples of a light collecting optical device constituting the optical pickup shown in FIG. 2, where
Figure 22B:
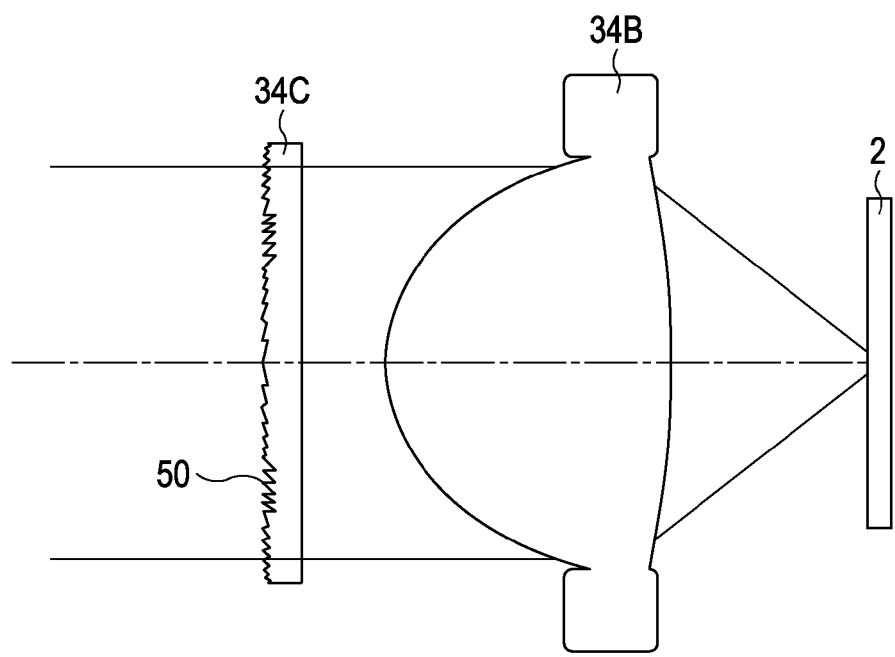
Figure 23A:
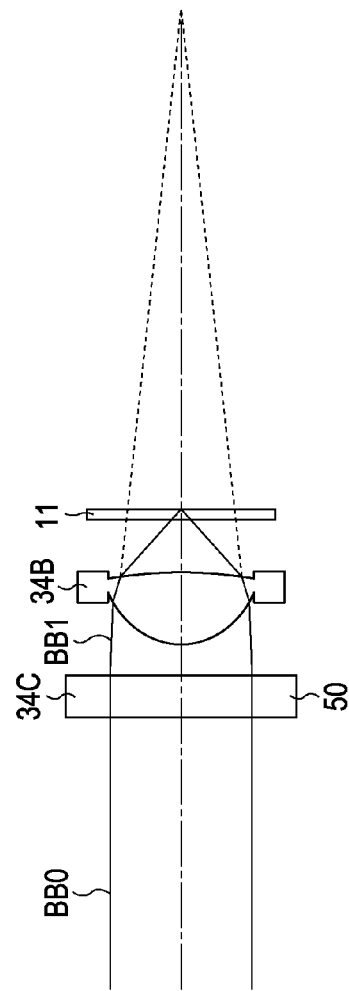
FIGS. 23A, 23B, and 23C are diagrams illustrating a function of the diffractive portions shown in FIGS. 21A and 21B and FIGS. 22A and 22B by exemplifying a case where the diffractive portion is provided on an optical element separate from the objective lens.
Figure 23B:
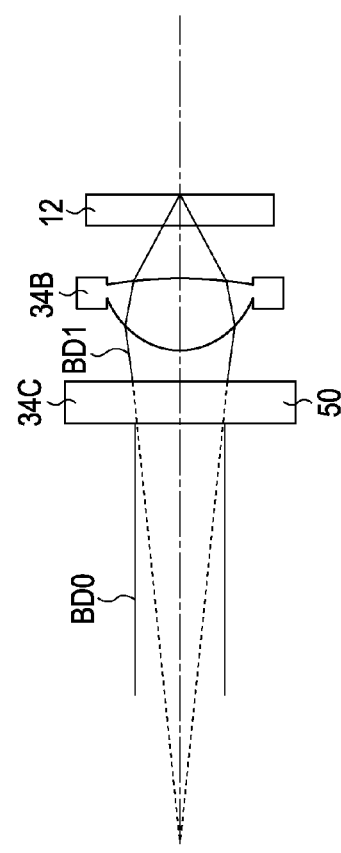
Figure 23C:
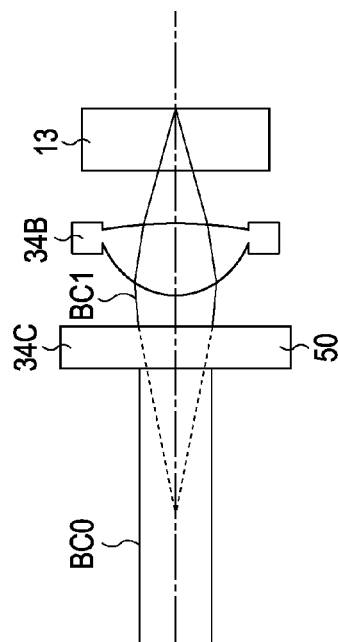

Further, in the above description, as shown in FIG. 22A, the diffractive portion 50 including the three diffraction areas 51, 52, and 53 is provided on the incident side surface of the objective lens 34A. However, the invention is not limited to this, the diffractive portion 50 may be provided on the exit side surface of the objective lens 34A. Furthermore, the diffractive portion 50 having the first to third diffraction areas 51, 52, and 53 may be integrally provided on the incident side or exit side surface of an optical element which is provided separately from the objective lens. For example, as shown in FIG. 22B, the objective lens 34B, which has only a curved surface of the lens excluding the diffractive portion 50 from the above-mentioned objective lens 34A, and the diffractive optical element 34C, which is provided on one surface of the diffractive portion 50 and is disposed in the optical path common to the three wavelengths, may be provided. That is, the objective lens 34B and the diffractive optical element 34C may constitute the light collecting optical device. In the above-mentioned objective lens 34A shown in FIG. 22A, the surface shape is formed as the combination between the reference shape, which is the shape of the incident side surface for a refractive power function of the objective lens, and the shape of the surface having the diffractive structure for a diffractive power function. In contrast, when the separate diffractive optical element 34C as shown in FIG. 22B is provided, the objective lens 34B itself has a surface shape for a refractive power function. In addition, a surface shape having a diffractive structure for a diffractive power function is formed on one surface of the diffractive optical element 34C. The objective lens 34B and the diffractive optical element 34C as shown in FIG. 22B have the same function as the above-mentioned objective lens 34A as the light collecting optical device, and is used in the optical pickup, thereby reducing aberrations and achieving the three-wavelength compatibility of the optical pickup. In addition, in the light collecting optical device, by reducing the number of components, it is possible to achieve simplification and downsizing of the configuration. Thus, the device is able to exhibit effects of achieving high productivity and low cost. As described above, the light collecting optical device can be configured to have a diffractive structure more complex than the case where it is provided integrally in the objective lens 34A. On the other hand, in the above-mentioned configuration shown in FIG.

22A, only the single element (the objective lens 34A) functions as the light collecting optical device for appropriately collecting the light beams with the three different wavelengths on the signal recording faces of the optical disks corresponding thereto without causing spherical aberration. The light collecting optical device enables reduction in number of the additional optical components and downsizing of the configuration by integrally providing the diffractive portion 50 in the objective lens 34A. Furthermore, in the above-mentioned diffractive portion 50, the diffractive structure for the aberration correction for the three-wavelength compatibility has only to be provided on one surface. Therefore, this enables the diffractive portion 50 to be integrally provided on the above-mentioned objective lens 34A as a refractive element. With such a configuration, the diffractive portion 50 enables the configuration in which the diffraction surface is directly formed on a plastic lens, and the objective lens 34A integrally formed with the diffractive portion 50 is made of plastic materials, thereby achieving higher productivity and lower cost.

12. Regarding Example 1 (Example of Three-Wavelength Compatible Objective Lens)

First, Example 1 shows an example of the three-wavelength compatible objective lens used in the optical pickup having the one-objective-lens configuration. The design condition in the three-wavelength compatible objective lens according to Example 1 is as follows. The focal length f was 1.92 mm, and the combination of the diffraction order numbers in the inner orbicular zone (the first diffraction area 51) was set to $(k1i, k2i, k3i)=(0, -2, -3)$. Further, the combination of diffraction order numbers in the intermediate orbicular zone (the second diffraction area 52) was set to $(k1m, k2m)=(0, -1)$. By using the conditions, it is possible to suppress the lens tilt sensitivity up to 0.25 or less while satisfying an aplanatic design at the design-basis cover layer thickness $L_{Cen}$ of 0.0875 mm, a wavelength $\lambda$ of 405.7 nm, and a design temperature of 35° C. (refer to FIG. 25). Details of the design parameters are shown in Table 1.

TABLE 1

Example 1 f = 1.92 Parameters of Three-Wavelength Compatible Objective Lens

DESIGN BASIS

| | |
|---|---|
| WAVELENGTH | 405.7 |
| INCIDENT MAGNIFICATION | 0 |
| TEMPERATURE | 35° C. |

ENVIRONMENT-BASIS CONDITION

| MEDIA TYPE | FIRST OPTICAL DISK | SECOND OPTICAL DISK | THIRD OPTICAL DISK |
|---|---|---|---|
| WAVELENGTH $\lambda$[nm] | 405.7 | 659.9 | 785 |
| MEDIA COVER LAYER THICKNESS (mm) | 0.0875 | 0.6 | 1.1 |
| FOCAL LENGTH f[mm] | 1.92 | 2.07 | 2.16 |
| NA | 0.85 | 0.60 | 0.46 |
| INCIDENT MAGNIFICATION | 0 | $-1/100$ | $-1/60$ |

| SURFACE NUMBER | ri | SURFACE SPACING $d\lambda 1$ | REFRACTIVE INDEX $n\lambda 1$ | SURFACE SPACING $d\lambda 2$ | REFRACTIVE INDEX $n\lambda 2$ | SURFACE SPACING $d\lambda 3$ | REFRACTIVE INDEX $n\lambda 3$ |
|---|---|---|---|---|---|---|---|
| 0 | | ∞ | | 208.6 | | 131.5 | |
| 1 (DIAPHRAGM DIAMETER) | | 0($\phi$3.26) | | 0($\phi$2.5) | | 0($\phi$2.0) | |
| 2-1 | 1.232 | 2.189 | 1.524 | 2.189 | 1.506 | 2.189 | 1.5023 |
| 2-2 | 1.216 | | | | | | |
| 2-3 | 1.228 | | | | | | |
| 3 | −2.128 | | | | | | |
| 4 | | 0.694 | | 0.581 | | 0.412 | |
| 5 | | 0.0875 | 1.5716 | 0.6 | 1.5781 | 1.1 | 1.6172 |

| | SURFACE NUMBER | 2-1 | 2-2 | 2-3 | 3 |
|---|---|---|---|---|---|
| | AREA | $h \leq 1$ | $1 < h \leq 1.25$ | $1.25 < h$ | |
| ASPHERIC SURFACE COEFFICIENT | K | −2.7156E−01 | −2.4792E−03 | −6.3571E−01 | −5.0240E+01 |
| | A4 | −9.5016E−03 | −2.4793E−03 | 3.7473E−02 | 5.0402E−02 |
| | A6 | −9.4912E−03 | −1.1120E−02 | −8.2831E−03 | −2.9337E−02 |
| | A8 | −2.1424E−03 | −7.2146E−03 | −7.0080E−03 | 4.7952E−03 |
| | A10 | 1.0602E−03 | 3.3632E−03 | 3.8830E−03 | −8.2407E−04 |
| | A12 | −1.9971E−03 | 1.4205E−03 | −2.0238E−04 | 1.2976E−05 |
| | A14 | | −1.0497E−03 | 4.9878E−05 | 1.5461E−04 |
| | A16 | | 1.8923E−04 | −6.4090E−05 | 1.3561E−04 |
| | A18 | | | | 4.8108E−05 |
| | A20 | | | | −6.4044E−05 |
| | A22 | | | | |

TABLE 1-continued

Example 1 f = 1.92 Parameters of Three-Wavelength
Compatible Objective Lens

| OPTICAL PATH ORDER FUNCTION COEFFICIENT | DIFFRACTION ORDER NUMBER | 0/−2/−3 | 0/−1 | 1 | |
|---|---|---|---|---|---|
| | MANUFACTURE WAVELENGTH [nm] | 710 | 710 | 710 | |
| | C2 | −9.4405E−03 | −1.6997E−02 | 9.98E−03 | |
| | C4 | 1.9045E−03 | −6.6258E−04 | −1.71E−04 | |
| | C6 | −1.2059E−03 | 2.2588E−04 | −3.40E−03 | |
| | C8 | | 0 | 0 | |
| | C10 | | −2.5079E−08 | 8.30E−05 | |
| ON-AXIS SURFACE SPACING FROM SURFACE 2-1 | | 0.0000 | −0.0042 | −0.0053 | 2.1890 |

Here, the aspheric surface coefficient and the optical path order function coefficient of the objective lens and the like in Table 1 is described. The aspheric shape of the objective lens is formed as the shape represented by the following Expression (37). In Expression (37), h represents a height from the optical axis, that is, a position in the radial direction, and z represents a sag amount parallel to the optical axis at the position h, that is, a distance from a plane tangential to the vertex of the surface at the position h. The sag amount, which is represented by the sign z, represents the surface shape of the lens when there is no diffractive structure, and represents the reference surface, on which the diffractive structure is formed, when the diffractive structure is provided. Further, c represents a curvature, that is, an inverse number of a radius of curvature, K represents a conic coefficient (the aspheric surface coefficient), and A4, A6, A8, A10 . . . represent aspheric surface coefficients.

$$z = \Delta z \frac{ch^2}{1 + \sqrt{1 - (1+k)c^2h^2}} + A_4 h^4 + A_6 h^6 + A_8 h^8 + A_{10} h^{10} \Lambda \tag{37}$$

Figure 24:
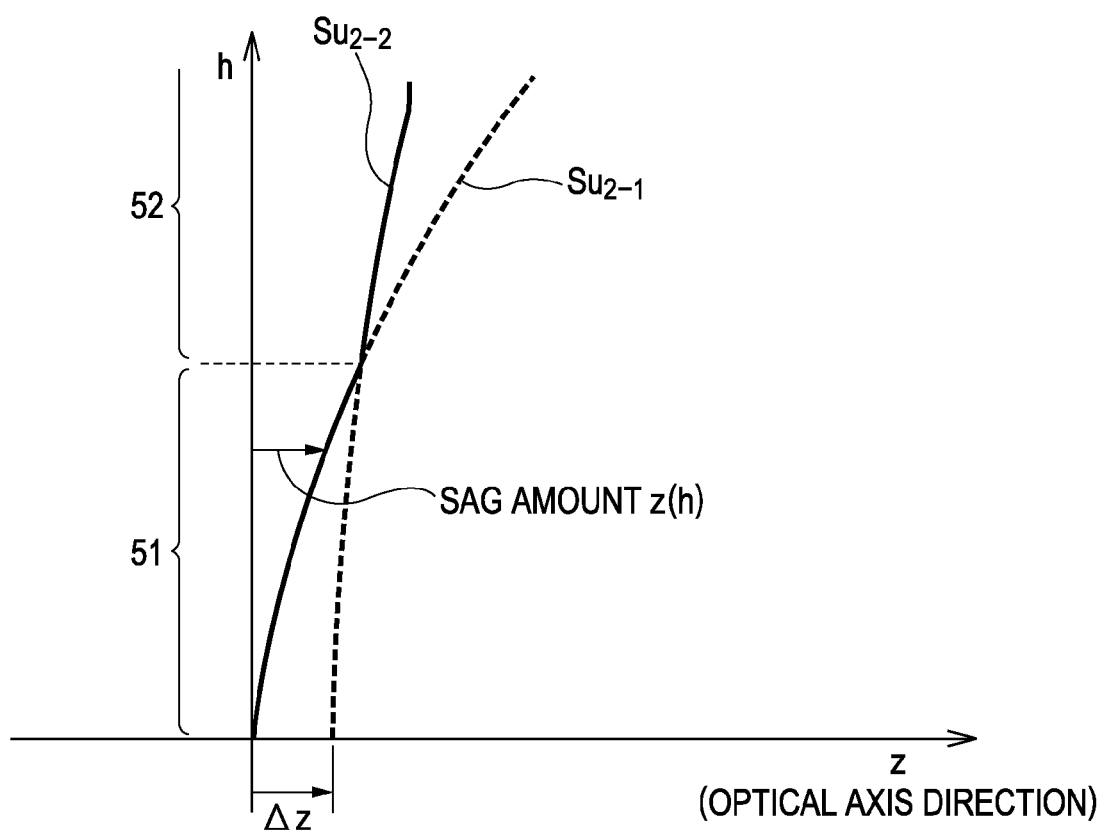
FIG. 24 is a diagram illustrating an on-axis surface spacing in an aspheric shape as a basis of an inner orbicular zone, an intermediate orbicular zone, and an outer orbicular zone in the diffractive portion of the objective lens.

Further, $\Delta z$ in Expression (37) represents a on-axis surface spacing from the surface 2-1 when the surface 2-1 representing the reference surface of the inner orbicular zone is set as a reference. Here, the reference surface of the inner orbicular zone is represented by the surface 2-1, the reference surface of the intermediate orbicular zone is represented by the surface 2-2, and the reference surface of the outer orbicular zone is represented by the surface 2-3. In this case, it shows that the vertex position of the reference surface 2-1 of the inner orbicular zone is set as the origin, and the reference surface 2-2 of the intermediate orbicular zone and the reference surface 2-3 of the outer orbicular zone are formed to be offset by $\Delta z$ from the origin. For example, the on-axis surface spacing $\Delta z$ relative to the surface 2-2 is shown in FIG. 24. Furthermore, in FIG. 24, Su2-1 represents the surface 2-1 which is the reference surface of the inner orbicular zone 51, and Su2-2 represents the surface 2-2 which is the reference surface of intermediate orbicular zone 52. Further, the horizontal axis represents the sag amount z in the direction of the optical axis, h represents a position in the radial direction, and z(h) represents a sag amount z for each position in the radial direction in Expression (37). Further, in FIG. 24, the solid line portion represents the reference surface formed by Su2-1 and Su2-2, and the dashed line portion represents the portion of extending Su2-1 and Su2-2. In FIG. 24, $\Delta z$ represents on-axis surfacing between the vertex of the surface 2-1 and the vertex of the surface 2-2. Furthermore, here, the intersection point between the surface 2-1 and the surface 2-2 is set as the area boundary between the inner orbicular zone and intermediate orbicular zone, but the invention is not limited to this. For example, in consideration of aberration and diffraction efficiency, the areas may be formed so that the light beams can be appropriately collected on the signal recording faces of the respective optical disks. In other words, the threshold values of two boundaries of the inner orbicular zone and intermediate orbicular zone depends on h representing the position of the radial direction. In addition, when the surface 2-1 and the surface 2-2 are not intersected at the boundary determined by h, the reference surfaces of the inner orbicular zone and intermediate orbicular zone are formed with a microscopic difference in level. Further, in the above description, the relationship between the inner orbicular zone and the intermediate orbicular zone was described, but the relationships between the outer orbicular zone and the inner and intermediate orbicular zones are the same as described above. Further, $\Delta z$ in the outer orbicular zone is determined by the relationship with the vertex of the surface of the inner orbicular zone in the same manner as describe above.

Furthermore, in the first diffraction area 51 as the inner orbicular zone, the second diffraction area 52 as the intermediate orbicular zone, and the third diffraction area 53 as the outer orbicular zone described in FIG. 21, the phase difference $\phi$ generated by the diffractive structure and applied to the aspheric reference surface is represented by the following Expression (38). Expression (38) uses a phase difference function coefficient Ci. In Expression (38), k, specifically, k1, k2, and k3 represent diffraction order numbers selected at the respective wavelengths $\lambda 1$, $\lambda 2$, and $\lambda 3$, and h represents a position in the radial direction, and $\lambda 0$ represents a manufacture wavelength. Furthermore, $\phi$ described herein is a phase difference amount defined by assuming that an extremely thin film with very high refractive index exists on the aspheric surface lens shape. In forming the diffractive lens surface in practice, when the concave and convex shape as a diffractive structure is formed on the lens surface, the optical path order fluctuates in the optical path which advances obliquely to the optical axis. Hence, the diffractive lens surface is formed by performing microscopic correction thereon.

$$\Phi = k \sum_{n=1} \frac{C_{2n} h^{2n}}{\lambda_0} \tag{38}$$

Further, Table 1 shows media types including the first optical disk such as a BD, the second optical disk such as a DVD, and the third optical disk such as a CD. Further, the table also shows wavelengths, cover layer thicknesses, focal lengths f, NAs, and incident magnifications. Further, the surface number represents the numbers of the respective surfaces. That is, the surface 0 represents a position of the light source, the infinite case (∞) thereof represents parallel light incidence, and the finite case thereof represents incidence from a slightly tilted direction. Further, the surface 1 represents the surface of the aperture diaphragm, and the diameter of the aperture diaphragm is equal to the diameter of the first optical disk (the BD or the like) which is the maximum aperture, and is φ of around 3.26 mm. Here, for the second and third optical disks, it functions as a so-called self aperture due to the aperture restriction function resulting from the intermediate orbicular zone and the outer orbicular zone. Hence, this shows that the diameter is restricted by the aperture restriction function to the extent of the numerical value in the table. Further, the surface 2-1, the surface 2-2, and the surface 2-3 represent the inner orbicular zone, the intermediate orbicular zone, and the outer orbicular zone, respectively. In the actual lens, those are the surface 1, but are configured as described in FIG. 24. The surface 3 represents the exit surface of the objective lens. The surface 4 represents a distance from the objective lens to the surface of the optical disk, and represents a so-called working distance (WD). The surface 5 represents the optical disk, and represents that it has refractive indices corresponding to the respective wavelengths and has different cover layer thicknesses corresponding to the respective mediums. The refractive indices $n\lambda 1$, $n\lambda 2$, and $n\lambda 3$ of the respective surfaces represent refractive indices of the rear sides from the surfaces, and the on-axis surface spacings $d\lambda 1$, $d\lambda 2$, and $d\lambda 3$ represent distances from the surfaces to the subsequent surfaces. Further, ri (i=2-1, 2-2, 2-3, 3) represents radius of curvatures of the respective surfaces. Further, the table shows the on-axis surface spacing $d\lambda 1$ of the first optical disk such as a BD, the refractive index $n\lambda 1$ at the first wavelength, the on-axis surface spacing $d\lambda 2$ of the second optical disk such as a DVD, the refractive index $n\lambda 2$ at the second wavelength, the on-axis surface spacing $d\lambda 3$ of the third optical disk such as a CD, and the refractive index $n\lambda 3$ at the third wavelength. Further, in the table, the above-mentioned h is expressed in terms of area (mm), and the table shows the aspheric surface coefficients k, A4, A6, A8, ..., the diffraction order number, the manufacture wavelength (nm), the phase difference function coefficient Cn, and the "on-axis surface spacing from the surface 2-1". Further, regarding the diffraction order number, for example, the "0/−2/−3" in the surface 2-1 represents that 0th order at the first wavelength, −2nd order at the second wavelength, and −3rd order at the third wavelength are selected to be dominant in the inner orbicular zone as described above. Further, the "0/−1" in the surface 2-2 represents that 0th order at the first wavelength and −1st order at the second wavelength are selected to be dominant in the intermediate orbicular zone as described above. Further, the "1" in the surface 2-3 the surface 2-2 represents that 1st order at the first wavelength is selected to be dominant in the outer orbicular zone as described above. The on-axis surface spacing from the surface 2-1 is represented by Az in the above-mentioned Expression (37), is set to 0 at the surface 2-1, and represents the thickness of the lens on the optical axis at the surface 3.

Figure 25:
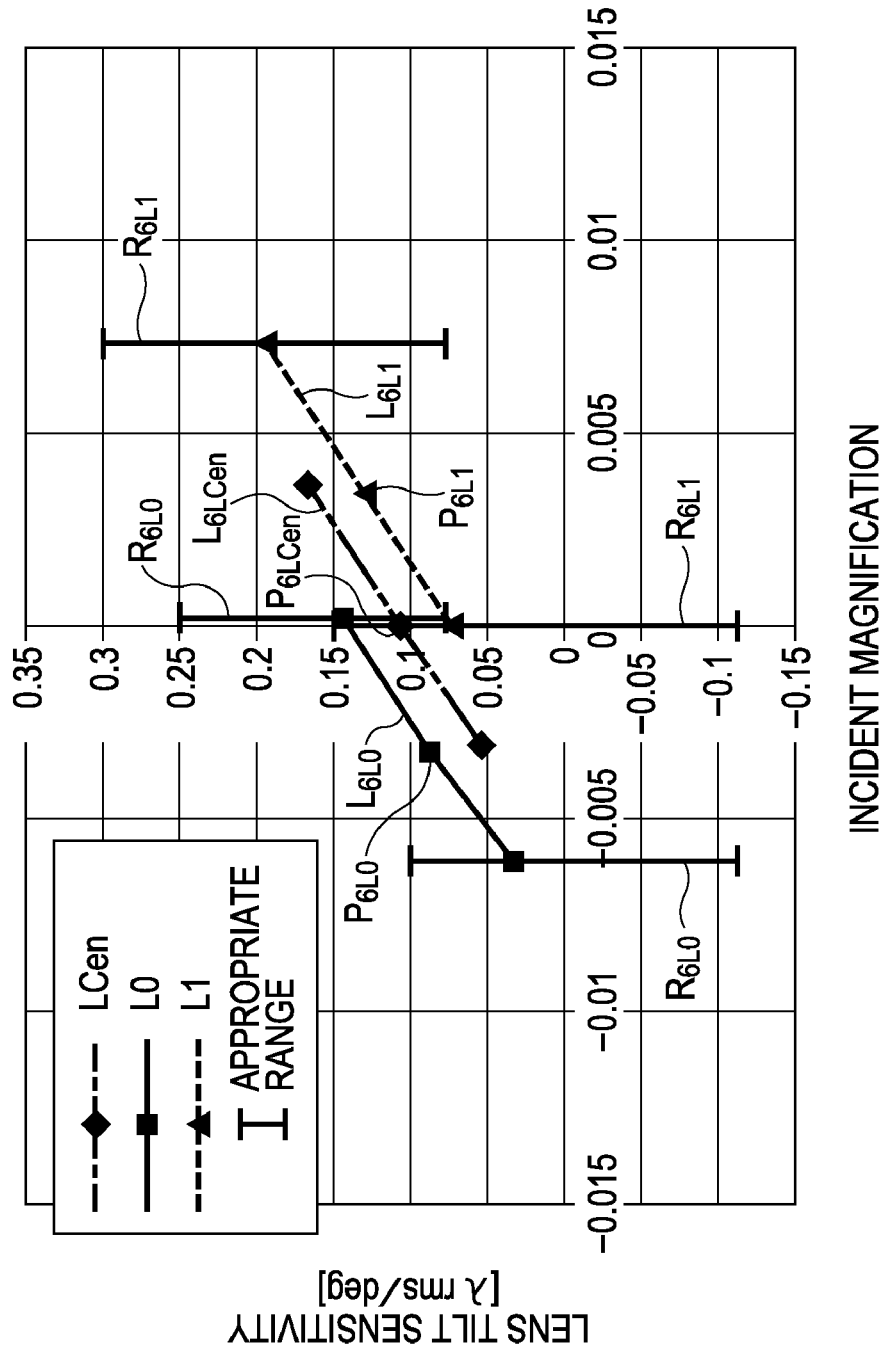
FIG. 25 is a diagram illustrating incident magnifications and changes in the lens tilt sensitivities of the L0 layer, the L1 layer, and the LCen layer, together with appropriate ranges, in a three-wavelength compatible objective lens according to Example 1.

FIG. 25 shows the change in lens tilt sensitivity relative to the incident magnification of the objective lens in the above-mentioned design condition. As described above, the incident magnification is fluctuated by temperature change and wavelength change. Here, in FIG. 25 and FIGS. 26 to 28 to be described later, the horizontal axis represents the incident magnification, and the vertical axis represents the lens tilt sensitivity at the incident magnification. In FIG. 25 and the like, $L_{6L0}$, $L_{7L0}$, $L_{8L0}$, and $L_{9L0}$ represent the lens tilt sensitivities at the L0 layer of which the cover layer thickness is 0.100 μm, and $L_{6L1}$, $L_{7L1}$, $L_{8L1}$, and $L_{9L1}$ represent the lens tilt sensitivities at the L1 layer of which the cover layer thickness is 0.075 μm. Further, $L_{6LCen}$, $L_{7LCen}$, $L_{8LCen}$, and $L_{9LCen}$ represent the lens tilt sensitivities at the LCen layer which is the design basis of cover layer of which the cover layer thickness is 0.0875 μm. In FIG. 25 and the like, the left lower side area represents the plot under the condition of a high temperature, a long wavelength, and a large cover layer thickness, and the right upper side area represents the plot under the condition of a low temperature, a short wavelength, and a small cover layer thickness. Further, in FIG. 25, and the like, $R_{6L0}$, $R_{7L0}$, $R_{8L0}$, and $R_{9L0}$ represent the allowable ranges of the lens tilt sensitivity at the L0 layer, and $R_{6L1}$, $R_{7L1}$, $R_{8L1}$, and $R_{9L1}$ represent the allowable ranges of the lens tilt sensitivity at the L1 layer. The allowable ranges $R_{6L0}$ and $R_{6L1}$ of the lens tilt sensitivity shown in FIG. 25 are based on the above-mentioned Expressions (22A) and (22B). Further, $R_{7L0}$, $R_{8L0}$, $R_{9L0}$, $R_{7L1}$ $R_{8L1}$, and $R_{9L1}$ shown in FIGS. 26 to 28 to be described later are based on the above-mentioned Expressions (26A) and (26B). In FIG. 25, the temperature range is 0° C. to 70° C., and the wavelength range is 400 nm to 410 nm. Further, $P_{6L0}$, $P_{7L0}$, $P_{8L0}$, and $P_{9L0}$ plotted in FIG. 25 and the like represent the incident magnifications and lens tilt sensitivities at the L0 layer in the environment-basis state (35° C., 405 nm). $P_{6L1}$, $P_{7L1}$, $P_{8L1}$, and $P_{9L1}$ represent the incident magnifications and lens tilt sensitivities at the L1 layer in the environment-basis state. $P_{6LCen}$, $P_{7LCen}$, $P_{8LCen}$, and $P_{9LCen}$ represent the incident magnifications and lens tilt sensitivities at the LCen layer in the environment-basis state. Further, in FIG. 25 and the like, the otherwise plots at $L_{6L0}$, $L_{7L0}$, $L_{8L0}$, $L_{9L0}$, $L_{6L1}$, $L_{7L1}$, $L_{8L1}$, $L_{9L1}$, $L_{6LCen}$, $L_{7LCen}$, $L_{8LCen}$, and $L_{9LCen}$ represent the minimum values and the maximum values of the lens tilt sensitivities at the respective layer.

As can be seen from FIG. 25, the plots, which represent the maximum and the minimum of the lens tilt sensitivity at the L0 and L1 layers, are included in the allowable ranges $R_{6L0}$ and $R_{6L1}$ at the respective layer determined by the above-mentioned Expressions (22A) and (22B).

In FIG. 25, considering that the incident magnification is 0, the lens tilt sensitivity is $\Delta W_{LT\_LCen}=0.1$ [rms/deg], and the disk tilt sensitivity at the $L_{Cen}$ $\Delta W_{DT\_LCen}$ is −0.095 [rms/deg] on the design basis of the $L_{Cen}$ layer which is the center of the whole system in design, the relationship of the following Expression (39) is obtained from the above-mentioned Expression (27). Furthermore, the disk tilt sensitivity $\Delta W_{DT\_LCen}$ (=−0.095 [rms/deg]) is in the condition of a numerical aperture NA of 0.85, a wavelength λ of 405 nm, and a cover layer thickness of 0.0875 μm.

$$\Delta W_{IH}=0.05\approx 0 \quad (39)$$

According to Expression (39), the objective lens is designed to be nearly aplanatic. As described in the above-mentioned section 10, by adopting the method of reducing the lens tilt sensitivity out of the aplanatic design within the range of satisfying Expression (36), it may be possible to obtain further desirable effects.

The objective lens according to Example 1 satisfies Expressions (22A) and (22B) while achieving the three-wavelength compatibility as described above. Accordingly, the objective lens according to Example 1 achieves favorable comatic aberration compensation by using the lens tilt range as described above. Furthermore, in the three-wavelength compatible objective lens, the lens tilt sensitivity has only to be set in the ranges of Expressions (22A) and (22B) which have more room than the ranges of the above-mentioned Expressions (26A) and (26B). Hence, it is possible to increase the focal length up to approximately f=2.2 mm. By satisfying Expressions (22A) and (22B) in the three-wavelength compatible objective lens, it is also possible to increase working distance. In addition, with such a configuration, it is possible to improve formability of the lens and the diffractive structure.

13. Regarding Example 2 (Example of Two-Objective-Lens Configuration)

Next, Example 2 shows an example of making appropriate comatic aberration of the objective lens dedicated to the first optical disk (the BD or the like) used in the optical pickup having the two-objective-lens configuration. In the objective lens according the Example 2, as described above, it is necessary to reduce aberrations throughout the optical system on the basis in which product unbalance caused by various manufacturing errors is considered. In order to satisfy the condition, it is necessary for the lens tilt sensitivity on the design basis to be within the ranges represented by the above-mentioned Expressions (26A) and (26B).

In a design condition of the objective lens dedicated to the first optical disk of Example 2, the focal length f was 1.41 mm, and a configuration, in which the diffractive structure made of plastic is not provided, was made. Details of the design parameters of Example 2 are shown in Table 2. Furthermore, description of the parameters in Table 2 and Tables 3 to 4 to be described later is the same as the description of the corresponding parameters in Table 1 except that the lens has no diffractive structure and is dedicated to a single wavelength, and thus is omitted.

TABLE 2

Example 2 f = 1.41
Parameters of Bd-Use-Only Objective Lens usable in
Optical Pickup having Two-Objective-Lens Configuration

DESIGN BASIS

| WAVELENGTH | 405.7 |
|---|---|
| INCIDENT MAGNIFICATION | 0 |
| TEMPERATURE | 35° C. |

ENVIRONMENT-BASIS CONDITION

| MEDIA TYPE | FIRST OPTICAL DISK |
|---|---|
| WAVELENGTH λ[nm] | 405.7 |
| MEDIA COVER LAYER THICKNESS (mm) | 0.0875 |
| FOCAL LENGTH f[mm] | 1.41 |
| NA | 0.85 |
| INCIDENT MAGNIFICATION | 0 |

| SURFACE NUMBER | ri | SURFACE SPACING dλ1 | REFRACTIVE INDEX nλ1 |
|---|---|---|---|
| 0 | ∞ | | |
| 1 (DIAPHRAGM DIAMETER) | 0(φ2.40) | | |
| 2 | 0.097 | 1.712 | 1.524 |
| 3 | −1.395 | | |
| 4 | | 0.441 | |
| 5 | | 0.0875 | 1.6172 |

TABLE 2-continued

Example 2 f = 1.41
Parameters of Bd-Use-Only Objective Lens usable in
Optical Pickup having Two-Objective-Lens Configuration

| | | SURFACE NUMBER | |
|---|---|---|---|
| | | 2 | 3 |
| ASPHERIC SURFACE COEFFICIENT | K | −7.3895E−01 | −3.4070E+01 |
| | A4 | 4.6599E−02 | 2.2564E−01 |
| | A6 | 1.0031E−02 | −2.9546E−01 |
| | A8 | 1.3013E−02 | 1.9810E−01 |
| | A10 | 7.4065E−03 | −5.5645E−02 |
| | A12 | −1.2739E−02 | |
| | A14 | 1.2803E−02 | |
| | A16 | −3.0766E−03 | |
| | A18 | | |
| | A20 | | |
| | A22 | | |

Figure 26:
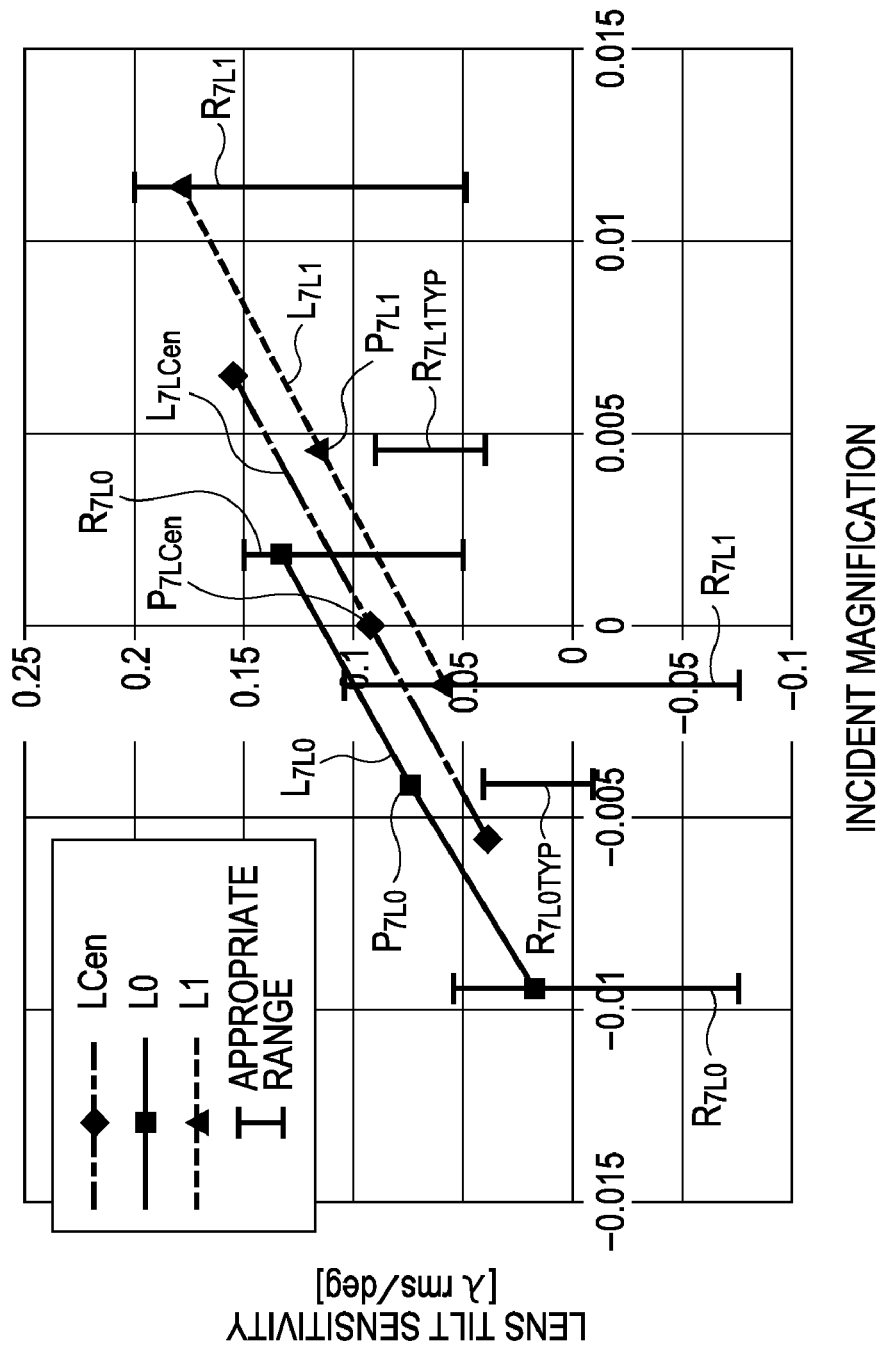
FIG. 26 is a diagram illustrating incident magnifications and changes in the lens tilt sensitivities of the L0 layer, the L1 layer, and the LCen layer, together with appropriate ranges, in an objective lens dedicated to the first optical disk (the BD and the like) used in an optical pickup having a so-called two-objective-lens configuration according to Example 2.

FIG. 26 shows the change in lens tilt sensitivity relative to the incident magnification of the objective lens in the above-mentioned design condition. In FIG. 26, in the environment-basis state (35° C., 405 nm) represented by the plot $P7_{LCen}$, the incident magnification is 0, and the lens tilt sensitivity at this time is approximately $\Delta W_{LT\_Cen}$=0.1 [λrms/deg]. In addition, the objective lens is designed to be nearly aplanatic.

As can be seen from FIG. 26, the plots, which represent the maximum and the minimum of the lens tilt sensitivity at the L0 and L1 layers, are included in the allowable ranges $R7_{L0}$ and $R7_{L1}$ at the respective layer determined by the above-mentioned Expressions (26A) and (26B).

The objective lens of Example 2 is an objective lens in which the above mentioned Expressions (26A) and (26B) are satisfied, that is, the maximum and the minimum values of the L0 and L1 layers are within the respective predetermined ranges thereof. Accordingly, it can be seen that the objective lens of Example 2 is formed as a lens having a lens tilt tolerance sufficient for the optical pickup having the so-called two-objective-lens configuration. In addition, the objective lens of Example 2 achieves favorable comatic aberration compensation by using the lens tilt range as described above.

14. Regarding Example 3 (Modified Example 1 of Two-Objective-Lens Configuration)

Next, Example 3 shows an example of making comatic aberration of the one-wavelength-only objective lens more appropriate as a modified example of Example 2. In Example 3, a configuration was made so as to satisfy Expressions (26A) and (26B) similarly to Example 2 and satisfy Expression (36).

Figure 27:
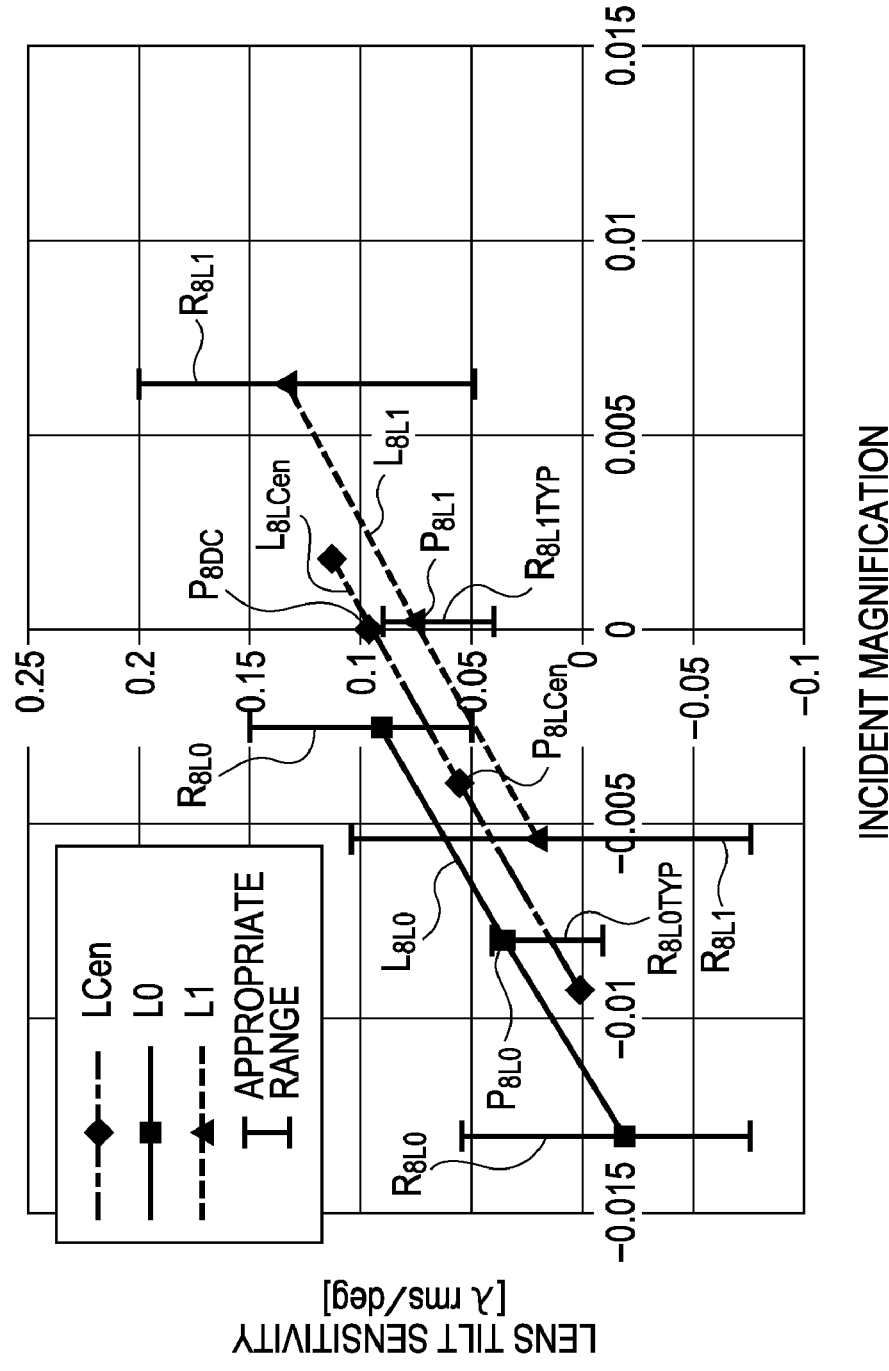
FIG. 27 is a diagram illustrating incident magnifications and changes in the lens tilt sensitivities of the L0 layer, the L1 layer, and the LCen layer, together with appropriate ranges, in Modified Example 1 of an objective lens dedicated to the first optical disk (the BD and the like) used in an optical pickup having a so-called two-objective-lens configuration according to Example 3.

In a design condition in Example 3, the focal length f was 1.41 mm, and a configuration, in which the diffractive structure made of plastic is not provided, was made. Furthermore, the design parameters shown in Table 3 were employed. FIG. 27 shows the change in lens tilt sensitivity relative to the incident magnification of the objective lens in the above-mentioned design condition.

TABLE 3

Example 3 f = 1.41
Parameters of Bd-Use-Only Objective Lens usable in
Optical Pickup having Two-Objective-Lens Configuration

DESIGN BASIS

| WAVELENGTH | 405.7 |
|---|---|
| INCIDENT MAGNIFICATION | 0 |
| TEMPERATURE | 5° C. |

TABLE 3-continued

Example 3 f = 1.41
Parameters of Bd-Use-Only Objective Lens usable in
Optical Pickup having Two-Objective-Lens Configuration

ENVIRONMENT-BASIS CONDITION

| MEDIA TYPE | FIRST OPTICAL DISK |
|---|---|
| WAVELENGTH λ[nm] | 405.7 |
| MEDIA COVER LAYER THICKNESS (mm) | 0.0875 |
| FOCAL LENGTH f[mm] | 1.41 |
| NA | 0.85 |
| INCIDENT MAGNIFICATION | −0.003998 |

| SURFACE NUMBER | ri | SURFACE SPACING dλ1 | REFRACTIVE INDEX nλ1 |
|---|---|---|---|
| 0 | | ∞ | |
| 1 (DIAPHRAGM DIAMETER) | | 0(φ2.40) | |
| 2 | 0.909 | 1.712 | 1.524 |
| 3 | −1.421 | | |
| 4 | | 0.445 | |
| 5 | | 0.0875 | 1.6172 |

| | | SURFACE NUMBER | |
|---|---|---|---|
| | | 2 | 3 |
| ASPHERIC SURFACE COEFFICIENT | K | 9.0868E−01 | −3.4256E+01 |
| | A4 | −7.3886E−01 | 2.3606E−01 |
| | A6 | 4.5994E−02 | −3.1759E−01 |
| | A8 | 1.0177E−02 | 2.1804E−01 |
| | A10 | 1.3737E−02 | −6.2557E−02 |
| | A12 | 5.9913E−03 | |
| | A14 | −1.1569E−02 | |
| | A16 | 1.2529E−02 | |
| | A18 | −3.1500E−03 | |
| | A20 | | |
| | A22 | | |

Here, relative to Table 3 and FIG. 27, the difference with Example 2 described in Table 2 and FIG. 26 mentioned above is described. Furthermore, in FIGS. 26 and 27 and FIG. 28 to be described later, $R_{7L0TYP}$, $R_{8L0TYP}$, and $R_{9L0TYP}$ represent predetermined ranges determined on the basis of Expression (36) of the lens tilt sensitivity at the L0 layer in the environment-basis state. Further, $R_{7L1TYP}$, $R_{8L1TYP}$, and $R_{9L1TYP}$ represent predetermined ranges determined on the basis of Expression (36) of the lens tilt sensitivity at the L1 layer in the environment-basis state. In Example 3, as noted in the item of the design basis in Table 3, the design temperature on the design basis is changed to 5° C. unlike Example 2 shown in Table 2. In addition, the design wavelength (λ=405.7 μm) and the design cover layer thickness (LCen=0.0875 mm) are the same.

Thereby, as shown in FIG. 27, it would appear that it is possible to change only the range of the acquirable lens tilt sensitivity almost without changing the design line itself as compared with the case of FIG. 26. In the case of Table 3, a configuration, in which the aplanatic design is performed at the temperature (5° C.) selected on the design basis, was made. Hence, the lens tilt sensitivity on the design basis is $\Delta W_{LT\_Cen} = 0.1$. The incident magnification and the lens tilt sensitivity on the design basis (5° C., 0.0875 μm) is represented as the plot $P_{8DC}$ in FIG. 27. Furthermore, in FIG. 26 of the above-mentioned Example 2, the plot on the design basis is at substantially the same position as the plot $P_{7Lcen}$ representing the environment basis of the LCen layer. In FIG. 27 of Example 3, the plot $P_{8DC}$ on the design basis is at the different position from the plot $P_{8LCen}$ representing the environment basis of the LCen layer.

In other words, in Example 3, in order to further improve performance of the pickup as compared with Example 2, it is preferable to satisfy the range of Expression (36). Specifically, the concept of the configuration, which is very advantageous in changing the configuration from the example of FIG. 26 to the example of FIG. 27, is that the lower temperature side is positioned on the design basis.

In Example 3, the design temperature is deviated from the environment-basis temperature. Hence, as shown in FIG. 27, when the incident magnification 0 is set as the basis, the upper end and the lower end of the lens tilt sensitivity becomes asymmetric. Furthermore, aberrations are reduced in the entire optical system.

As can be seen from FIG. 27, the $P_{8L0}$ and $P_{8L1}$, which represent the lens tilt sensitivities $\Delta W_{LT\_L0\_TYP}$ and $\Delta W_{LT\_L1\_TYP}$ at the L0 and L1 layers in the environment-basis state (35° C., 405 nm), are within predetermined ranges determined by the above mentioned Expression (36). That is, in Example 3, it would appear that $P_{8L0}$ and $P_{8L1}$ are included in $R_{8L0TYP}$ and $R_{8L1TYP}$, thereby achieving favorable comatic aberration compensation. In the point of view, there is a difference with Example 2 shown in FIG. 26.

Further, as can be seen from FIG. 27, similarly to FIG. 26, the plots, which represent the maximum and the minimum of the lens tilt sensitivities at the L0 and L1 layers, are included in the allowable range $R_{8L0}$ and $R_{8L1}$ at the respective layers determined by the above-mentioned Expressions (26A) and (26B).

The objective lens of Example 3 is an objective lens in which the above mentioned Expressions (26A) and (26B) are satisfied, that is, the maximum and the minimum values of the L0 and L1 layers are within the respective predetermined ranges thereof. Accordingly, it can be seen that the objective lens of Example 3 is formed as a lens having a lens tilt tolerance sufficient for the optical pickup having the so-called two-objective-lens configuration. Furthermore, the objective lens of Example 3 is an objective lens in which the above mentioned Expression (36) is satisfied, that is, the lens tilt sensitivities at the L0 and L1 layers in the environment-basis state are within the respective predetermined ranges thereof. Accordingly, it can be seen that the objective lens of Example 3 is formed as a lens that further achieves reduction in comatic aberration as compared with the objective lens of Example 2. In addition, the objective lens of Example 3 is configured to satisfy the lens tilt range as described above, and therefore achieves more favorable comatic aberration compensation.

15. Regarding Example 4 (Modified Example 2 of Two-Objective-Lens Configuration)

Next, Example 4 shows an example of making comatic aberration of the one-wavelength-only objective lens more appropriate than Examples 2 and making the advantages in practical use better than Example 3 as a modified example of Examples 2 and 3. In Example 4, a configuration was made so as to satisfy Expressions (26A) and (26B) similarly to Example 3 and satisfy Expression (36).

Figure 28:
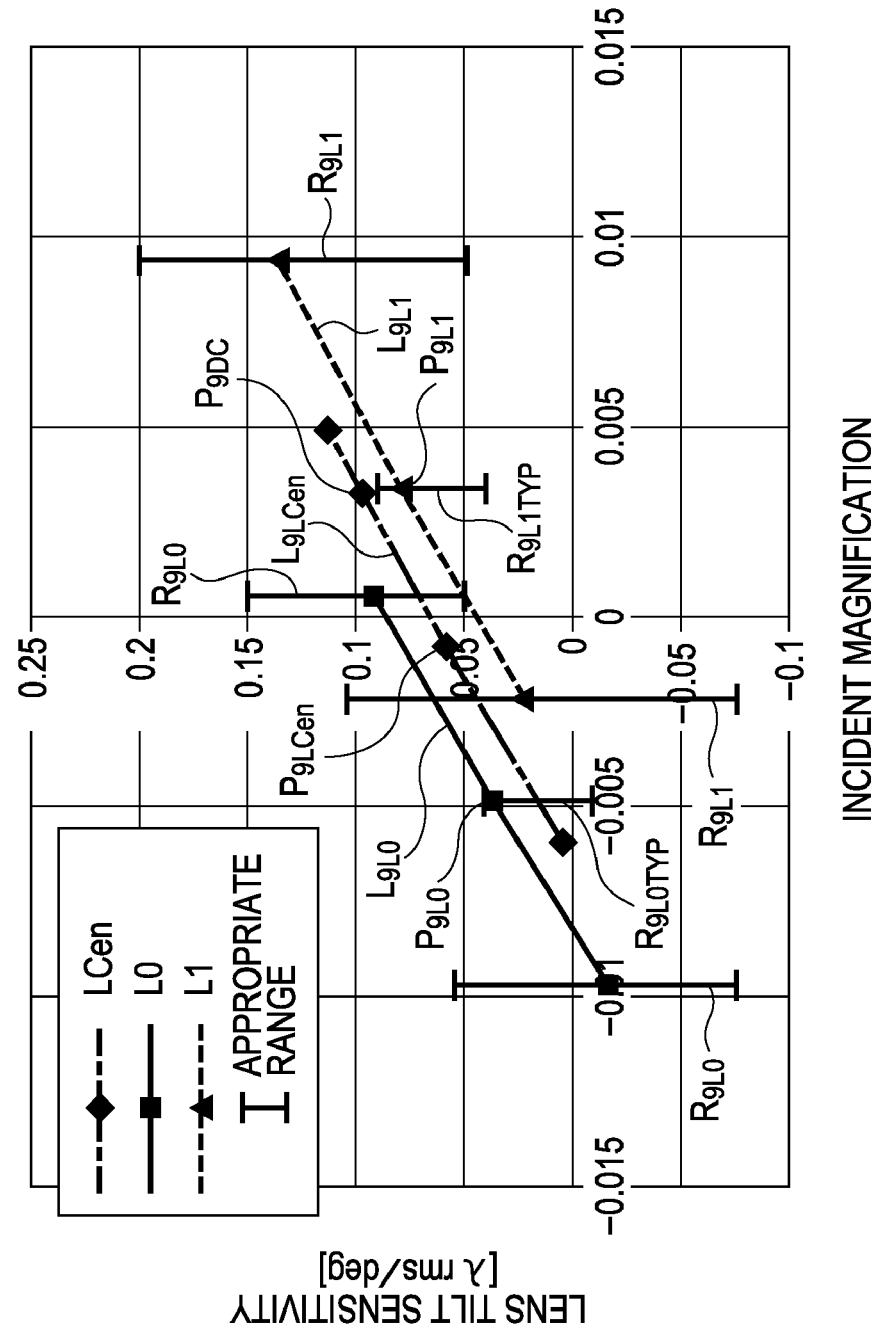
FIG. 28 is a diagram illustrating incident magnifications and changes in the lens tilt sensitivities of the L0 layer, the L1 layer, and the LCen layer, together with appropriate ranges, in Modified Example 2 of an objective lens dedicated to the first optical disk (the BD and the like) used in an optical pickup having a so-called two-objective-lens configuration according to Example 4.

In a design condition in Example 4, the focal length f was 1.41 mm, and a configuration, in which the diffractive structure made of plastic is not provided, was made. Furthermore, the design parameters shown in Table 4 were employed. FIG. 28 shows the change in lens tilt sensitivity relative to the incident magnification of the objective lens in the above-mentioned design condition.

TABLE 4

Example 4 f = 1.41
Parameters of Bd-Use-Only Objective Lens usable in
Optical Pickup having Two-Objective-Lens Configuration

| DESIGN BASIS | |
|---|---|
| WAVELENGTH | 405.7 |
| INCIDENT MAGNIFICATION | 0.003 |
| TEMPERATURE | 5° C. |

| ENVIRONMENT-BASIS CONDITION | |
|---|---|
| MEDIA TYPE | FIRST OPTICAL DISK |
| WAVELENGTH λ[nm] | 405.7 |
| MEDIA COVER LAYER THICKNESS (mm) | 0.0875 |
| FOCAL LENGTH f[mm] | 1.41 |
| NA | 0.85 |
| INCIDENT MAGNIFICATION | −0.000758 |

| SURFACE NUMBER | ri | SURFACE SPACING dλ1 | REFRACTIVE INDEX nλ1 |
|---|---|---|---|
| 0 | | ∞ | |
| 1 (DIAPHRAGM DIAMETER) | | 0(φ2.40) | |
| 2 | 0.909 | 1.712 | 1.524 |
| 3 | −1.418 | | |
| 4 | | 0.441 | |
| 5 | | 0.0875 | 1.6172 |

| | | SURFACE NUMBER | |
|---|---|---|---|
| | | 2 | 3 |
| ASPHERIC SURFACE COEFFICIENT | K | −7.3636E−01 | −3.6429E+01 |
| | A4 | 4.7085E−02 | 2.3122E−01 |
| | A6 | 1.0164E−02 | −3.0798E−01 |
| | A8 | 1.3438E−02 | 2.1051E−01 |
| | A10 | 7.0162E−03 | −6.0374E−02 |
| | A12 | −1.1965E−02 | |
| | A14 | 1.2159E−02 | |
| | A16 | 2.7912E−03 | |
| | A18 | | |
| | A20 | | |
| | A22 | | |

Here, relative to Table 4 and FIG. 28, the differences with Example 2 described in Table 2 and FIG. 26 mentioned above and Example 3 described in Table 3 and FIG. 27 mentioned above are described. In Example 4, as noted in the item of the design basis in Table 4, the incident magnification on the design basis is changed to 0.003 unlike Example 3 shown in Table 3. In addition, the design temperature (5° C.), the design wavelength (λk=405.7 μm), and the design cover layer thickness (LCen=0.0875 mm) are the same.

Thereby, as shown in FIG. 28, it would appear that it is possible to change only the range of the used incident magnification almost without changing the range of the lens tilt sensitivity as compared with the case of FIG. 27. In the case of Table 4, an aplanatic configuration was made by the optimal design of the objective lens at an incident magnification of 0.003, a design temperature of 5° C., and a design cover layer thickness of 0.0875 (=LCen). Hence, the lens tilt sensitivity on the design basis is $\Delta W_{LT\_Cen}$=0.1. The incident magnification of 0.003 and the lens tilt sensitivity on the design basis (5° C., 0.0875 μm) is represented as the plot $P_{9DC}$ in FIG. 28.

In other words, in Example 4, as compared with the case where the incident magnification is unbalanced relative to 0 in Example 3 shown in FIG. 27, it is possible to make the balance of the incident magnification relative to 0 better as shown in FIG. 28. That is, in the objective lens of Example 4 and FIG. 28, it is possible to adopt the configuration in which the incident magnification is balanced relative to temperature fluctuation, and it is possible to eliminate the possibility that comatic aberration characteristics in the case of visual field vibration are deteriorated by the unbalance of the incident magnification. Specifically, the concept of the configuration, which is very advantageous in changing the configuration from the example of FIG. 27 to the example of FIG. 28, is that the respective line groups $L_{8L0}$, $L_{8LCen}$, and $L_{8L1}$ representing the lens tilt sensitivity relative to the incident magnification are offset in the right direction, and this is achieved in FIG. 28. More specifically, in FIG. 27, the magnification on the design basis is set to 0, but at this time, the incident magnification at a temperature basis of 35° C. is around −0.003, and therefore, in order to achieve the target value of 0, the magnification on the design basis is set to approximately M=0.003. In this case, when the design temperature is set to 5° C. similarly to the case of FIG. 27, the aplanatic design can be made similarly to the case of the above-mentioned Example 3. According to Table 4 and FIG. 28, the lens tilt sensitivity on the design basis is shifted a little bit, but it is possible to reduce the lens tilt sensitivity by realizing the configuration that substantially satisfies the predetermined range.

In Example 4, the design temperature is deviated from the environment-basis temperature. Hence, as shown in FIG. 28, the upper end and the lower end of the lens tilt sensitivity becomes asymmetric. Further, it is possible to achieve the incident magnification of 0 at the temperature while reducing aberration in the entire optical system. Accordingly, the incident magnification is balanced to either the positive side or the negative side in the used temperature range.

As can be seen from FIG. 28, the $P_{9L0}$ and $P_{9L1}$, which represent the lens tilt sensitivities $\Delta W_{LT\_L0\_TYP}$ and $\Delta W_{LT\_L1\_TYP}$ at the L0 and L1 layers in the environment-basis state (35° C., 405 nm), are included in predetermined ranges $R_{9L0TYP}$ and $R_{9L1TYP}$ determined by the above mentioned Expression (36).

Further, as can be seen from FIG. 28, similarly to FIGS. 26 and 27, the plots, which represent the maximum and the minimum of the lens tilt sensitivities at the L0 and L1 layers, are included in the allowable range $R_{9L0}$ and $R_{9L1}$ at the respective layers determined by the above-mentioned Expressions (26A) and (26B).

The objective lens of Example 4 is an objective lens in which the above mentioned Expressions (26A) and (26B) are satisfied, that is, the maximum and the minimum values of the L0 and L1 layers are within the respective predetermined ranges thereof. Accordingly, it can be seen that the objective lens of Example 4 is formed as a lens having a lens tilt tolerance sufficient for the optical pickup having the so-called two-objective-lens configuration. Furthermore, the objective lens of Example 4 is an objective lens in which the above mentioned Expression (36) is satisfied, that is, the lens tilt sensitivities at the L0 and L1 layers in the state centered on environment are within the respective predetermined ranges thereof. Accordingly, it can be seen that the objective lens of Example 4 is formed as a lens that further achieves reduction in comatic aberration as compared with the objective lens of Example 2. In addition, the objective lens of Example 4 achieves more favorable comatic aberration compensation by using the lens tilt range as described above. Furthermore, the objective lens of Example 4 is set to have good balance in the used incident magnification relative to either the positive side or the negative side as compared with the objective lens of Example 3. Hence, the comatic aberration characteristics are excellent even in the case of visual field vibration.

Furthermore, the configuration, which satisfies Expression (36), described in Examples 3 and 4, and the configuration, in which the used incident magnification is set to have good balance to either the positive side or the negative side on the basis in which the used temperature is considered, are available in not only the two-objective-lens configuration like the objective lens 134A but also the one-objective-lens configuration. That is, the objective lens, which is configured to be aplanatic at the design temperature different from the environment-basis temperature, is able to reduce the lens tilt sensitivity up to a desirable range. In addition, the objective lens configured to satisfy Expression (36) is able to reduce aberrations in the entire optical pickup on the basis in which the lens tilt sensitivity and the image height characteristics are considered. The objective lens is able to improve recording and reproducing characteristics by more reducing aberrations in the optical pickup. Further, with such a configuration, the objective lens, which is configured to be aplanatic at the design temperature and the predetermined incident magnification, enables the setting to make balance in the used incident magnification good with the lens tilt sensitivity reduced. Thereby, the objective lens is able to prevent the incident magnification at the used temperature from being unbalanced and reduce aberrations, thereby improving recording and reproducing characteristics.

16. Regarding Objective Lens, Optical Pickup, Optical Disk Apparatus According to Embodiments of the Invention As described above, the objective lens according to the embodiments of the invention is able to suppress deterioration in signal quality, which was difficult to be suppressed in the past, caused by vibration of the disk surface by setting the amount of the coma sensitivity, which is caused when the plastic objective lens is tilted, to be within an appropriate range. That is, by satisfying Expressions (22A) and (22B), the objective lens 34 according to the embodiments of the invention is able to prevent various signal deterioration due to the remainder, which is processed by lens tilt adjustment at the time of manufacturing the optical pickup, and the excess of the allowance of comatic aberration which is significantly caused by the tangential surface vibration. With such a configuration, the objective lens 34 is able to improve mass productivity and achieve weight saving while compensating comatic aberration even when environmental temperature is changed in a way that the objective lens is made of plastic. Consequently, in the embodiments of the invention, it is possible to improve mass productivity and achieve weight saving while achieving favorable recording and reproducing characteristics by satisfactorily correcting aberrations.

Further, by satisfying Expression (36), the objective lens 34 according to the embodiments of the invention achieves reduction in amount of comatic aberration caused by manufacturing the entire optical pickup. As a result, the optical pickup can be configured to have high mass productivity and excellent recording and reproducing characteristics.

Furthermore, by satisfying Expressions (26A) and (26B), the objective lens 134A according to the embodiments of the invention achieves favorable comatic aberration compensation in the optical pickup having the two-objective-lens configuration. With such a configuration, the objective lens 134A is able to prevent various signal deterioration due to the remainder, which is processed by the lens tilt adjustment at the time of manufacturing the optical pickup, and the excess of the allowance of comatic aberration which is significantly caused by the tangential surface vibration. Thereby, the objective lens 134A is able to improve mass productivity and achieve weight saving while compensating comatic aberration even when environmental temperature is changed in a way that the objective lens is made of plastic. Consequently, in the embodiments of the invention, it is possible to improve mass productivity and achieve weight saving while achieving favorable recording and reproducing characteristics by satisfactorily correcting aberrations.

Further, the optical pickups 3 and 103 according to the embodiments of the invention is able to improve mass productivity and achieve weight saving while achieving favorable recording and reproducing characteristics by using the plastic objective lenses 34 and 134A with low cost and high productivity. That is, in the optical pickups 3 and 103, it is possible to use the plastic objective lens in substitution for the general glass lens with high cost, and thus it is possible to manufacture the optical pickup itself with low cost. Further, since the optical pickup 3 according to the embodiment of the invention also uses the three-wavelength compatible objective lens 34, it is possible to further reduce costs of the components thereof by making common the optical components and optical path constituting the optical pickup, and thus it is possible to further reduce costs of the pickup. Furthermore, even when the three-wavelength compatibility lens is not used, in the same manner as the optical pickup 103 according to the embodiments of the invention, the lens tilt sensitivity of the objective lens 134 dedicated to the first optical disk such as a BD, thereby obtaining the following effects. That is, in the optical pickup 103 according to the embodiments of the invention, the objective lens 134A on the first optical disk side, which was difficult to be independently adjusted in the past, can be independently adjusted. In other words, it is possible to compensate comatic aberration, which is caused when the objective lens 134B on the second and third optical disk sides is adjusted, in the objective lens 134 on the first optical disk side. With such a configuration, it is possible to achieve favorable recording and reproducing characteristics.

Furthermore, the optical disk apparatus 1 according to the embodiment of the invention includes the optical pickup which records and/or reproduces an information signal by illuminating the light beam on the optical disk 2 driven to be rotated. The optical pickup may employ the above-mentioned optical pickups 3 and 103. Accordingly, the optical disk apparatus 1 is able to improve mass productivity and achieve weight saving while achieving favorable recording and reproducing characteristics by satisfactorily correcting aberrations.

The present application contains subject matter related to that disclosed in Japanese Priority Patent Application JP 2009-014245 filed in the Japan Patent office on Jan. 26, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A plastic objective lens configured to collect a light beam with at least a wavelength $\lambda$ on a recording layer of an optical disk and used in an optical pickup for recording and/or reproducing an information signal by illuminating a light beam on the optical disk having one or more of recording layers in an incident direction of the light beam, wherein:

an amount of 3rd order comatic aberration [λrms], which is caused when the objective lens is tilted by 1 degree, is a lens tilt sensitivity;

the lens tilt sensitivity at an image height sensitivity of 0 is positive; and wherein under an environment in which a temperature range is 0° C. to 70° C. and a range of the wavelength λ of the light beam is 400 to 410 nm, a maximum lens tilt sensitivity at an n-th layer is $\Delta W_{LT\_Max\_Ln}$;

a minimum lens tilt sensitivity is $\Delta W_{LT\_Min\_Ln}$;

f is a focal length [mm] of the objective lens at the wavelength λ;

$\Delta t_{L0-Ln}$ is a through-thickness distance [mm], at which a thickness of a cover layer is the maximum, from a 0th layer to an n-th layer of the one or more recording layers; and a numerical aperture NA at the wavelength λ satisfies the relationship of NA>0.8, and the relationships of the following Expressions (1) and (2) are satisfied in all the recording layers of the one or more recording layers:

$$0.034 \cdot f \leq \Delta W_{LT\_Max\_Ln} \leq 0.25 + 2.0 \cdot \Delta t_{L0-Ln} \quad (1),$$

and $$-0.053 \cdot f \leq \Delta W_{LT13\ Min\_Ln} \leq 0.25 + 2.0 \cdot \Delta t_{L0-Ln} - 0.068 \cdot f \quad (2).$$

2. The objective lens according to claim 1, wherein the objective lens is used in an optical pickup for recording and/or reproducing an information signal by illuminating a light beam on at least a first optical disk having one or a plurality of recording layers, a second optical disk of different type from the first optical disk, and a third optical disk of different type from the first and second optical disks, and wherein the objective lens is a three-wavelength compatible objective lens that collects a light beam with a first wavelength corresponding to the first optical disk, a light beam with a second wavelength, which is longer than the first wavelength, corresponding to the second optical disk, and a light beam with a third wavelength, which is longer than the second wavelength, corresponding to the third optical disk, on recording layers of the corresponding optical disks.

3. The objective lens according to claim 1 or 2, wherein when the lens tilt sensitivity at the n-th layer is $\Delta W_{LT\_Ln\_TYP}$ under an environment in which a temperature is 35° C. and the wavelength λ of the light beam is 405 nm, the relationship of the following Expression (3) is satisfied in all the recording layers of the one or more recording layers:

$$-0.01 + 2.0 \cdot \Delta t_{L0-Ln} \leq \Delta W_{LT\_Ln\_TYP} \leq 0.04 + 2.0 \cdot \Delta t_{L0-Ln} \quad (3).$$

4. The objective lens according to claim 1, wherein the following Expressions (4) and (5) are satisfied:

$$0.034 \cdot f \leq \Delta W_{LT\_Max\_Ln} \leq 0.15 + 2.0 \cdot \Delta t_{L0-Ln} \quad (4),$$

and $$-0.053 \cdot f \leq \Delta W_{LT\_Min\_Ln} \leq 0.15 + 2.0 \cdot \Delta t_{L0-Ln} - 0.068 \cdot f \quad (5).$$

5. The objective lens according to claim 4, wherein the objective lens is used in an optical pickup for recording and/or reproducing an information signal by illuminating a light beam on at least a first optical disk having the one or more of recording layers, a second optical disk of different type from the first optical disk, and a third optical disk of different type from the first and second optical disks, and is used with other objective lenses which are configured to collect the corresponding light beams on the second and third optical disks, and wherein the objective lens is a one-wavelength-only objective lens that collects the light beam corresponding to the first optical disk on the recording layer of the first optical disk.

6. The objective lens according to claim 4 or 5, wherein when the lens tilt sensitivity at the n-th layer is $\Delta W_{LT\_Ln\_TYP}$ under an environment in which a temperature is 35° C. and the wavelength λ of the light beam is 405 nm, the relationship of the following Expression (6) is satisfied in all the recording layers of the one or more recording layers:

$$-0.01 + 2.0 \cdot \Delta t_{L0-Ln} \leq \Delta W_{LT\_Ln\_TYP} \leq 0.04 + 2.0 \cdot \Delta t_{L0-Ln} \quad (6).$$

7. An optical pickup comprising:

a plastic objective lens configured to collect a light beam, which is emitted from a light source, on a recording layer of an optical disk in order to perform recording and/or reproducing of an information signal on the optical disk having one or more recording layers in an incident direction of the light beam, wherein, in the objective lens;

an amount of 3rd order comatic aberration [λrms], which is caused when the objective lens is tilted by 1 degree, is a lens tilt sensitivity;

the lens tilt sensitivity at an image height sensitivity of 0 is positive; and wherein under an environment in which a temperature range is 0° C. to 70° C. and a range of the wavelength λ of the light beam is 400 to 410 nm, a maximum lens tilt sensitivity at an n-th layer is $\Delta W_{LT\_Max\_Ln}$;

a minimum lens tilt sensitivity is $\Delta W_{LT\_Min\_Ln}$;

f is a focal length [mm] of the objective lens at the wavelength λ;

$\Delta t_{L0-Ln}$ is a through-thickness distance [mm], at which a thickness of a cover layer is the maximum, from a 0th layer to an n-th layer of the one or more recording layers; and a numerical aperture NA at the wavelength λ satisfies the relationship of NA>0.8, and the relationships of the following Expressions (7) and (8) are satisfied in all the recording layers: of the one or more recording layers:

$$0.034 \cdot f \leq \Delta W_{LT\_Max\_Ln} \leq 0.25 + 2.0 \cdot \Delta t_{L0-Ln} \quad (7),$$

and $$-0.053 \cdot f \leq \Delta W_{LT\_Min\_Ln} \leq 0.25 + 2.0 \cdot \Delta t_{L0-Ln} - 0.068 \cdot f \quad (8).$$

8. An optical disk apparatus comprising:

an optical pickup including a plastic objective lens configured to collect a light beam, which is emitted from a light source, on a recording layer of an optical disk in order to perform recording and/or reproducing of an information signal on the optical disk having one or more recording layers in an incident direction of the light beam, wherein, in the objective lens;

an amount of 3rd order comatic aberration [λrms], which is caused when the objective lens is tilted by 1 degree, is a lens tilt sensitivity;

the lens tilt sensitivity at an image height sensitivity of 0 is positive; and wherein under an environment in which a temperature range is 0° C. to 70° C. and a range of the wavelength $\lambda$ of the light beam is 400 to 410 nm, a maximum lens tilt sensitivity at an n-th layer is $\Delta W_{LT\_Max\_Ln}$;

a minimum lens tilt sensitivity is $\Delta W_{LT\_Min\_Ln}$;

f is a focal length [mm] of the objective lens at the wavelength $\lambda$;

$\Delta t_{L0-Ln}$ is a through-thickness distance [mm], at which a thickness of a cover layer is the maximum, from a 0th layer to an n-th layer of the one or more recording layers; and a numerical aperture NA at the wavelength $\lambda$ satisfies the relationship of NA>0.8, and the relationships of the following Expressions (9) and (10) are satisfied in all the recording layers of the one or more recording layers:

$$0.034 \cdot f \leq \Delta W_{LT\_Max\_Ln} \leq 0.25 + 2.0 \cdot \Delta t_{L0-Ln} \qquad (9),$$

and $$-0.053 \cdot f \leq \Delta W_{LT\_Min\_Ln} \leq 0.25 + 2.0 \cdot \Delta t_{L0-Ln} - 0.068 \cdot f \qquad (10).$$

* * * * *